United States Patent
Hendricks et al.

(10) Patent No.: US 6,463,585 B1
(45) Date of Patent: Oct. 8, 2002

(54) TARGETED ADVERTISEMENT USING TELEVISION DELIVERY SYSTEMS

(75) Inventors: John S. Hendricks, Potomac; Alfred E. Bonner, Bethesda; John S. McCoskey, Derwood, all of MD (US); Michael L. Asmussen, Herndon, VA (US)

(73) Assignee: Discovery Communications, Inc., Bethesda, MD (US)

( * ) Notice: Subject to any disclaimer, the term of this patent is extended or adjusted under 35 U.S.C. 154(b) by 0 days.

(21) Appl. No.: 09/054,419

(22) Filed: Apr. 3, 1998

Related U.S. Application Data

(63) Continuation-in-part of application No. 08/735,549, filed on Dec. 9, 1996, which is a continuation of application No. 08/160,280, filed on Dec. 2, 1993, now Pat. No. 5,600,364, which is a continuation-in-part of application No. 07/991,074, filed on Dec. 9, 1992.

(51) Int. Cl.⁷ .......................... H04N 7/10; H04N 7/173
(52) U.S. Cl. .............. 725/35; 725/9; 725/116; 725/134
(58) Field of Search .................. 725/32, 33, 34, 725/35, 36, 131, 134, 142, 168, 85, 9, 116; H04N 7/16, 7/173

(56) References Cited

U.S. PATENT DOCUMENTS

| | | | |
|---|---|---|---|
| 3,891,792 A | 6/1975 | Kimura | |
| 4,361,848 A | 11/1982 | Poignet et al. | |
| 4,381,522 A | 4/1983 | Lambert | |
| 4,398,216 A | 8/1983 | Field et al. | |
| 4,484,217 A | 11/1984 | Block et al. | |
| 4,488,179 A | 12/1984 | Kruger et al. | |
| 4,517,598 A | 5/1985 | VanValkenburg et al. | |
| 4,528,643 A | 7/1985 | Freeny, Jr. | |
| 4,587,520 A | 5/1986 | Astle | |
| 4,605,964 A | 8/1986 | Chard | |

(List continued on next page.)

FOREIGN PATENT DOCUMENTS

| | | |
|---|---|---|
| CA | 2044574 | 12/1992 |
| DE | 3423846 | 1/1986 |
| DE | 3935294 | 4/1991 |

(List continued on next page.)

OTHER PUBLICATIONS

Reimer, "Memories in my Pocket", Feb. 1991.
Olshansky et al., "Subscriber Distribution Networks Using Compressed Digital Video", Nov. 1992.

(List continued on next page.)

Primary Examiner—Chris Grant
(74) Attorney, Agent, or Firm—Dorsey & Whitney LLP

(57) ABSTRACT

A novel multiple channel architecture is designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The operations center or the cable headend generate a group assignment plan that assigns the television terminals to groups, based on factors such as area of dominant influence and household income. A switching plan is then generated that instructs the television terminals to remain with the program channel or to switch to one of the alternate feeder channels during the program breaks. The television terminals record which channels were viewed during the program breaks, and report this information to the cable headends and the operations center. The reported information is used to generate billing for commercial advertisers, and to analyze viewer watching habits. The invention uses upstream data reception hardware, databases and processing hardware and software to accomplish these functions.

26 Claims, 41 Drawing Sheets

U.S. PATENT DOCUMENTS

| | | |
|---|---|---|
| 4,621,282 A | 11/1986 | Ahern |
| 4,633,462 A | 12/1986 | Stifle et al. |
| 4,639,225 A | 1/1987 | Washizuka |
| 4,674,085 A * | 6/1987 | Aranguren et al. ............ 370/85 |
| 4,688,218 A | 8/1987 | Blineau et al. |
| 4,688,246 A | 8/1987 | Eilers et al. |
| 4,694,490 A | 9/1987 | Harvey et al. |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,724,491 A | 2/1988 | Lambert |
| 4,792,972 A | 12/1988 | Cook, Jr. |
| 4,805,014 A | 2/1989 | Sahara et al. |
| 4,816,901 A | 3/1989 | Music et al. |
| 4,816,904 A * | 3/1989 | McKenna et al. ............ 358/84 |
| D301,037 S | 5/1989 | Matsuda |
| 4,829,558 A | 5/1989 | Welsh |
| 4,829,569 A | 5/1989 | Seth-Smith et al. |
| 4,860,379 A | 8/1989 | Schoeneberger et al. |
| 4,876,736 A | 10/1989 | Kiewit |
| 4,928,168 A | 5/1990 | Iwashita |
| 4,930,160 A * | 5/1990 | Vogel ......................... 358/84 |
| 4,947,429 A | 8/1990 | Bestler et al. |
| 4,949,187 A | 8/1990 | Cohen |
| 4,959,810 A | 9/1990 | Darbee et al. |
| 4,961,109 A | 10/1990 | Tanaka |
| 4,965,825 A | 10/1990 | Harvey et al. |
| 4,975,951 A | 12/1990 | Bennett |
| 4,977,455 A | 12/1990 | Young |
| D314,383 S | 2/1991 | Hafner |
| 4,995,078 A | 2/1991 | Monslow et al. |
| 4,996,597 A | 2/1991 | Duffield |
| 5,001,554 A | 3/1991 | Johnson et al. |
| 5,014,125 A | 5/1991 | Pocock et al. |
| 5,015,829 A | 5/1991 | Eilert et al. |
| 5,020,129 A | 5/1991 | Martin et al. |
| 5,027,400 A | 6/1991 | Baji et al. |
| 5,036,394 A | 7/1991 | Morii et al. |
| 5,036,537 A | 7/1991 | Jeffers et al. |
| 5,038,402 A | 8/1991 | Robbins |
| 5,046,093 A | 9/1991 | Wachob |
| 5,047,867 A | 9/1991 | Strubbe et al. |
| 5,049,990 A | 9/1991 | Kondo et al. |
| 5,056,138 A | 10/1991 | Tyson, Sr. |
| 5,057,917 A | 10/1991 | Shalkauser et al. |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,091,782 A | 2/1992 | Krause et al. |
| 5,093,718 A | 3/1992 | Hoarty et al. |
| D325,581 S | 4/1992 | Schwartz |
| 5,103,314 A | 4/1992 | Keenan |
| 5,105,268 A | 4/1992 | Yamanouchi et al. |
| 5,130,792 A | 7/1992 | Tindell et al. |
| 5,132,789 A | 7/1992 | Ammon et al. |
| 5,132,992 A | 7/1992 | Yurt et al. |
| 5,133,079 A | 7/1992 | Ballantyne et al. |
| D329,238 S | 9/1992 | Grasso et al. |
| 5,144,663 A | 9/1992 | Kudelski et al. |
| 5,150,118 A | 9/1992 | Finkle et al. |
| 5,151,782 A | 9/1992 | Ferraro |
| 5,151,789 A | 9/1992 | Young |
| 5,152,011 A | 9/1992 | Schwob |
| 5,155,591 A * | 10/1992 | Wachob ...................... 725/35 |
| 5,166,886 A | 11/1992 | Molnar et al. |
| D331,760 S | 12/1992 | Renk, Jr. |
| 5,172,413 A | 12/1992 | Bradley et al. |
| 5,182,639 A | 1/1993 | Jutamulia et al. |
| 5,202,817 A | 4/1993 | Koenck et al. |
| 5,206,722 A | 4/1993 | Kwan |
| 5,206,954 A | 4/1993 | Inoue et al. |
| 5,216,515 A | 6/1993 | Steele et al. |
| 5,223,924 A | 6/1993 | Strubbe |
| 5,237,311 A | 8/1993 | Mailey et al. |
| 5,237,610 A | 8/1993 | Gammie et al. |
| 5,247,347 A | 9/1993 | Litteral et al. |
| 5,253,066 A | 10/1993 | Vogel |
| 5,253,275 A | 10/1993 | Yurt et al. |
| 5,253,341 A | 10/1993 | Rozmanith et al. |
| 5,260,778 A | 11/1993 | Kauffman et al. |
| 5,282,028 A | 1/1994 | Johnson et al. |
| 5,283,639 A | 2/1994 | Esch et al. |
| 5,285,272 A | 2/1994 | Bradley et al. |
| 5,289,271 A | 2/1994 | Watson |
| 5,293,540 A | 3/1994 | Trani et al. |
| 5,293,633 A | 3/1994 | Robbins |
| 5,319,455 A | 6/1994 | Hoarty et al. |
| 5,319,707 A | 6/1994 | Wasilewski et al. |
| 5,323,240 A | 6/1994 | Amano et al. |
| 5,327,554 A | 7/1994 | Palazzi, III et al. |
| 5,339,315 A | 8/1994 | Maeda et al. |
| 5,341,166 A | 8/1994 | Garr et al. |
| 5,341,474 A | 8/1994 | Gelman et al. |
| 5,343,239 A | 8/1994 | Lappington et al. |
| 5,343,516 A | 8/1994 | Callele et al. |
| 5,345,594 A | 9/1994 | Tsuda |
| 5,349,638 A | 9/1994 | Pitroda et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,365,265 A | 11/1994 | Shibata et al. |
| 5,367,571 A | 11/1994 | Bowen et al. |
| 5,375,068 A | 12/1994 | Palmer et al. |
| 5,389,964 A * | 2/1995 | Oberle et al. .................. 348/9 |
| 5,390,348 A | 2/1995 | Magin et al. |
| 5,396,546 A | 3/1995 | Remillard |
| 5,400,401 A | 3/1995 | Wasilewski et al. |
| 5,404,393 A | 4/1995 | Remillard |
| 5,404,505 A | 4/1995 | Levinson |
| 5,410,326 A | 4/1995 | Goldsetin |
| 5,410,344 A | 4/1995 | Graves et al. |
| 5,412,416 A | 5/1995 | Nemirofsky |
| 5,414,426 A | 5/1995 | O'Donnell et al. |
| 5,416,508 A | 5/1995 | Sakuma et al. |
| 5,424,770 A | 6/1995 | Schmelzer et al. |
| 5,432,542 A | 7/1995 | Thibadeau et al. |
| 5,440,632 A | 8/1995 | Bacon et al. |
| 5,442,626 A | 8/1995 | Wei |
| 5,446,919 A | 8/1995 | Wilkins |
| 5,461,667 A | 10/1995 | Remillard |
| 5,469,206 A | 11/1995 | Strubbe et al. |
| 5,473,362 A | 12/1995 | Fitzgerald |
| 5,477,263 A | 12/1995 | O'Callaghan et al. |
| 5,479,268 A | 12/1995 | Young et al. |
| 5,481,294 A | 1/1996 | Thomas et al. |
| 5,481,296 A | 1/1996 | Cragun et al. |
| 5,481,542 A | 1/1996 | Logston et al. |
| 5,483,278 A | 1/1996 | Strubbe et al. |
| 5,500,794 A | 3/1996 | Fujita et al. |
| 5,512,934 A * | 4/1996 | Kochanski ...................... 348/7 |
| 5,515,098 A * | 5/1996 | Carles ........................... 348/8 |
| 5,561,708 A | 10/1996 | Remillard |
| 5,561,709 A | 10/1996 | Remillard |
| 5,570,126 A | 10/1996 | Blahut et al. |
| 5,644,354 A | 7/1997 | Thompson et al. |
| 5,661,516 A | 8/1997 | Carles |
| 5,663,757 A | 9/1997 | Morales et al. |
| 5,696,906 A | 12/1997 | Peters et al. |

| | | | | | |
|---|---|---|---|---|---|
| 5,724,091 A | | 3/1998 | Freeman et al. | | |
| 5,774,170 A | * | 6/1998 | Hite et al. ............... 348/9 | | |
| 5,815,671 A | * | 9/1998 | Morrison ........... 395/200.77 | | |
| 6,029,045 A | * | 2/2000 | Picco et al. ............. 455/5.1 | | |

FOREIGN PATENT DOCUMENTS

| | | |
|---|---|---|
| EP | 149536 | 1/1984 |
| EP | 103438 | 3/1984 |
| EP | 145063 | 6/1985 |
| EP | 158548 | 10/1985 |
| EP | 167237 | 1/1986 |
| EP | 187961 | 7/1986 |
| EP | 243312 | 10/1987 |
| EP | 281293 | 9/1988 |
| EP | 328440 | 8/1989 |
| EP | 355697 | 2/1990 |
| EP | 399200 | 11/1990 |
| EP | 402809 | 12/1990 |
| EP | 420123 | 4/1991 |
| EP | 424648 | 5/1991 |
| EP | 425834 | 5/1991 |
| EP | 450841 | 10/1991 |
| EP | 506435 | 9/1992 |
| EP | 513553 | 11/1992 |
| EP | 513763 | 11/1992 |
| EP | 570785 | 11/1993 |
| GB | 1204190 | 9/1970 |
| GB | 2168227 | 6/1986 |
| GB | 2177873 | 1/1987 |
| JP | 6106015 | 3/1986 |
| JP | 6224777 | 2/1987 |
| JP | 2140134 | 6/1987 |
| JP | 1020454 | 1/1989 |
| JP | 2245167 | 3/1989 |
| JP | 1130683 | 5/1989 |
| JP | 1142918 | 6/1989 |
| JP | 3114375 | 5/1991 |
| JP | 3198119 | 8/1991 |
| JP | 5250106 | 9/1993 |
| TW | 238461 | 4/1992 |
| TW | 234223 | 11/1994 |
| TW | 235358 | 12/1994 |
| TW | 235359 | 12/1994 |
| TW | 236065 | 12/1994 |
| TW | 236744 | 12/1994 |
| WO | 8601962 | 3/1986 |
| WO | 8909528 | 10/1989 |
| WO | 9010988 | 9/1990 |
| WO | 9100670 | 1/1991 |
| WO | 9103112 | 3/1991 |
| WO | 9211713 | 7/1992 |
| WO | 9212599 | 7/1992 |
| WO | 9217027 | 10/1992 |
| WO | 9221206 | 11/1992 |
| WO | 9322877 | 11/1993 |

OTHER PUBLICATIONS

Dinaro, et al., "Markets and Products Overview", 1991.
Advertisement, "Hong Kong Enterprise", Nov. 1988.
Advertisement, "Great Presentations", 1987.
Advertisement, "Consumer Dist.", Fall/Winter 1992.
van den Boom, "Interactive Videotex . . . ", Nov.–Dec. 1986.
Moloney, "Digital Compression in Todays . . . ", Jun. 6, 1993.
Bestler, "Flexible Data Structures . . . ", Jun. 6, 1993.
Sharpless, "Subscription Teletext for Value Added Services", Aug. 1985.
Gelman et al., "A Store–and Forward . . . ", Jun. 21, 1991.
Hewlett Packard Co., "HP–41C Operating Manual", Dec., 1982.
Sorce, et al., "Human Factors In Telecommunications," Sep. 1990.

* cited by examiner

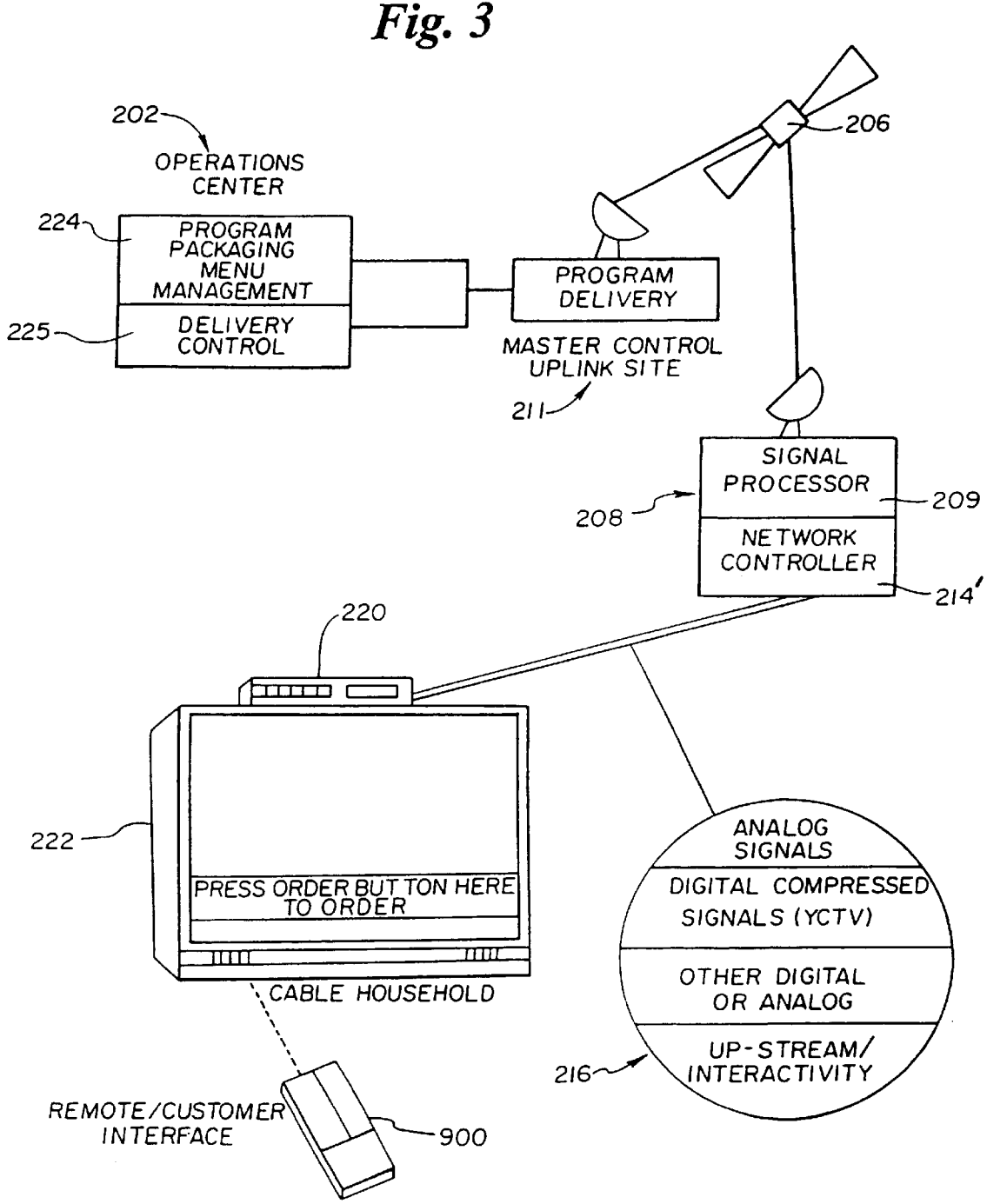

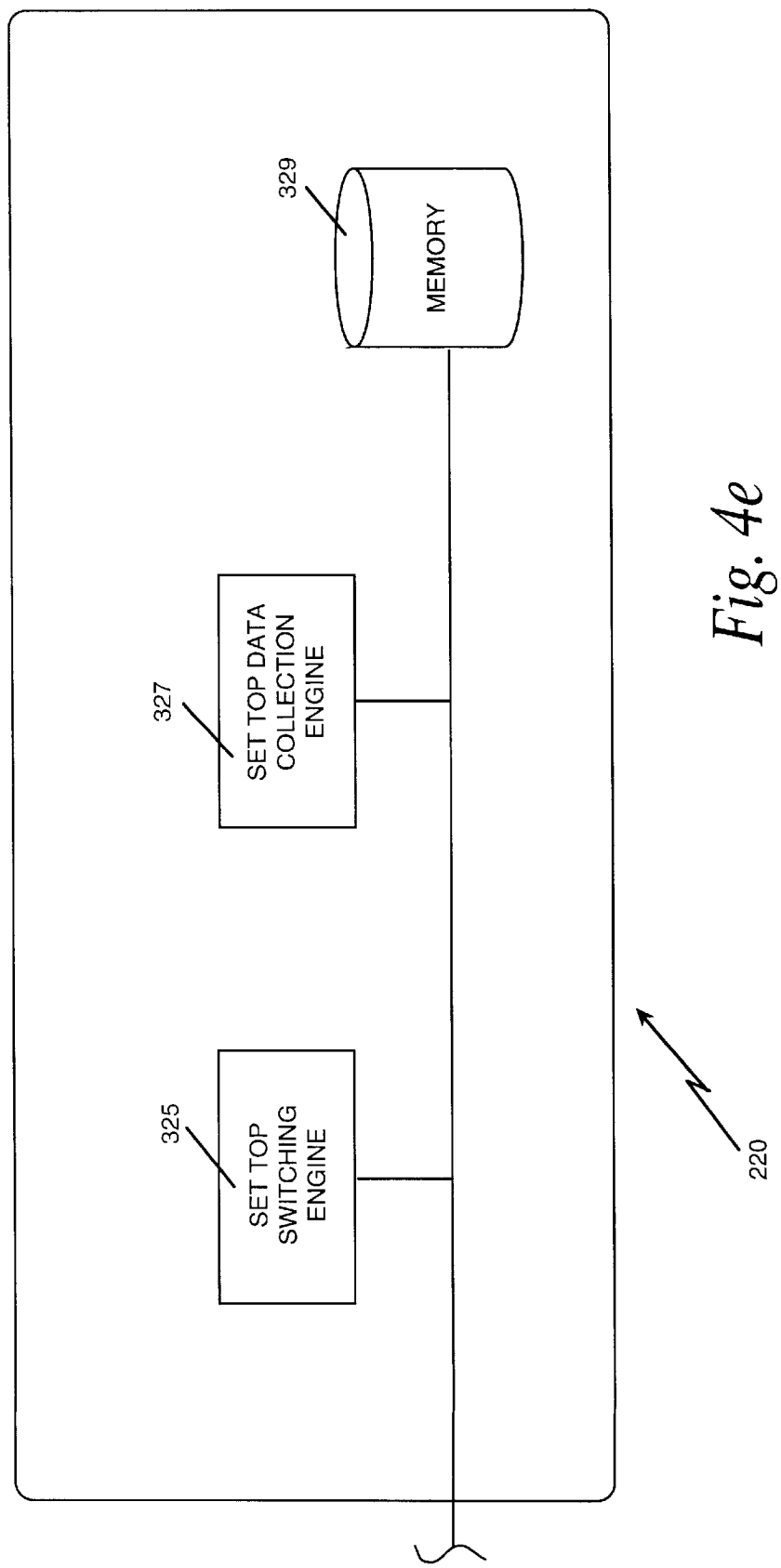

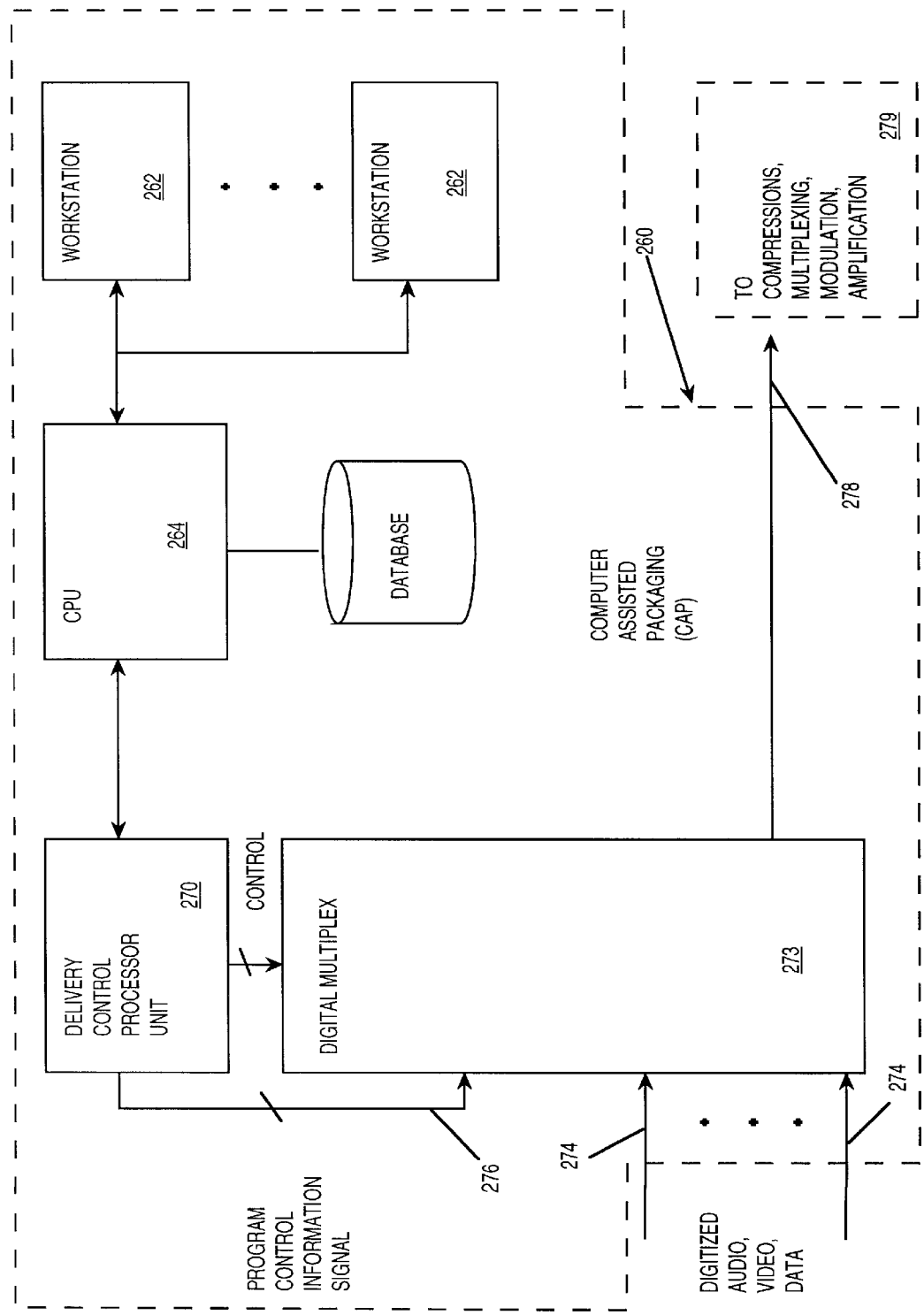

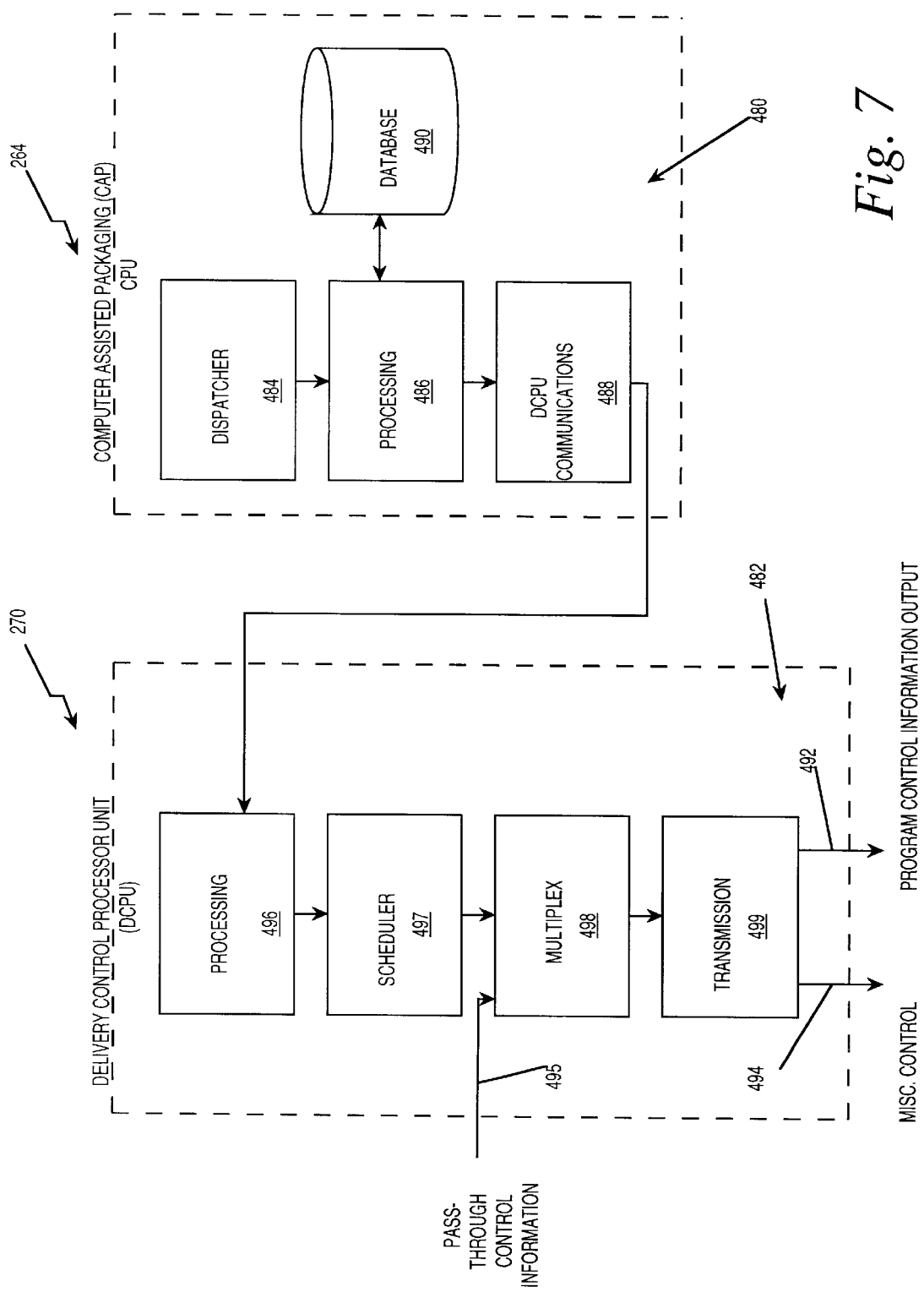

Fig. 16

SATELLITE MOVIE OPTIONS

| VCTV COMBO | COMP. RATIO | AVAILABLE MENUS (1,2&3) | PRIORITY ONE MENUS | PRIORITY ONE PLUS TWO MENUS |
|---|---|---|---|---|
| 1 | 8:1 | HIT MOVIES 8 MOVIE SELECTIONS WITH START TIMES EVERY 15 MINUTES | HIT MOVIES 6 MOVIE SELECTIONS WITH START TIMES EVERY 30 MINUTES | HIT MOVIES 6 MOVIE SELECTIONS WITH START TIMES EVERY 15 MINUTES |
| 2 | 8:1 | | | |
| 3 | 8:1 | | | |
| 4 | 8:1 | | | |
| 5 | 8:1 | | | |
| 6 | 8:1 | | | |
| 7 | 8:1 | | | |
| 8 | 8:1 | | | |
| 9 | 4:1 | SPORTS 8 SELECTIONS | SPORTS 2 SELECTIONS | SPORTS 4 SELECTIONS |
| 10 | 4:1 | | | |
| 11 | 8:1 | CHILDRENS 8 SELECTIONS | CHILDRENS 2 SELECTIONS | CHILDRENS 4 SELECTIONS |
| 12 | 8:1 | DOCS/NEWS 8 SELECTIONS | DOCS/NEWS 2 SELECTIONS | DOCS/NEWS 4 SELECTIONS |
| 13 | 8:1 | ENTERTAINMENT 8 SELECTIONS | ENTERTAINMENT 4 SELECTIONS | ENTERTAINMENT 6 SELECTIONS |
| 14 | 8:1 | SPECIAL-INTEREST CHANNELS 16 SELECTIONS | SPECIAL-INTEREST CHANNELS 4 SELECTIONS | SPECIAL-INTEREST CHANNELS 8 SELECTIONS |
| 15 | 8:1 | | | |
| 16 | 8:1 | PROMOS (1/6 SCREEN) 48 | PROMOS (1/6 SCREEN) 6 | PROMOS (1/6 SCREEN) 48 |
| 17 | 8:1 or max | DATA STREAM | DATA STREAM | DATA STREAM |
| 18 | 8:1 or max | MUSIC 32 DIGITED STATIONS | MUSIC 4 DIGITED STATIONS | MUSIC 32 DIGITED STATIONS |

244     240     242

US 6,463,585 B1

TARGETED ADVERTISEMENT USING TELEVISION DELIVERY SYSTEMS

This application is a continuation-in-part of application Ser. No. 08/735,549 filed Dec. 9, 1996 entitled NETWORK CONTROLLER FOR CABLE TELEVISION DELIVERY SYSTEMS, which is a continuation of Ser. No. 08/160,280 titled NETWORK CONTROLLER FOR CABLE TELEVISION DELIVERY SYSTEM, filed on Dec. 2, 1993, now U.S. Pat. No. 5,600,364 which was a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS. The following other continuation-in-part applications, also based on the above-referenced patent application Ser. No. 07/991,074, are incorporated herein by reference:

PCT/US93/11708 and U.S. Ser. No. 08/160,281, entitled REPROGRAMMABLE TERMINAL FOR SUGGESTING PROGRAMS OFFERED ON A TELEVISION PROGRAM DELIVERY SYSTEM filed Dec. 2, 1993;

PCT/US93/11616 and U.S. Ser. No. 08/160,280, entitled NETWORK CONTROLLER FOR CABLE TELEVISION DELIVERY SYSTEMS filed Dec. 2, 1993;

PCT/US93/11617 and U.S. Ser. No. 08/160,282, entitled AN OPERATIONS CENTER FOR A TELEVISION PROGRAM PACKAGING AND DELIVERY SYSTEM;

PCT/US93/11618 and U.S. Ser. No. 08/160,193, entitled SET-TOP TERMINAL FOR CABLE TELEVISION DELIVERY SYSTEMS filed Dec. 2, 1993;

PCT/US93/11606 and U.S. Ser. No. 08/160,194, entitled ADVANCED SET-TOP TERMINAL FOR CABLE TELEVISION DELIVERY SYSTEMS filed Dec. 2, 1993;

PCT/US93/11615 and U.S. Ser. No. 08/160,283, entitled DIGITAL CABLE HEADEND FOR CABLE TELEVISION DELIVERY SYSTEM filed Dec. 2, 1993;

PCT/US93/11706 and U.S. Ser. No. 08/160,191, entitled TELEVISION PROGRAM DELIVERY SYSTEM filed Dec. 2, 1993;

U.S. Ser. No. 08/336,247, entitled ELECTRONIC BOOK SELECTION AND DELIVERY SYSTEM, filed Nov. 7, 1994;

PCT/US94/13809 and U.S. Ser. No. 08/352,204, entitled AN OPERATIONS CENTER WITH VIDEO STORAGE FOR A TELEVISION PROGRAM PACKAGING AND DELIVERY SYSTEM, filed Dec. 2, 1994; and PCT/US94/13847 and U.S. Ser. No. 08/352,205, entitled NETWORK MANAGER FOR CABLE TELEVISION SYSTEM HEADENDS, filed Dec. 2, 1994.

TECHNICAL FIELD

The invention relates to television entertainment systems for providing television programming to consumer homes. More particularly, the invention relates to a method and apparatus for targeting advertisements to consumer's homes including monitoring, controlling and managing a television program delivery network from an operations center or a cable headend.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better usability, interfaces and service, the television entertainment industry will also experience a switch from new technology driving the market to consumer usability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels. Viewers wish their programming to be customized and targeted to their needs and tastes.

The concepts of interactive television, high definition television and 300 channel cable systems in consumer homes will not sell if they are not packaged, delivered and presented in a useable fashion to consumers. Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

In today's television world, networks manage the program lineup for individual channels. Each network analyzes ratings for television shows and determines the appropriate schedule or program lineup to gain market share and revenue from advertising. Program ratings are determined using a test group of viewers and statistical analysis methods. Since each channel is in competition with every other channel, there is no coordinated effort to organize television programming in a manner that primarily suits the viewers.

Advertising has become equally annoying, with viewers being "forced" to watch television commercials for goods and services that are neither needed nor desired. As a result, consumers have become impatient and dissatisfied with today's television delivery systems. Equally problematic, these television delivery systems do not have the capabilities or features necessary to operate in the digital environment. Consequently, advances in digital technology call for a new television program delivery system that is capable of satisfying varying consumer and viewer needs.

Advertisers want to optimize their advertising expenditures by ensuring that specific advertisements are directed to the appropriate audiences. Specifically, advertisers want specific advertisements to air during television programming that is being viewed by those individuals most likely to be influenced to buy the advertised product, or otherwise respond in a desired fashion to the advertisement.

Existing cable headends are unequipped for the transition to a digital system. These cable headends have no means for monitoring and controlling the large numbers of program signals and advertisements that will eventually be passed on to both consumers and viewers. These cable headends are unequipped to manage account and billing information for set top terminals without relying on telephone lines. In addition, these cable headends have no means for targeting advertisements to particular consumers and viewers.

SUMMARY OF INVENTION

The present invention is a system and a method for delivering targeted advertisements in a television network. In particular, a program controller, or central processing unit, monitors and controls television terminals in a television delivery system. The program controller is a key component of a digital television delivery system. The program controller of the present invention provides much greater capability and flexibility than existing television network controllers such as cable headend control equipment.

The program controller of a preferred embodiment performs all its network monitoring and control of television terminals at a central operations center. The operations center receives analog and digital program signals and processes the signals to produce digitally compressed program signals that are then relayed to intermediate sites such as cable headend sites or are transmitted directly to the television terminals. Each cable headend site is equipped with multiple satellite receiver dishes and a signal processor.

The primary function of the program controller is to manage the configuration of television terminals, control the broadcast of program signals to the television terminals and process signals received from the television terminals. In the preferred embodiment, the program controller monitors, among other things, automatic poll-back responses from the television terminals remotely located at each subscribers' home. The polling and automatic report-back cycle occurs frequently enough to allow the program controller to maintain accurate account and billing information, retrieve programs watched data and monitor authorized channel access.

In the one embodiment, information sent from the program controller is stored in RAM within each subscriber's television terminal and will be retrieved only upon polling by the program controller. Retrieval may, for example, occur on a daily, weekly or monthly basis. The program controller allows the television delivery system to maintain complete information on all programs watched using a particular television terminal. The program controller may also send program data to the television terminal for temporary storage. Thus, the television terminals may store targeted advertisements that are to be played during program breaks for programs airing in the next 24 hours, or in the next week, for example.

A television terminal data gathering routine allows the program controller to schedule and perform polling of all television terminals operating in the system. The software also provides the program controller with a means of processing status reports received from television terminals in response to polling requests.

A video targeting routine makes use of a viewer's demographic information and viewing habits to determine those advertisements that may be most effective when displayed to that particular viewer. In so doing, the routine generates packages of advertisements targeted towards each viewer, or to groups of viewers.

Finally, an additional routine correlates the programs accessed with pricing information to generate billing reports that can be sent to a given television terminal over the cable distribution network. Aside from this routine, the program controller accommodates other methods of billing and account maintenance, such as through the use of remote billing sites.

To efficiently convey targeted advertisements to a desired audience, the operations center may employ a multiple channel architecture that includes a program channel and a number of feeder channels to carry alternate programming, such as alternate targeted advertisements. The program channel carries a main program, such as a broadcast television show, and accompanying advertisements. The feeder channels are ancillary video/audio channels, which are delivered to the television terminal, and which provide primarily alternate commercial and promotional interstitial material during breaks in the main program. The concept of targeted advertising makes use of the feeder channels to allow the television terminals to remain at the program channel or to be switched to the most appropriate feeder channel at the program break, with appropriateness being based on information known about the demographics and viewing habits of users of the television terminals, for example.

Careful management of the feeder channels, including their dynamic switching, and control of the advertising airing on the feeder channels at any given time can greatly increase both the advertisers' likelihood of reaching an interested viewer, as well as the likelihood a viewer is interested in a specific advertisement. The feeder channels are assigned a series of advertisements, and a switching plan is developed that directs individual television terminals to remain at the program channel or to switch from the program channel to a specific feeder channel upon the occurrence of the program break.

The process of managing the program and the feeder channels begins with a number of configuration and set-up steps. First, individual television terminal address information is collected at an operations center, which may be a cable headend site or other central control station. This information is required to uniquely identify each television terminal and to associate with that identifier necessary information to aid in the targeting process. The television terminal address information may be provided to the operations center upon installation or activation of the television terminal in the viewer's home. Other information may be collected from various sources, including viewer surveys, marketing databases correlated by address or zip code+4, for example.

Next, television terminal groups are determined. This is needed if the management of information and targeting to individual television terminals is not practical initially, either due to non-availability of information to the appropriate level of detail, or technology to control and deliver messages and advertisements to an individual television terminal. For a number of target criteria, individual groups are defined. Examples of target criteria include demographic targeting (age/sex/income) and location, such as Area of Dominant Influence (ADI). Each target criteria is then segmented into appropriate groups. For example, the ADI may include Los Angles, Calif. and Washington D.C. New target criteria can be added and the groups redefined after their initial establishment.

For each target criteria, each television terminal is assigned to a group based on the information collected about the television terminal's environment. Once the television terminals are assigned to groups, their group assignments are conveyed to the television terminal and stored therein.

The group assignment information that is stored at the television terminal is able to survive power cycling of the television terminal, and other normal service interruptions. Finally, as groups are modified or group assignments change, the television terminals are notified of the changes. Additionally, the group assignment information is periodically resent to the television terminals to ensure that newly added television terminals and those that have accidentally lost their information are up-to-date.

Since the available feeder channels may be shared across several program channels, their allocation must be managed and optimized. A break management engine determines how many feeder channels are available for each program break. Furthermore, each program break may contain one or more "pods" during which a "commercial spot" or targeted advertisement may be aired. At a minimum, one commercial spot will be available for each pod in a program break (i.e., the spot airing on the same channel as the program). However, the maximum number of spots available for a given program break will depend on the total number of feeder channels available and the alignment of program breaks across all program channels. For some programming, the occurrence of program breaks cannot be predicted in advance of programming airing (e.g., live sports broadcasts). However, for replayed programming, the occurrence of program breaks will be known. Furthermore, some programming may be manually edited to insert program breaks at appropriate intervals. The manual placement of program breaks during the program edit process can be used to force program breaks to line up or be staggered across program channels, permitting more predictable program break placements, as necessary.

A spot placement engine determines the optimum types of spots to be placed based on program break timing and feeder channel availability. The output of the spot placement engine includes an ad playbill that is used at the operations center to schedule the commercial spots. The spot placement engine takes into account likely viewers of a program, the desirability of available spots to those viewers, targeting criteria, and the number of feeder channels available for each program break. The spot being placed on the program channel during the program break serves as the default targeted advertisement (most appropriate to the overall audience) in case the feeder channels are not available for alternate targeted advertising. The default targeted advertisement also supports cable systems that either are not configured to provide targeted advertising, or those cable systems that are receiving other programming.

Once specific spots are selected for each program break, the television terminal groups that should remain with the program channel, and those that should tune to a particular feeder channel at each program break are determined, based on target criteria of interest. Switching of television terminals to the appropriate feeder channels may be conducted using a detailed switching plan, for example. The switching plan is distributed to control points in the system, such as cable headend sites, which are then responsible for the periodic transmission of the switching plans to television terminals. Alternately, the switching plans are distributed directly to the television terminals from the operations center.

After the television terminal receives and stores the switching plan, the television terminal will remain with the program channel or will tune to the appropriate feeder channel during the corresponding program break, if the television terminal is tuned to a program channel that carries programming that cooperates with the multiple channel architecture. The viewer may, at any time, override feeder channel switching by selecting a non-cooperating program channel.

The television terminal will store information indicating that the switch was made. The accumulated switching history information will be collected from the television terminal at a later time for review purposes. For example, upon command from the control points, the television terminal will provide the switching history data to a local (e.g., cable headend) or to a national site. The unique television terminal identification information may also be provided with the collected data. As mechanisms become available to identify specific viewers in a household, the system will allow for individual identification information to also be provided with collected data. Finally, upon collection of the television terminal switching history data, the television delivery system will allow for the return of used television terminal memory space to the television terminals.

As noted above, the program controller interacts directly with television terminals or with network controllers located at cable headends. As an intermediary between the television terminals and the operations center (or other remote site), the cable headend relies on a network controller to perform key cable system operations. In particular, the network controller accommodates regional programming needs by working with other cable headend components. The network controller also performs the system control functions for the cable system. Thus, the network controller performs many functions similar to the program controller.

The network controller is also able to respond to the immediate needs of a television terminal, or a group of television terminals. The network controller can modify a program signal received from the operations center before the program signal is transmitted to the television terminal. Therefore, the network controller enables the delivery system to adapt to the specific requirements of individual television terminals when information on these requirements cannot be provided to the operations center in advance. In other words, the network controller is able to perform "on the fly programming" changes. With this capability, the network controller can handle sophisticated local programming needs such as interactive television services, split screen video, and selection of different foreign languages for the same video.

The network controller makes use of a number of software routines to perform its major functions. In one routine, the network controller modifies the program control information so that changes and additions in programming and advertisements can be accommodated. Such changes and additions include television terminal access authorizations and de-authorizations, and placement of local targeted advertisements in program breaks.

In yet another alternate embodiment, all the functions of the program controller are performed locally at the cable headend sites. That is, all the functions of the program controller are carried out by the network controller installed at the cable headend.

In the above embodiments, program signals are relayed to and information is extracted from the television terminals. The television terminals may be digital set top boxes that connect between a cable television delivery system and a television. Alternately, the television terminals may be components of digital television satellite receivers. Finally, the television terminals may be incorporated into the circuitry of the television, thereby eliminating the need for a separate control device attached to the television.

DESCRIPTION OF THE DRAWINGS

FIG. 3 is a schematic of the operation of the primary components of the system.

FIG. 4e is a diagram of a set top terminal adapted for use with the multiple channel architecture module of FIG. 4a.

FIG. 5 is a more detailed schematic of the hardware of the operations center and CAP.

FIG. 7 is a block diagram showing a Delivery Control Processor Unit and a Computer Assisted Packaging Apparatus.

FIG. 16 is a diagram showing how three cable television systems each with a different bandwidth may use the program delivery system and operations center of the present invention simultaneously.

FIG. 21b is a schematic of an alternative embodiment of FIG. 6a.

DETAILED DESCRIPTION OF THE PREFERRED EMBODIMENT

A. Television Program Delivery System Description

1. Introduction

Figure 1:
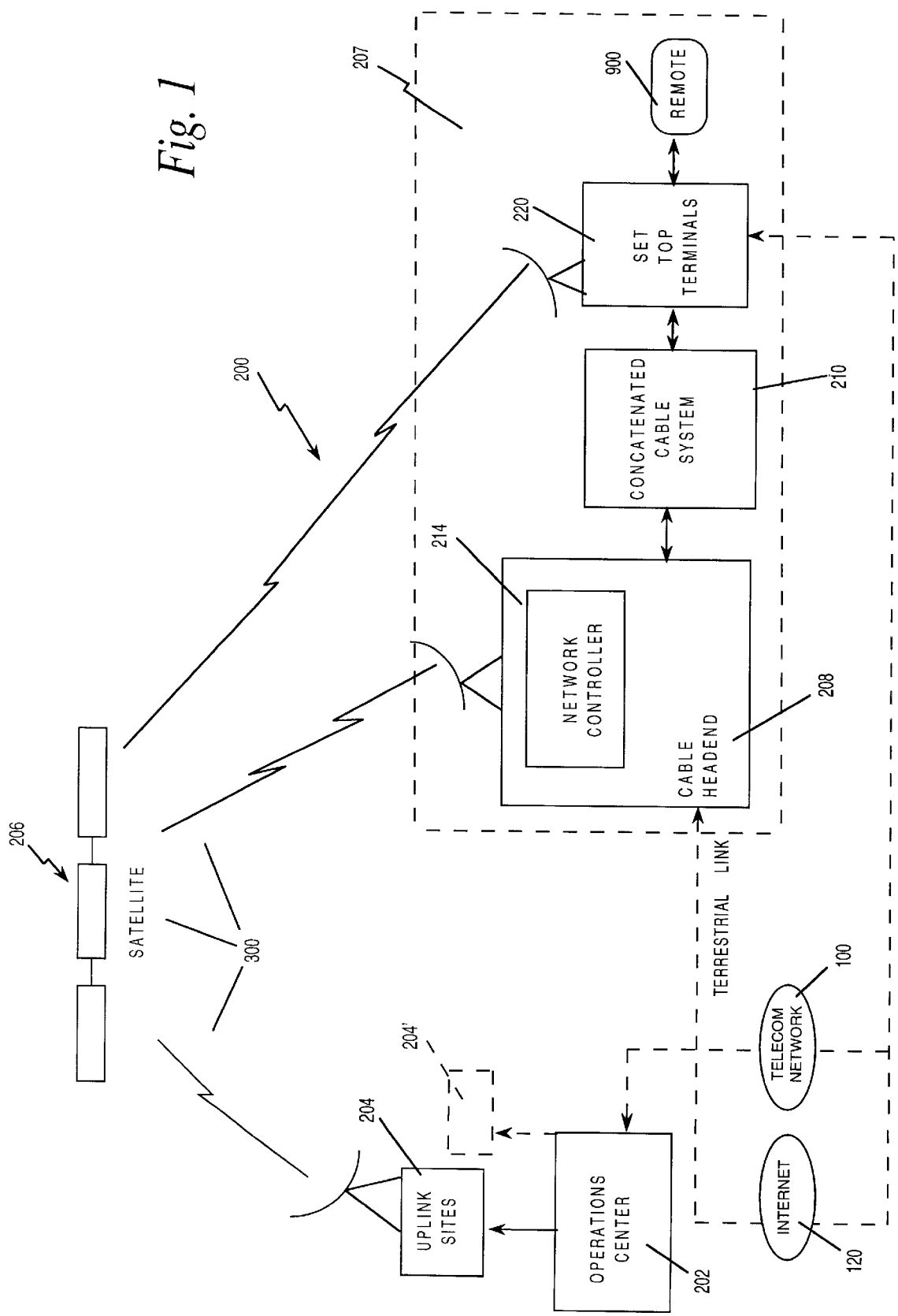
FIG. 1 is a diagram of the primary components of the television delivery system.

FIG. 1 shows the present invention as part of an expanded television program delivery system 200 that dramatically increases programming capacity using compressed transmission of television program and targeted advertisement signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In an embodiment, a program delivery system 200, in conjunction with a conventional concatenated cable television system 210, provides television program and control signals to subscribers. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors that are components of a television terminal. The program delivery system 200 transports the digital signals to a cable headend 208 where the signals are transmitted through a concatenated cable television system 210. Within the cable headend 208, the received signals may be decoded, demultiplexed, managed by a local central distribution and switching mechanism, combined and then transmitted to the television terminal located in each subscriber's home over the cable system 210. Although concatenated cable systems 210 are the most prevalent transmission media to the home, telephone lines, cellular networks, fiber optics, Personal Communication Networks and similar technology for transmitting to the home can be used interchangeably with this program delivery system 200.

The program delivery system 200 can also communicate with subscribers using a telecommunications system 100 and an Internet 120. The telecommunications system 100 communicates using modems located at the operations center 202, the cable headend 208 and at the subscribers' homes, for example. Alternately, the telecommunications system may connect directly to the television terminal. The Internet 120 may also be directly connected to the television terminal, or may be connected to a separate processor (such as a personal computer, not shown), which in turn connects to the television terminal.

In another embodiment, the functions of the operations center 202 and the cable headend 208 may be combined. In this embodiment, the operations center 202 may provide program signals directly to the television terminal using either the cable delivery system 210 or a digital satellite delivery system.

The delivery system 200 has a reception region 207 with an in-home decompression capability. This capability is performed by a decompressor housed within the television terminal. In an embodiment, the television terminal is a set top terminal 220 that is installed in each subscriber's home. Alternately, the television terminal may be a component of a satellite receiver, or may be incorporated into the circuitry of the television itself. The discussion that follows will refer to the set top terminal 220. However, it should be understood that any of the television terminals listed above could perform the same functions as the set top terminal 220. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Alternately, the digital program signals may be stored in a random access memory (RAM) in the television terminal for later conversion and display. Control signals are likewise extracted and decompressed and then either executed immediately or placed in local storage such as the RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

Figure 2:
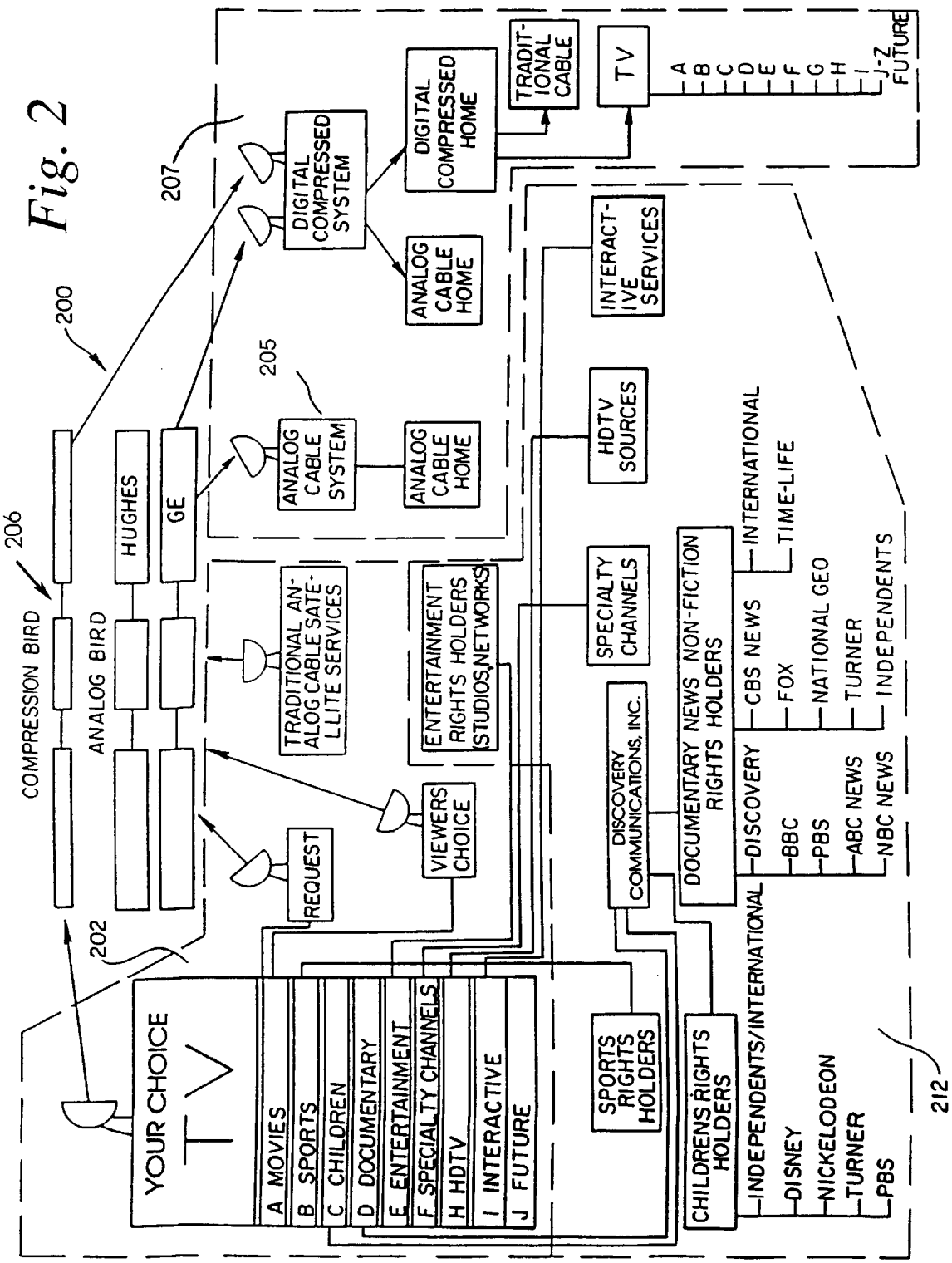
FIG. 2 is an overview of the television delivery system operations.

The operations center 202 performs two primary services, packaging television programs, and advertisements, and generating the program control information signal. At the operations center 202, television programs and advertisements are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Advertisements are provided by individual advertisers and include commercials, infomercials and promotions that may air during or between airing of television programs. Once the television programs and advertisements are received from the external program sources and from the advertisers, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

Figure 2A:
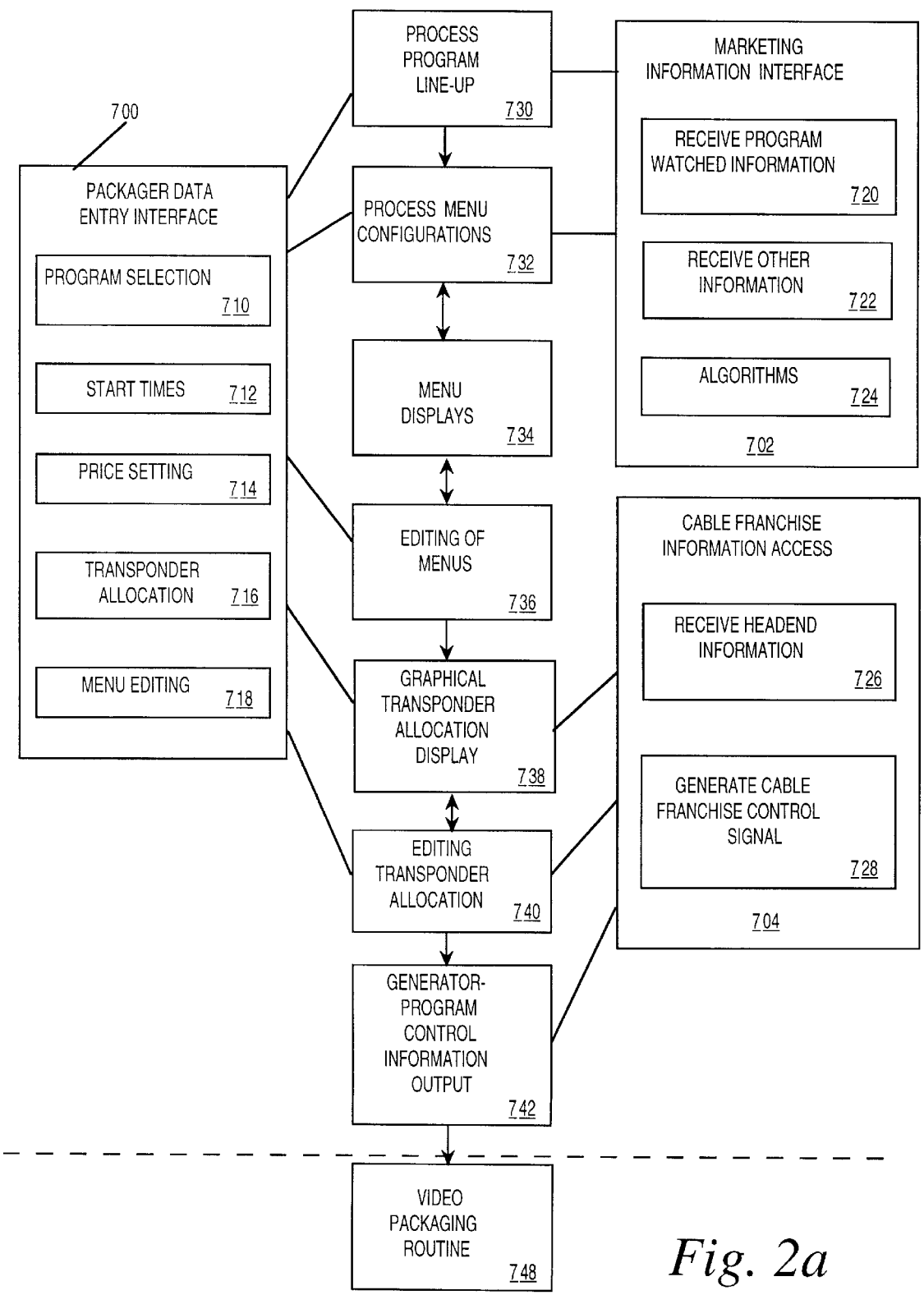
FIG. 2a is a block diagram of the marketing information routine.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. Extracts of customer purchases will be provided to the Operations Center 202. These extracts of information will be formatted and correlated with customer demographics for marketing purposes by the Marketing Information Interface (MII) 702. The MII 702 is shown in FIG. 2a. The Marketing Information Interface (MII) 702 subroutine interfaces the processing and editing subroutines with marketing data. This interface regularly receives programs watched information from billing sites 720, cable headends 208, or set top terminals 220. In addition, other marketing information 722 such as the demographics of viewers during certain time periods may be received by the MII 702. The MII 702 also uses algorithms 724 to analyze the program watched information and marketing data 720, 722, and provides the analyzed information to the processing and editing subroutines.

The process program line-up subroutine 730 uses information from the MII 704 and Packager Data Entry Interface (PDEI) 700 to develop a program line-up. Algorithms are used to assign programs in time slots.

The operations center 202 may also "insert" directions for filling local available program time in the packaged signal to enable local cable and television companies to fill the program time with local advertising and/or local programming. Consequently, the local cable headends are not constrained to show only programs transmitted from the operations center 202. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP. The CAP may be used to package advertisements, although the process, which will be described later, may differ from that used for television programs.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, up converted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

With reference to FIG. 3, as an intermediary between the set top terminals 220 and the operations center 202 and master control uplink site 211 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers' home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. As noted above, the functions of the set top terminal 220 may be incorporated into the television, so that a separate component is not required to interact with the program delivery system 200. Alternately, the functions of the set top terminal may be incorporated into a satellite television receiver. When the set top terminal 220 is used, it is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message. Finally, the set top terminal 220 may store program signals, such as targeted advertisements, for later conversion and display.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In an embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Operations Center with Computer Assisted Packaging System

Figure 4:
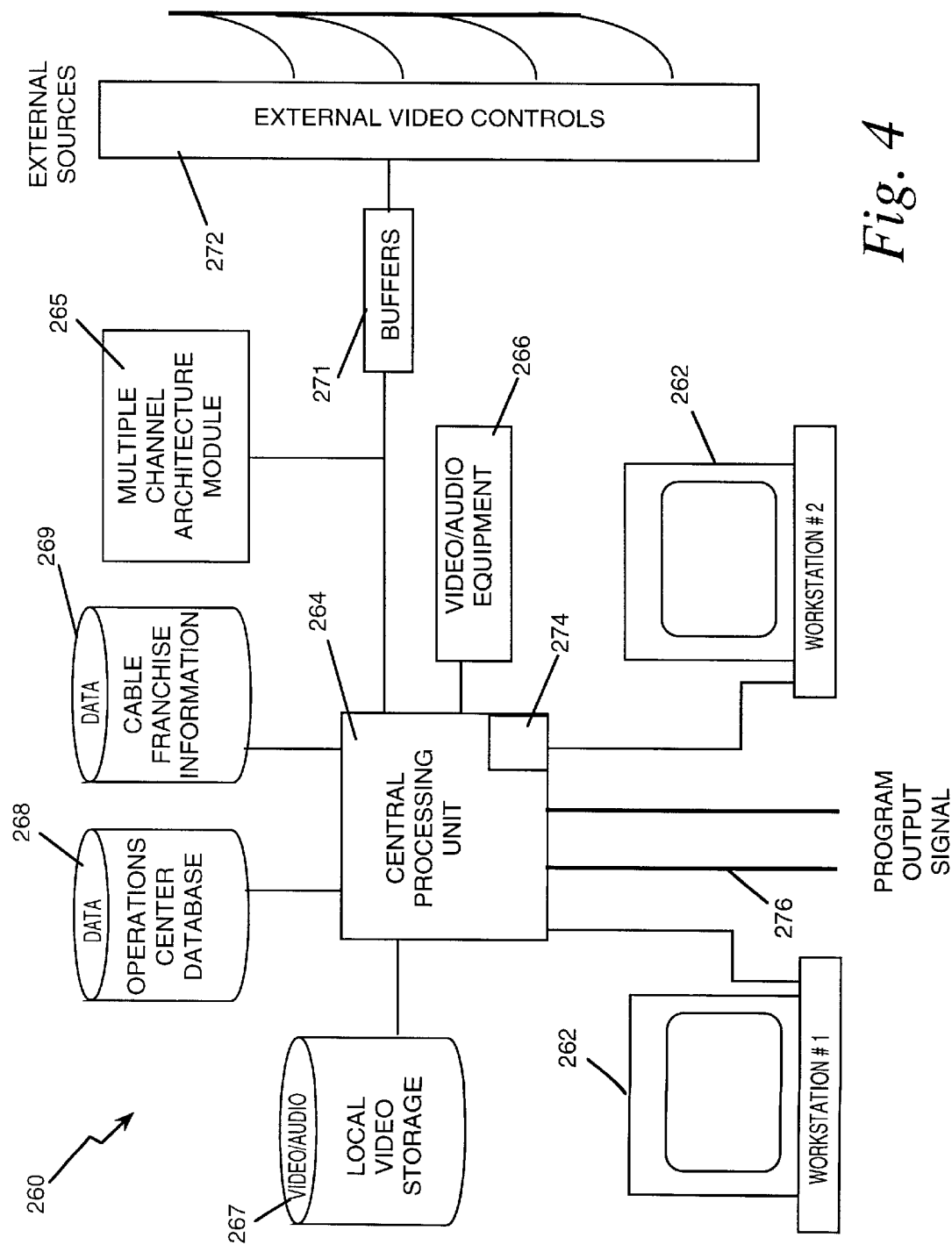
FIG. 4 is a schematic of the primary components of the Computer Assisted Packaging System (CAP).

FIG. 4 broadly shows the configuration for the computer assisted packaging system (CAP) 260 of the operations center 202. The primary components of the CAP 260 consist of multiple packager workstations 262, a central processing unit 264, a multiple channel architecture module 265, video/audio editing equipment 266, and one or more databases 268 and 269. Additional remotely located databases, such as local video storage database 267, and buffers 271 and controllers 272 for external program feeds make up the peripherals of the CAP system 260.

The heart of the CAP 260 is a central processing unit 264 which communicates with all the component parts of the CAP 260. The central processing unit 264 can be a powerful PC, a mini-computer, a mainframe or a combination of computing equipment running in parallel. The central processing unit 264 includes all the necessary interconnections to control peripheral equipment such as the external video controls 272. The central processing unit 264 has sufficient memory 274 to store the program instructions of the subroutines which operate the CAP 260.

The CAP 260 receives data from one or more databases, such as the operations center Database 268 and the Cable Franchise Information Database 269 shown in FIG. 4. In addition, separate databases are maintained of viewer information, such as demographics and programs viewed. The CAP 260 can control the reception of external sources by enabling and disenabling the external video controls 272. The external video controls 272 include buffers to delay as necessary external programs received by the operations center 202.

The multiple channel architecture module 265 allows the operations center 202 or the cable headends 208 to broadcast multiple program signals to each of the set top terminals 220, with the set top terminals 220 then determining which of the multiple channels to switch to, based on a switching plan generated by the multiple channel architecture module 265, and a set top terminal assignment matrix generated by the multiple channel architecture module 265 and stored in the set top terminal 220. The use of multiple channels is particularly advantageous when targeting advertisements to different viewers. The construction and operation of the multiple channel architecture module 265 will be described in detail later with reference to FIGS. 4a–4e.

The functions of the video/audio equipment 266 include digitizing analog programs, digitizing and compressing analog programs (in a single step, e.g., MPEG), and compressing digital program signals as requested by the central processing unit 264.

The CAP 260 receives video and audio from two sources: internally from a local video storage 267 and externally from external sources through external video controls 272. When necessary, video is manipulated, formatted and/or digitized using video/audio equipment 266 which is controlled by CAP 264.

Referring back to FIG. 2, an overview of an operating cable television menu driven program delivery system 200 highlighting various external programming signal sources 212 is depicted. The operations center 202 is shown receiving external programming signals which correspond to particular programming categories that are available for a subscriber's viewing. These external signals may be in analog or digital form and may be received via landline, microwave transmission, or satellite. Some of these external signals may be transmitted from the program source 212 to the operations center 202 in compressed digital format or other nonstandard digital formats. These external signals are received and packaged with programming that is stored at the operations center 202.

Examples of external program sources 212 shown in FIG. 2 are: Sporting events, children's programs, documentaries, high definition TV sources, specialty channels, interactive services, weather, news, and other nonfiction or entertainment. Any source that can provide either audio or video or both may be utilized to provide programming to the operations center 202.

In order to achieve the required throughput of video and audio information for the system, digital compression techniques are employed. A television signal is first digitized.

The object of digitization is two-fold: First, in the case of an analog signal, like a television picture, digitization allows the signal to be converted from a waveform into a digital binary format. Secondly, through the use of digital compression techniques, standard digital formats are designed to have the resulting pictures or video stills take up less space on their respective storage mediums. Essentially, as described below, a standard digital format will define the method of compression used.

There are three basic digital compression techniques: within-frame (intraframe), frame-to-frame (interframne), and within-carrier. Intraframe compression processes each frame in a television picture to contain fewer visual details and, therefore, the picture contains fewer digital bits. Interframe compression transmits only changes between frames, thus omitting elements repeated in successive frames. Within-carrier compression allows the compression ratio to dynamically vary depending upon the amount of changes between frames. If a large number of changes occur between frames, the compression ratio drops from, for example, sixteen-to-one to eight-to-one. If action is intense, the compression ratio may dip to four to one.

Several standard digital formats representing both digitizing standards and compression standards have been developed. For example, JPEG (joint photographic experts group) is a standard for single picture digitization. Motion picture digitization may be represented by standards such as MPEG or MPEG2 (motion picture engineering group specifications). Other proprietary standards have been developed in addition to these. The preferred embodiment uses the MPEG-2 standard of coding and those of ordinary skill in the art are presumed to be familiar with the MPEG-2 standard. The MPEG-2 Systems Working Draft Proposal from the Systems Committee of the International Organization For Standardization, document ISO/IE JT1/SC29/WG11 "N0531" MPEG93 dated Sep. 10, 1993, is hereby incorporated by reference. Although MPEG and MPEG2 for motion pictures are preferred in the present invention, any reliable digital format with compression may be used with the present invention.

Various hybrids of the above compression techniques have been developed by several companies including AT&T, Compression Labs, Inc., General Instrument, Scientific-Atlanta, Phillips, and Zenith. As is known by those skilled in the art, any of the compression techniques developed by these companies, and other known techniques, may be used with the present invention.

With reference to FIG. 4, the human intervention in this system is conducted by a programmer or program packager operating from the one or more work stations 262 connected to the system. These work stations 262 are preferably intelligent work stations with large CRT screens. In the preferred embodiment, a suitable keyboard, mouse and color monitor are used with the workstation. From these work stations, the packager can create program lineups, prioritize programs, initiate dynamic menu allocation, initiate dynamic bandwidth allocation, design menus, place program names and descriptions onto menus, create menus with still and live video, move text on menus, change the colors of objects on menus and perform various other tasks for the program delivery system 200.

Almost any operations center 202 function that normally requires human intervention can be conducted at the packager workstation 262. Although data entry for the databases can be performed manually at the workstations 262, it is preferred that the data entry be completed through electronic transfers of information. Alternatively, the data can be loaded from customary portable storage media such as magnetic disks or tape.

Figure 8:
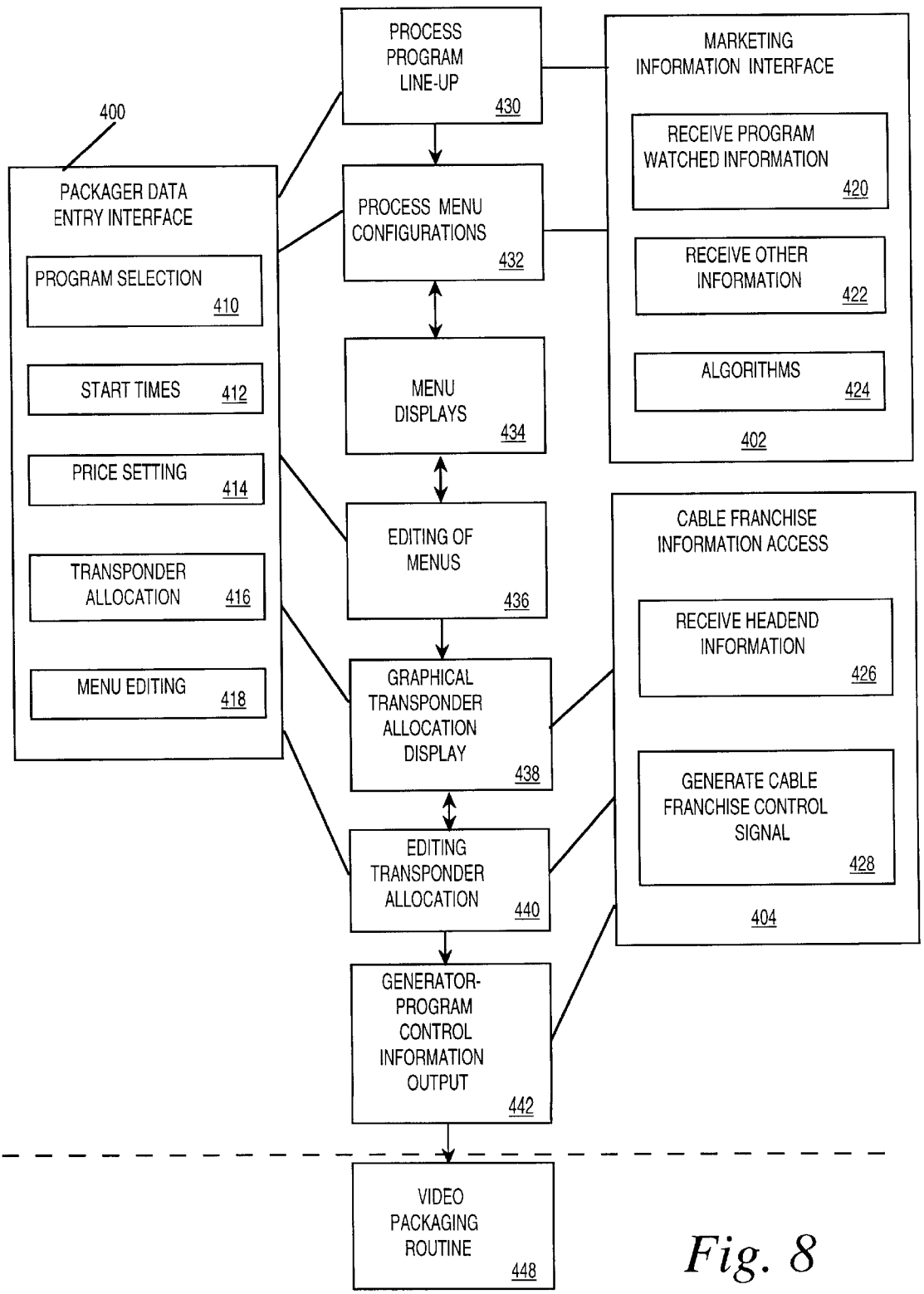
FIG. 8 is a schematic of the subroutines for the CAP software.

An integral part of the Computer Assisting Packaging system is the retrieval of viewer data, and the assimilation of that data into the program packaging method (especially the menu configuration) as discussed in reference to FIG. 8 MII 402. This involves two main steps, first, retrieval of raw data from the set top terminals, and then filtering and presenting that data. Each headend 208 compiles the viewer data, and then sends it verbatim to the operations center 202. Alternately, the operations center 202 can collect the viewer data directly from the set top terminals 220. The raw data is necessary because different responsibilities of the operations center 202 require different parts of the raw information. Also a record must be kept of overall data. Once the raw data is assembled at the operations center 202, the data is filtered for each application.

The raw data gathered includes but is not limited to:

What programs a viewer purchased and when it was purchased

What channel a specific viewer watched and for how long.

Which of the multiple channels the set top terminal 220 tuned to during a program break.

Click stream data recorded during operation of the set top terminal 220.

This information can then be used to calculate the following:

How many viewers watched a particular program.

Which targeting group a viewer belongs to.

Peak viewing times for different categories of shows.

Buy rates for particular menu positions.

Rates charged to advertisers for their commercials.

Menu creation, both automatically and manually, is one of the major CAP functions that involves the incorporation of the raw data. An automated software procedure (such as the EIS) analyzes the data and, using certain heuristics, creates the menus.

One heuristic, for example, is that when a show is not ordered frequently, it is moved closer to the top of the menu for greater visibility. The filtering of the data allows it to be sorted and indexed for display to the user. The program data can be filtered into a new database containing program names and indexed by the number of times each program was purchased. The data can also be indexed by buy times and program categories.

Certain metrics are established to help in evaluating the data. Using the EIS or similar software, sales by menu placement, cost, category and lifespan can be pulled up for viewing in graphic presentation. The graphic presentation, in the form of line or bar graphs, help the packager recognize any trends in the data. For example, the first movie on a movie menu might not have sold as well as a second movie listed. A chart can be pulled up to reveal that the first movie has been at the top of the menu for two weeks and buy rates are naturally falling off. Steps can then be taken to move items in the menus to correct this, though many of these steps are automated in the menu creation system. Suggested changes can be displayed to help the user in this task.

The automated procedures create menus that are distinct between headends 208 because of demographic differences in the viewing audience. To help with this, a separate database of viewer demographics exists and is frequently updated. The headends 208 are able to alter the menu positions in order to further tailor the presentation, or to add local shows and local targeted advertisements. Any changes to the menus are sent back to the operations center 202 at the same time as the viewer data, in order to prevent erroneous data analysis. Menu changes at the cable headend are described in detail in co-pending patent application Ser. No. 08/735,549, entitled Network Controller for a Cable Television System, filed by the same assignee.

Another use for the indexed data is creation of marketing reports. Programming changes are helped by accurate information on viewer preference. Also viewer purchasing trends, and regional interests can be tracked.

In the preferred embodiment, an Executive Information System (EIS) is used to give high level access to both "buy" (what the customer purchases) and "access" (when the product was viewed, how often and duration) data. The EIS represents information in both a graphical and summary report format. "Drill down" functions in the EIS help the packager derive the appropriate product (product refers to programs, events or services) mix.

The purpose of the EIS is to provide an on-line software tool that will allow for real-time evaluation of current product positioning. The design of the system consists of user friendly icons to guide the user through available functions. The functionality in the system provides general information on current programming sales status. By working through the tiers in the system, the user has access to more specific information. The system is designed to shield the user from a long learning curve and information overload.

The graphical tools allow for analysis of current data through the use of multiple graph types such as line graphs, bar and pie charts. These tools will allow the user to manipulate independent variables such as time (hour, day of the week, week, month), demographic information, program category information (genre, property, events), headend information and pricing information for determining the appropriate programming mix within the allotted time slots.

The system also allows the packager to derive expected monetary returns through program line-ups by integrating outside industry databases. For instance, the system could be used to determine expected returns from a particular program by correlating buy information from the existing programs in the line up with a viewer ratings service database to determine the outcome of programs within a particular genre not in the current line up.

Report tools within the EIS aggregate buy access at the highest level. Due to the volume of available information statistical analysis methods are used for deriving marketing intelligence within the EIS.

A yield management tool is incorporated within the EIS. The yield management tool encompasses operations research techniques, statistical methods and neural net technology to decide program mix as it pertains to program substitutes, program complements, time slice positioning, repetitions and menu positioning.

This system is automated to the extent of providing viable alternative as to the proposed product mix. The system encompasses a Monte Carlo simulation for developing alternative product mix scenarios. The system feeds from both internal data and external industry data sources to provide expected revenue projections for the different scenarios. Other software subroutines of the CAP will automatically call upon the EIS to assist the program in important decision making, such as menu configuration and transponder allocation. Human interaction is required to change marketing parameters for fine tuning the desired product scheduling.

Although the packaging of the program information and programs, including the creation of program control information, program lineup and menu designing configuration, is conducted at the CAP 260, all other functions of the operations center 202 can be controlled by a second separate processing unit (shown in FIG. 5 at 270). This second processing unit 270 is the Delivery Control Processing Unit 270, and can perform the tasks of incorporating the program control information signal from the CAP 260, coordinating the receipt and combining of external program video/audio and internal video/audio and combining the signals as necessary for transmission. This distribution of functions among the CAP 260 and Delivery Control Processing Unit 270 allows for greater speed and ease of use.

FIG. 5 shows a more detailed diagram of the CAP 260 and the Delivery Control Processor Unit 270. Once external and stored digital and analog sources have been converted into a standard digital format 274, they are input into standard digital multiplex equipment 273 (of the type manufactured by Scientific Atlanta, General Instruments, and others). Additionally, the Program Control Information Signal 276 is input into the digital multiplex equipment 273. These inputs 274, 276 are multiplexed appropriately under the control of the Delivery Control Processor Unit 270 as commanded by the CPU 264. The Delivery Control Processor Unit 270 is also responsible for the generation of the Program Control Information Signal 276 based on information received from the CPU 264. The Delivery Control Processor Unit 270 allows for the off-loading of real-time and near real-time tasks from the CPU 264. The CPU 264, as described earlier, processes information within its database and provides user access to the CAP 260 via multiple user workstations 262

The high-speed digital output 278 from the digital multiplex equipment 273 is then sent on to the compression (if necessary), multiplexing, modulation and amplification hardware, represented at 279.

C. The Program Control Information Signal

Table A is an example of some information that can be sent in the program control information signal to the set top terminals 220. The program control information signal generated by the operations center 202 provides data on the scheduling and description of programs via the network controller 214 or, in an alternate configuration, directly to the set top terminal 220 for display to the subscriber.

In the preferred embodiment, the program control information signal 276 is stored and modified by the network controller 214 and sent to the set top terminal 220 in the form of a set top terminal control information stream (STTCIS). This configuration accommodates differences in individual cable systems and possible differences in set top converter or terminal devices. The set top terminal 220 of the present invention integrates either the program control signal 276 or the STTCIS, together with data stored in the memory of the set top terminal 220, to generate on-screen menu displays for assisting the subscriber in choosing programs for viewing. (Throughout the description the term "program control information" is being used to indicate control information coming from the cable headend 208 to the set top terminal 220, whether it is sent directly from the operations center 202, processed by the network controller 214, and then forwarded to the set top terminal as STTCIS, or transmitted over telephone lines.)

With further reference to Table A below, the types of information that can be sent via the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

The goal of the menu driven program selection system of the present invention, described in greater detail in a co-pending U.S. patent application entitled SET TOP TERMINAL FOR CABLE TELEVISION DELIVERY SYSTEM, Ser. No. 08/160,194, owned by the assignee of the present invention and incorporated herein by reference, is to allow the subscriber to choose a program by touring through a series of menus utilizing a remote control 900 for cursor movement. The final choice in the series of menus will identify one particular channel and one time for activation of that channel. Armed with a channel and activation time the set top terminal 220 can display the selected program on the television for the viewer. To achieve this goal, an intelligent alpha-numeric code is assigned to each program. This alpha-numeric code identifies the category of the program, the menu in which the program should be displayed, its transmission time(s), and the position on the menu that the program should be displayed. In a preferred embodiment, the program control information, including menu codes, is sent continuously from the operations center 202 to the network controller 214, and ultimately to the set top terminal 220. For example, four hours worth of programming information can be sent via the program control information signal continuously in the format shown in Table A.

TABLE A shows the basic information that is needed by the set top terminal 220. The program descriptions shown are coded abbreviations. For example, C stands for comedy, N for news, S for sports, A for cartoons, and TX for text. If there is a textual description for a program, such as a movie, the description may be given following that program's coded description or may be communicated following the four hours of programming information. As is shown in the coded listing, program descriptions for programs greater than a half hour in length need not be repeated (each half hour). The video description code informs the set top terminal 220 whether there is still or live video available to advertise the program.

TABLE A

| | *Program name | *Program length | *Menu code | Description | Video |
|---|---|---|---|---|---|
| | | | 12 PM | | |
| 1 | Cheers | .5 | E24 | C | N |
| 2 | Terminator | 2.0 | A33 | Tx | S |
| 3 | Prime Time | 1.0 | D14 | N | N |
| 4 | Football Special | .5 | B24 | S | N |
| | | | 12:30 PM | | |
| 1 | Simpsons | .5 | E14 & C13 | C | S |
| 2 | Football Game | 3.0 | B13 | S | N |

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, Jan. 1, 1994, represent the date. The following four characters, 1600 represent the start time which is followed by the length of the program and the program name. This entry represents a sports show, a college football game, which will be aired at 4:00 PM on New Years day 1994.

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection. In the preferred embodiment, the menu codes are generated at the operations center 202.

Table B shows an example Events Table that may be downloaded to a set top terminal 220 using the Event Data file which contains information about events and pricing. As shown in the table, the three columns of the Events Table identify the field number, the field itself and the type of information downloaded in the Event Data file. The first column contains the field numbers 1 through 11. The middle column contains the corresponding field parameters, including the event type, event ID, global channel ID, price, start time, end time, start date, end date, P-icon, name and description. The third column contains corresponding field type information. As shown in this field type information typically consists of an unsigned integer; hours, minutes and seconds; months, day and year; and ASCII character identifier.

TABLE B

| Field # | Field Type | |
|---|---|---|
| 1 | Event Type<br>1 = YCTV<br>2 = Pay-Per-View<br>3 = Reg. TV | Unsigned Int |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event data file. In particular, Table C shows two data streams corresponding to two event types. The first data stream identifies a YCTV event in the first field. The second field designates the event ID, which is 1234 in this example. The third field includes the global channel ID number two. The fourth field indicates the cost of 50 cents for this event. The fifth and sixth fields indicate the respective start and end times of 3:00 a.m. to 3:00 p.m., respectively. The seventh and eighth fields show the corresponding start and end date, designated as Aug. 25, 1993 and Aug. 27, 1993, respectively. Field nine indicates the P icon set to a graphics file. Finally, fields ten and eleven indicate the name and description of the event selected, which in this case is Sesame Street™ and Barney™. The second data stream in the Event.Dat example shown in Table C includes analogous information for Terminator IV™, which is designated in field one as a pay-per-view event.

TABLE C

Event Data Example

1'1234'2'50'03:00:00'15:00:00'08/25/93'08/27/93'pbs.pcx'Sesame Street & Barney's Sesame Street and Barney Abstract
2'1234'2'50'20:00:00'22:00:00'08/25/93'08/25/93't4.pcx'Terminator 4'Terminator 4 Abstract

---

The program control information signal 276 and STTCIS can be formatted in a variety of ways and the on-screen menus can be produced in many different ways. For instance, if the program control information signal 276 carries no menu format information, the menu format for creating the menus can be fixed in ROM at the set top terminal 220. This method allows the program control signal 276 to carry less information but has the least flexibility since the menu formats cannot be changed without physically swapping the ROM holding the menu format information. In the preferred embodiment, the menu format information is stored at the set top terminal 220 in temporary memory either in a RAM or EPROM. This configuration provides the desired flexibility in the menu format while still limiting the amount of information needed to be communicated via the program control information signal 276. New menu format information would be sent via the program control information signal 276 or the STTCIS to the set top terminals 220 each time there was a change to a menu.

In an embodiment, the menus remain fixed and only the text changes. Thus, the program control information signal 276 can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information.

Figure 6A:
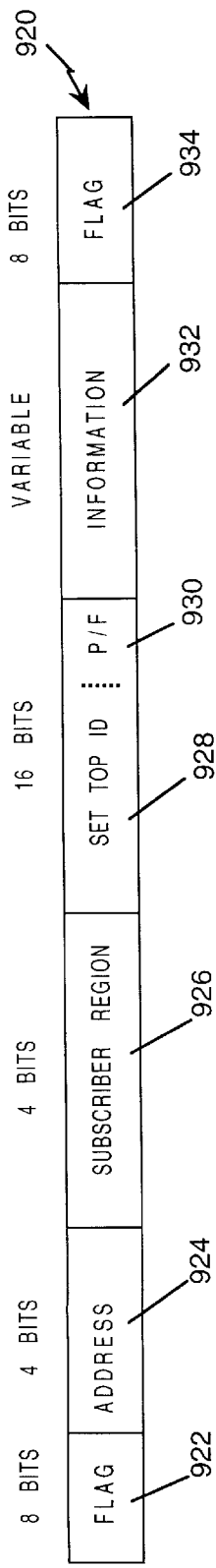
FIG. 6a is a chart of the program control information carried by the program control information signal.
Figure 6B:
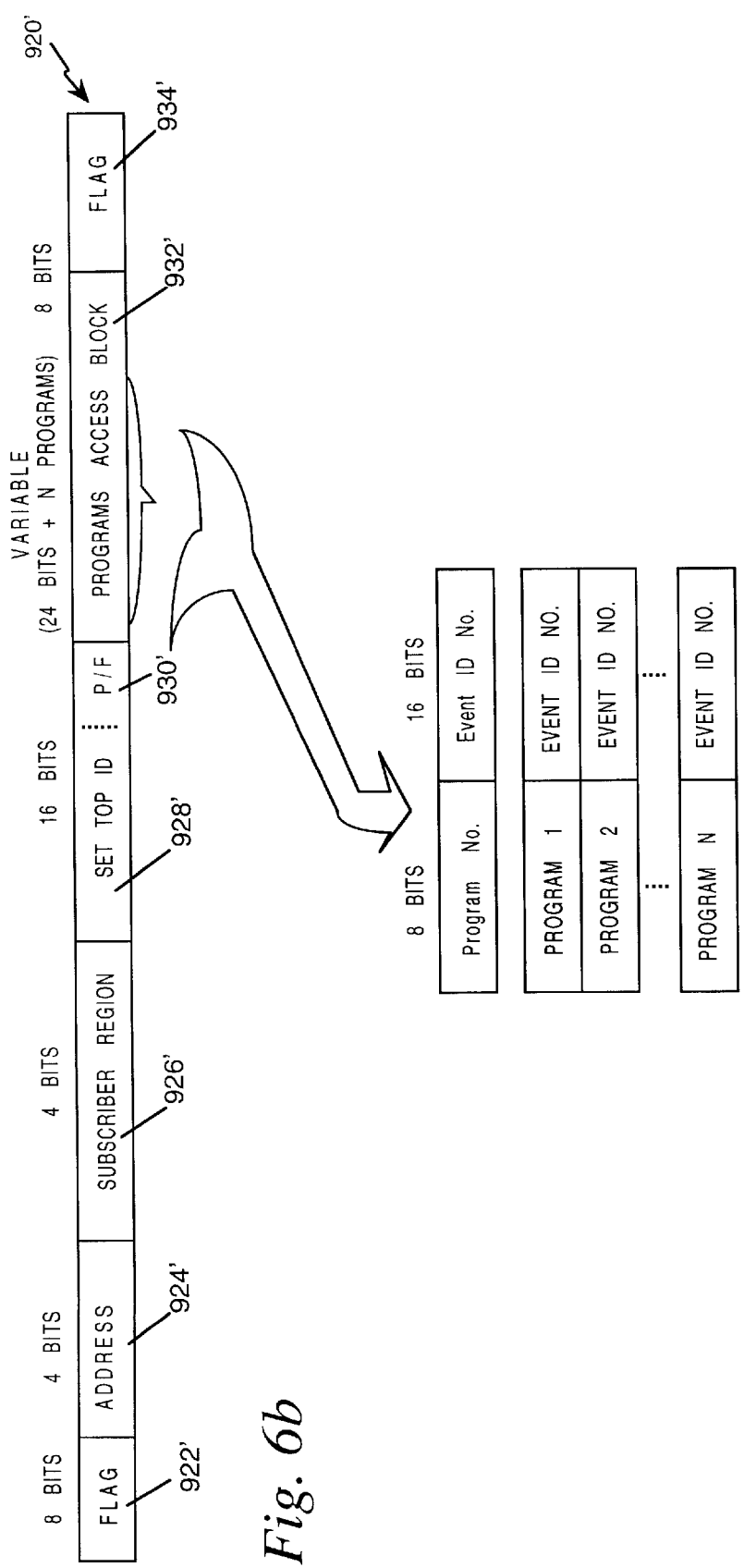
FIG. 6b shows a bit-wise data format for program control information.

FIGS. 6a and 6b, particularly FIG. 6a, show a data format 920 at the bit-level for one embodiment of a program information signal 276. This frame format consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence that appears at the beginning 922 and end 927 of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response 920' (FIG. 6b) from the set top terminal 220 addressed. The polling response 920' is substantially similar to the from format 920, and is commonly numbered, but with a prime (') designation appended for clarity. The frame format 920 also provides a variable-length information field 932 for other data transmissions, such as information on system updates. The frame format ends with an 8-bit flag 934 (or trailing flag) that is identical in format to the leading flag 922, as set forth above. Other frame formats, such as MPEG, for example, will be apparent to one skilled in the art and can be easily adapted for use with the system.

D. Multiple Channel Architecture

To efficiently convey targeted advertisements to a desired audience, the operations center 202 may employ a multiple channel architecture that includes program channels and a number of feeder channels to carry alternate programming, such as alternate targeted advertising. The program channel carries a main program, such as a broadcast television show, and accompanying advertisements. The feeder channels are ancillary video/audio channels, which are delivered to the set top terminal 220, and which provide primarily alternate commercial and promotional interstitial material for use during program breaks. The concept of targeted advertising makes use of feeder channels to allow for the set top terminals 220 to be switched to the most appropriate feeder channel at a program break, with appropriateness being based on information known about the demographics and viewing habits of users of the set top terminals 220, for example.

Careful management of the feeder channels, including their dynamic switching and control of the advertising airing on the feeder channels at any given time can greatly increase both the advertisers' likelihood to reach an interested viewer, as well as the likelihood a viewer is interested in a specific advertisement. The feeder channels are assigned a series of advertisements and a switching plan is developed at the operations center 202 that directs individual set top terminals 220 to remain at the program channel or to switch from the program channel to a specific feeder channel upon the occurrence of the program break.

The process of managing the feeder channels begins with a number of configuration and set-up steps. First, individual set top terminal address information is collected at the operations center 202. This information is required to uniquely identify each set top terminal 220 and to associate with that identifier necessary information to aid in the targeting process. The set top terminal address information may be provided to the operations center 202 upon installation or activation of the set top terminal 220 in a viewer's home. Other information may be collected from various sources, including viewer surveys, marketing databases correlated by address or zip code+4, for example.

Next, set top terminal groups may be determined. This is needed if the management of information and targeting to individual set top terminals 220 is not practical initially, either due to non-availability of information to the appropriate level of detail, or technology to control and deliver messages and advertisements to individual set top terminals 220. For a number of target criteria, individual groups are defined. Examples of target criteria include demographic targeting (age/sex/income) and Area of Dominant Influence (ADI). Each target criteria is then segmented into appropriate groups. For example, the ADI may include Los Angles, Calif. and Washington D.C. New targeting criteria can be added and the groups redefined after their initial establishment.

For each targeting criterion, each set top terminal 220 is assigned to its appropriate group based on the information collected about the set-top terminal's environment. Once the set top terminals 220 are assigned to groups, their group assignments are conveyed to the set top terminal 220 and stored there.

The group assignment information that is stored at the set top terminal 220 is able to survive power cycling of the set top terminal 220, and other normal service interruptions. Finally, as groups are modified or group assignments change, the set top terminals 220 are notified of the changes. Additionally, the group assignment information is periodically resent to the set top terminals 220 to ensure that newly added set top terminals 220 and those that have accidentally lost their information are up-to-date.

Since the available feeder channels may be shared across several program channels, their allocation must be managed and optimized. A break management engine determines how many feeder channels are available for each program break. Each program break may contain one or more "pods" during which a "commercial spot" or targeted advertisement may be aired. At a minimum, one commercial spot will be available for each pod in a program break (i.e., the spot airing on the same channel as the program). However, the maximum number of spots to be available for a given program break will depend on the total number of feeder channels available and the alignment of program breaks across all program channels. For some programming, the occurrence of program breaks cannot be predicted in advance of programming airing (e.g., live sports broadcasts). For replayed programming, the occurrence of program breaks will be known. Furthermore, some programming may be manually edited to insert program breaks at appropriate intervals. The manual placement of program breaks during the program edit process can be used to force program breaks to line up or be totally staggered across program channels, permitting more predictable program break placements, as necessary.

Finally, targeted advertisements can be assigned to program breaks based on program breaks that occur in a particular program (e.g., "All My Children"). Alternately, targeted advertisements may be assigned to program breaks based on program categories (e.g., sports). In the discussion that follows, the targeted advertisements are assigned based on a specific program. Algorithms for assigning targeted advertisements based on program categories will be described later with respect to FIGS. 28–36.

A spot placement engine determines the optimum types of spots to be placed based on break timing and feeder channel availability. The output of the spot placement engine includes an ad playbill that can be used for billing, analysis and commercial trafficking purposes. The spot placement engine takes into account likely viewers of a program, the desirability of available spots to those viewers, targeting criteria, and the number of feeder channels available for each program break. The spot being placed in the program break serves as the default targeted advertisement (most appropriate to the overall audience) in case feeder channels are not available for alternate targeted advertising. The default targeted advertising also supports cable system that either are not configured to provide targeted advertising, or are receiving other programming.

Once specific spots are selected for each program break, the set top groups that should remain with the program channel, and those that should tune to a particular feeder channel at each program break are determined, based on target criteria of interest. To accomplish the switching of set top terminals 220 to the appropriate feeder channels requires a detailed switching plan. The switching plan is distributed to the necessary control points in the system, such as the cable headends 208, which are then responsible for the periodic transmission of the switching plans to the set top terminals 220. Alternately, the switching plans are distributed directly to the set top terminals 220 from the operations center 202.

After the set top terminal 220 receives and stores the switching plan, the set top terminal 220 will tune to the appropriate feeder channel during the corresponding program break, if the set top terminal 220 is tuned to a program channel that carries programming that cooperates with the feeder channel architecture. The viewer may, at any time, override feeder channel switching by selecting a non-cooperating program channel.

The set top terminal 220 will store information indicating that the switch was made. The accumulated switching history information will be collected from the set top terminal 220 at a later time for review purposes. For example, upon command from the control points, the set top terminal 220 will provide for the transparent collection of switching history data to a local (head-end) or national site. The unique set top terminal identification information will be provided with the collected data. As mechanisms become available to identify specific viewers in a household, the system will allow for individual identification information to also be provided with collected data. Finally, upon collection of the set top terminal switching history data, the television delivery system 200 will allow for the return of used set-top memory space to available pools for future use.

Figure 4A:
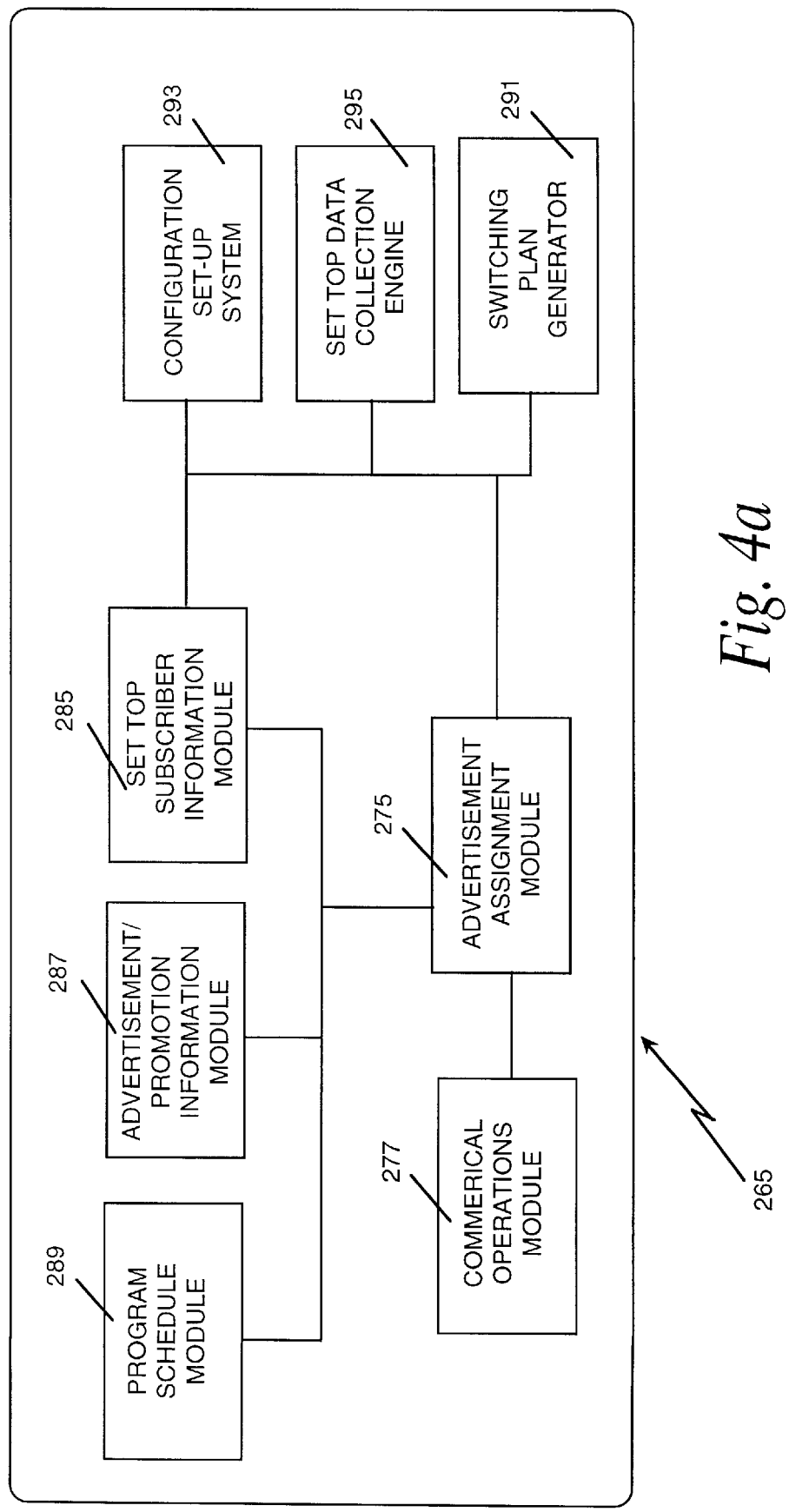
FIG. 4a is a diagram of a multiple channel architecture module.

FIG. 4a shows the multiple channel architecture module 265, according to an embodiment of the invention, that resides at the operations center 202. In FIG. 4a, the multiple channel architecture module 265 includes an advertisement assignment module 275, which will be described later in more detail. The advertisement assignment module 275 receives program schedule and clock information regarding broadcast programs from a program schedule module 289; advertisement/promotional information from an advertisement/promotional information module 287; and set top terminal subscriber information from a subscriber information module 287. The advertisement assignment module 275 provides outputs to a commercial operations module 277 and a switching plan generator 291.

The set top subscriber information module 285 receives inputs from a configuration set-up system 293 and a set top data collection engine 295. The set top subscriber information module 285 provides outputs to the configuration set-up system 293, the switching plan generator 291 and the advertisement assignment module 275.

Figure 4B:
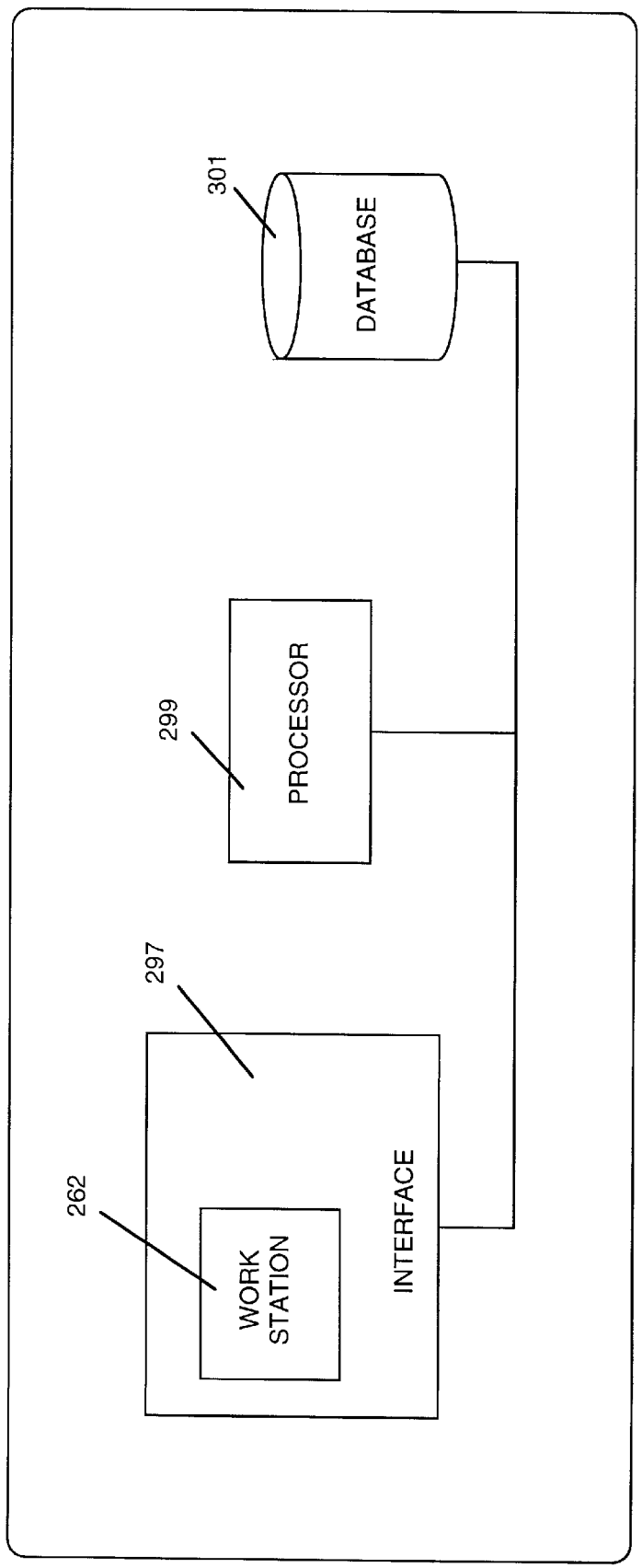
FIG. 4b is a diagram of a configuration set-up system.

FIG. 4b shows the configuration set-up system 293 in more detail. An interface 297 receives individual addressing information unique to individual set top terminals 220. The interface 297 can include a workstation, such as the work station 262, for example, from which an operator at the operations center 202 manually enters set top terminal information. Alternately, set top terminal information can be automatically entered at the interface 297 by downloading from an off-site database, the Internet, a storage medium, such as a CD-ROM or a floppy disk, or by collecting the information directly from the individual set top terminals 220. A processor 299 process the received set top information and creates a Category/Group Definition matrix and a Group Assignment matrix that can be used to target advertisements to groups of set top terminals 220 or to an individual set top terminal 220. The Category/Group Definition and Group Assignment matrices will be described later. The Category/Group Definition and Group Assignment matrices are then stored in a database 301, and are periodically updated as subscriber information, for example, changes.

The information used by the processor 299 to create the Category/Group Definition and Group Assignment matrices includes, for example, the set top terminal identifier, zip code+4 data, household income, and age and sex of the subscribers, for example. The information gathered by the configuration set-up system 293 can come from a variety of sources including MSOs and marketing databases, direct inputs from the subscribers, and other means. Once the data are collected, the processor 299 will assign category numbers to certain types of the data. For example, the ADI would be assigned category 1 and household (HH) income would be assigned category 2. Next, the configuration set-up system 293 creates a number of non-overlapping groups for each category. For example, ADI can be broken down into Seattle, Wash., Washington D.C., Denver Colo., Los Angles Calif., etc. Similarly, HH income can be broken down into a number of income groups such as no income, 20–40K, 60–120K, etc. Finally, the configuration set-up system 293 assigns a "group mask representation" for each group within every category. The group mask representation is simply a binary number that can be used by other components of the multiple channel architecture module 265 to identify a particular group. Table D shows a completed Category/Group Definition matrix that is used by the advertisement assignment module 275 to assign targeted advertising to groups of set top terminals 220 or to individual set top terminals 220.

The processor 299 also creates the Group Assignment matrix. The Group Assignment matrix, shown in Table E, assigns to each set top terminal 220, for each category, its corresponding group number. Associated with each group number is the group definition and the group mask representation. For example, the set top terminal 220 identified by the set top unit address 12311 is assigned group number 2 (i.e., Washington D.C.) for ADI, and group number 3 (i.e., 40–60k) for household income. The Group Assignment matrix is updated periodically as categories and group definitions change, and as data related to individual set top terminals 220 or groups of set top terminals 220 change.

The configuration set-up system 293 also delivers the group configuration (i.e., information specific to an individual set top terminal 220, from the Group Assignment matrix) to each set top terminal 220. For example, the set top terminal 220 assigned the set top unit address 12311 is sent category 1, group 2 and group mask representation 01000000000. The group configuration can be transmitted directly to each set top terminal 220 from the operations center 202. Alternately, the group configuration can first be transmitted to the cable headend 208. The cable headend 208 then transmits the group configuration to the appropriate set top terminals 220. In addition to an initial delivery of the group configuration to the set top terminals 220, the set-up system 293 can periodically transmit updated group configurations to the set top terminals 220, either directly or through the cable headend 208.

Figure 4C:
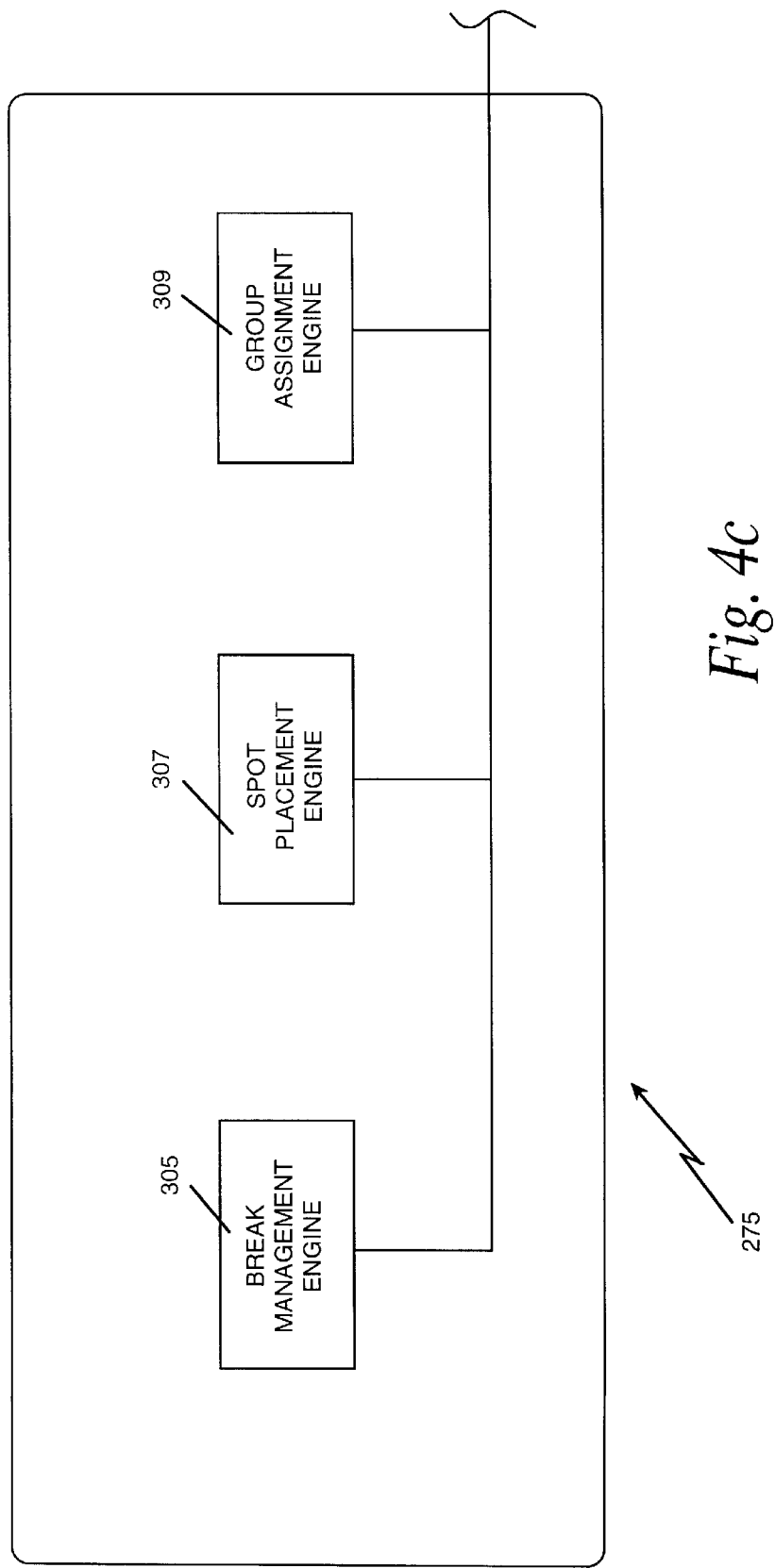
FIG. 4c is a diagram of an advertisement assignment module.

FIG. 4c shows the advertisement assignment module 275 in more detail. A break management engine 305 uses program schedule/clock information from the program schedule module 289 to assign feeder channels to program breaks. A spot placement engine 307 decides which advertisement spots to place in open spots, or pods, during each program. A group assignment engine 309 determines which set top terminals 220 will view which simultaneously aired advertisement spots. The spot placement engine 307 receives information related to program breaks and available feeder channels from the break management engine 305. The break management engine 305, the spot placement engine 307, and the group assignment engine 309 will be described later in more detail.

The break management engine 305 functions to divide available feeder channels and assign the available feeder channels optimally to those program channels that have concurrent program breaks. Because each program shown on a programing channel will normally carry associated advertisements for each program break, or pod within the program break, the break management engine 305 need only assign feeder channels if alternate advertisements are identified to be broadcast during the program breaks. Thus, during the program break, the program-channel advertisements or advertisements carried on one or more feeder channels can be broadcast to a particular set top terminal 220 or group of set top terminals 220.

Because there may be a number of program channels that use targeted advertising, the break management engine 305 must, at every point in time, divide up the available feeder channels and assign them optimally to the program channels. This requires taking into account the alignment of program breaks across all the program channels. For example, if two program channels have overlapping program breaks, separate feeder channels will likely need to be assigned to each of the program channels. If more than one category of targeting (e.g., ADI, household income) is assigned to the program channels, then several separate feeder channels may be needed to carry all the assigned targeted advertisements. For example, if two program channels, each of which is assigned two categories of targeted advertisements are being broadcast, and the program breaks for the two program channels overlap, then the break management engine 305 will assign one separate feeder channel to each program channel. In this example, the program channel will carry one category of targeted advertisement and the feeder channel will carry the second category of targeted advertisement. In this alternative, the set top terminal 220 decides, based on a priority algorithm, which targeting category to switch to in case of ambiguous commands to switch to two separate feeder channels. Alternately, the break management engine 305 can assign feeder channels based on the group assignment numbers. Referring to Table D, four group numbers (i.e., 1–4) are shown for the category of targeted advertisement, ADI. For the broadcast of a particular program, the four groups can be divided into two, with groups 1 and 2 receiving the targeted advertising carried on the program channel and groups 3 and 4 receiving the targeted advertising carried on feeder channel 1. This later example is shown in Table F.

After determining how many feeder channels will be needed for each program break of all programs airing at the same time, the break management engine 305 must allocate feeder channels to the program breaks. Because the program channel will always carry targeted advertisements along with the regular program, every pod in the program will always air at least one spot (i.e., the default targeted advertisement). Thus, if the break management engine 305 is unable to assign a feeder channel to a specific program break, at least one set of commercials will still be available for airing.

In addition to accounting for the occurrence and alignment of program breaks within the programs, and the number of feeder channels available, the break management engine 305 must also account for the number and type of available targeted advertisements for display and the variety of subscribers (according to group assignment numbers) who will potentially view the programs. An advertiser will provide this information when forwarding advertisements to the operation center 202 for airing.

In the embodiments described above, the break management engine 305 assigned one or more feeder channels to carry targeted advertisements, under the assumption that the entire program break (which consists of one or more pods) would receive all the spots assigned to the specific feeder channel. In another embodiment, individual pods within each program break may be separately assigned targeted advertisements. In this embodiment, the break management engine 305 tracks not only programs and program breaks, but within each program break, also tracks breaks between pods. The break management engine 305, in cooperation with the group assignment engine 309, will then allocate feeder channels to air targeted advertisements on a pod-by-pod basis. If a sufficient number of feeder channels are available, the break management engine 305 can assign a separate feeder channel to each pod. Alternately, through the switching plan, the break management engine 305 can require individual set top terminals 220 to switch between the program channels and one or more feeder channels during the program break. The construction and operation of the group switching plan will be described later in detail.

The spot placement engine 307 determines which specific advertisements are to be placed in each available open pod of the program break. The spot placement engine 307 first receives the list of available advertisements/promotional material from the advertisement/promotion module 287. In cooperation with the break management engine 305, the spot placement engine 307 then determines which of the available advertisements/promotions should air in each pod during the broadcast of a program. This may include assigning the advertisement/promotion to the program channel to serve as the default targeted advertisement in case a feeder channel is not available to provide alternate targeted advertising, or in case a set top terminal 220 is unable to switch to the feeder channel. For example, if the preferred category of targeted advertisement for the program "All My Children" is ADI, the spot placement engine 307 will select one or more targeted advertisements from the list of available advertisements/promotions to air during program breaks in the broadcast. If the demographic or other data assembled by the configuration set-up system 293 indicates that more than one targeted advertisement should be played, depending on the ADI, then the spot placement engine 307 will select the appropriate number of targeted advertisements from the available advertisement/promotional module 287 and will assign each targeted advertisement to a specific feeder channel and the program channel. The operation of the spot placement engine 307 to assign the targeted advertisements will be described later in more detail.

TABLE D

Category/Group Definition Matrix

| Category Number | Category Name | Group Number | Group Definition | Group Mask Representation |
|---|---|---|---|---|
| 1 | ADI | 1 | Seattle, WA | 1000000000 |
| | | 2 | Washington, D.C. | 0100000000 |
| | | 3 | Denver, CO | 0010000000 |
| | | 4 | Los Angeles, CA | 0001000000 |

TABLE D-continued

Category/Group Definition Matrix

| Category Number | Category Name | Group Number | Group Definition | Group Mask Representation |
|---|---|---|---|---|
| 2 | HH income | 1 | No income | 1000000000 |
| | | 2 | 20–40K | 0100000000 |
| | | 3 | 40–60K | 0010000000 |
| | | 4 | 60–120K | 0001000000 |
| 3 | Category x | 1 | Group a | 1000000000 |
| | | 2 | Group b | 0100000000 |
| | | 3 | Group c | 0010000000 |
| | | 4 | Group d | 0001000000 |
| | | 5 | Group e | 0000100000 |
| | | 6 | Group f | 0000010000 |

The group assignment engine 309 receives inputs from the break management engine 305 and the spot engine 307 and then determines which set top terminal 220 will view which simultaneously-aired targeted advertisements. Thus, for each program break, the group assignment engine 309 assigns the set top terminals 220 to either the program channel or one of the feeder channels, if available. The set top terminals 220 can be assigned based on their placement within a group (i.e., based on their group assignment number) or based on their individual set-top unit address. In tables E and F, the assignments are shown based on the group assignment numbers. As also shown in Table F, the group addressing for a program break is based on a single category of targeted advertising. This may be necessary to avoid a potential conflict regarding which feeder channel a set top terminal 220 must switch to.

TABLE E

Group Assignment Matrix

| Set-top Unit Address | Category Name | Group Number | Group Definition | Group Mask Representation |
|---|---|---|---|---|
| 12311 | ADI | 2 | Washington, D.C. | 01000000000 |
| | HH income | 3 | 40–60K | 00100000000 |
| | Category x | 5 | Group d | 00100000000 |
| 12312 | ADI | 4 | LA | 00100000000 |
| | HH income | 3 | 40–60K | 00100000000 |
| | Category x | 2 | Group a | 10000000000 |
| 12313 | ADI | 3 | Denver | 00100000000 |
| | HH income | 4 | 60–80K | 00010000000 |
| | Category x | 3 | Group b | 01000000000 |

The group assignment engine 309 provides an output to the switching plan generator 291. The output indicates which group assignment numbers (i.e., which groups of set top terminals 220) are assigned to each of the program channel and the feeder channels for each program break in each program. The switching plan generator 291 then generates the bit word, or group mask assignment that is used to assign the groups to the program channels and the feeder channels. Once generated, the switching plan is distributed to control points that are then responsible for final delivery to the set top terminals 220. The control points can include the local cable headends 208. Alternately, the switching plans can be distributed directly to the set top boxes 220 from the operations center 202. For example, the operations center 202 can distribute the switching plans by satellite to a satellite receiver that is co-located with the set top terminal 220. The switching plan can also be distributed to the set top terminals 220 over the telecommunications network 100 and the Internet 101.

TABLE F

Set Top Switching Plan

| Program | Category of Targeting | Channel to which to Tune | Groups Assigned to Specific Channel | Group Mask Assignment |
|---|---|---|---|---|
| All My Children Channel 1, Break 1 | ADI | Program Channel Feeder Channel 1 | 1, 2 3, 4 | 11000000000 00110000000 |
| Gorilla in Mist Channel 2, Break 1 | HH Income | Program Channel Feeder Channel | 1, 2, 3 4 | 11100000000 00010000000 |
| ESPN Basketball, Channel 3, Break 1 | Category x | Program Channel Feeder Channel 3 Feeder Channel 4 Feeder Channel 5 Feeder Channel 6 | 1, 2 3 4 5 6 | 11000000000 00100000000 00010000000 00001000000 00000100000 |
| In Concert, Channel 4, Break 1 | All (no tuning) | Program Channel | All | 11111111111 |

The switching plans can be distributed separately from the television programs or can be distributed with the television programs. By distributing the switching plan with the program, the need for control point relays could be eliminated, thereby allowing for more efficient use of available bandwidth and centralized control functions. The switching plan may be distributed well in advance of airing of a program and can be updated as conditions warrant. The switching plan provided by the switching plan generator 291 is a national switching plan. To account for local insertion of targeted advertising, local cable headends 208 can override certain targeted advertisements and insert local targeted advertising on one or more of the feeder channels. Alternately, certain feeder channels may be reserved for local use, or open pods may be reserved in the program breaks on other feeder channels. After the local cable headend 208 has inserted the local targeted advertisement on a feeder channel, the local cable headend 208 may amend the national switching plan to create a local system switching plan. The details of these operations at the local cable headend 208 are described later in more detail.

The set-top data collection module 295 receives programs watched data and targeted advertisement watched data from the set top terminals 220. This information is used at the operations center 202 for billing commercial advertisers and may also be used as an input for future ad campaigns. The targeted advertisement watched data is collected in this fashion because there may be no way of knowing, a priori, which targeted advertisements will be displayed on a particular set top terminal 220.

The advertisement assignment module 275 provides an ad playbill input to the commercial operations module 277. The ad playbill input specifies which particular advertisement is to be aired at a particular time slot, the run-time for the advertisement, and the location of the advertisement in storage in the operations center 202, for example. The ad playbill is then used to retrieve the appropriate analog or digital tape or file containing the selected advertisement.

Figure 4D:
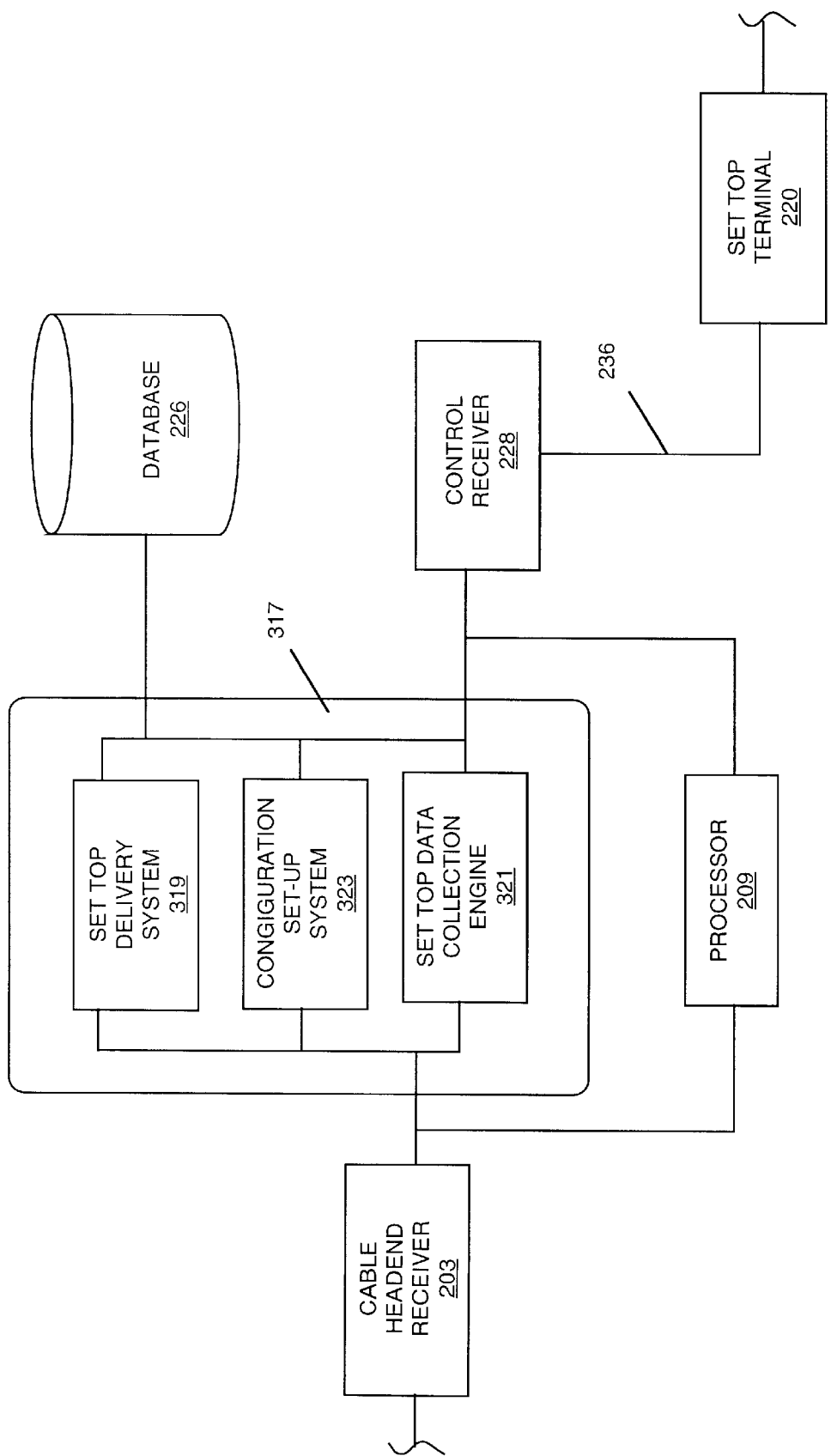
FIG. 4d is a diagram of a feeder channel architecture at a cable headend.

FIG. 4d shows the configuration of the feeder channel architecture 317 at the cable headend 208. A set top delivery system 319 receives the national switching plan from the operations center 202. The national switching plan is digitally compressed and multiplexed and can be provided to the cable headend 208 as part of the digital RF program signal 205, for example. The digital program signal 205 is received at the cable headend receiver 203 and may be passed to the signal processor 209 or passed through the cable distribution network 236 directly to the set top terminals 220. In the embodiment, the digital program signal 205 is processed at the cable headend 208. The control receiver 228 receives status reports and other data from the set top terminals 220. A set top data collection engine 321 receives targeted advertisement watched data and other information from the control receiver 228, which may then be temporarily stored in the database 226, and passes the data to the operations center 202. A configuration set-up system 323 receives initial and updated set top configuration data from the operations center 202 and passes the configuration data to the set top terminals 220. The configuration set up system 323 is also used to locally reconfigure the Group Assignment matrix.

The signal processor 209, under control of the network controller 214 passes the national switching plan to the set top delivery system 319. The set top delivery system 319 then either modifies the national switching plan and passes it on to the set top terminals 220 or passes the unmodified national delivery plan on to the set top terminals 220 as the local system-specific switching plan. The local system-specific switching plan is passed from the set top delivery system 319 to the signal processor 209, and from the signal processor 209 to the cable distribution system 236 and the set top terminals 220.

To modify the component of the digital program signal 205 that is the national switching plan, the set top delivery system 319 demultiplexes the national switching plan from the digital program signal 205. The set top delivery system 319 may then modify the assignments of groups of set top terminals 220, or individual set top terminals 220, to specific feeder channels or the program channel. If the group assignments are modified, the group mask assignment is also modified. The local system-specific switching plan is then sent to the set top terminals 220.

The local system-specific switching plan can be sent as part of the program signal or as part of the STTCIS. The local system-specific switching plan can also be sent to the set top terminals 220 in advance of the program signal. In this event, the local system-specific switching plan may need to be updated to account for program changes and reassignment of targeted advertisements, for example. The local system-specific switching plan may also be transmitted periodically to the set top terminals 220 to ensure that any set top terminal 220 that was in a "power-off" condition when the switching plan was originally sent receives the latest version of the local system-specific switching plan.

As noted above, the signal processor 209 and the network controller 214 provide the capability to insert local programming, including local targeted advertisements into the signal sent to the set top terminals 220. When open pods exist in the feeder channels, or when a local cable system is authorized to override national advertising, the signal processor 209, under control of the network controller 214, will add local targeted advertisements to the appropriate feeder channels. If the addition of local targeted advertising requires a change in the nation-wide switching plan, the network controller 214 will instruct the set top delivery system 319 to make the appropriate changes. In order to make the appropriate changes, the set top delivery system 319 must maintain the same Category/Group Definition and Group Assignment matrices as are maintained at the operations center 202. Alternately, the set top delivery system 319 may create new matrices that do not conflict with the existing nationally-defined Categroy/Group Definition matrices.

FIG. 4e shows the set top terminal 220 adapted for use with the feeder channel architecture of FIG. 4a. A set top switching engine 325 receives the set top configuration from the configuration set-up system 293, and stores the configuration in erasable permanent memory 329. The set top switching engine 325 also receives and stores the local system-specific or nation-wide switching plan from the switching plan generator 291 via the set top delivery system 319.

The set top switching engine 325 provides control information and advertisements watched data to a set top data collection engine 327. The data are stored in the memory 329 and are available for transmission to the local cable headend 208 or directly to the operations center 202. In a cable television system, the data may be transmitted over the installed cable delivery system 236, using various polling techniques and transmission protocols, such as those describe previously with respect to gathering programs watched data. The advertisements watched data includes the set top unit address, the program identifier (program name) and the channel to which the set top was tuned during the program breaks. The data may also include click stream data such as operation of the volume mute button, for example.

When the viewer selects a program channel that incorporates the feeder channel features, the set top switching engine 325 compares the current local system-specific switching plan to the set top configuration plan to determine whether to stay with the program channel during the program breaks or to switch to one of the feeder channels. If the switching plan calls for the set top terminal 220 to be switched to a feeder channel, the set top switching engine 325 sends a control signal to seamlessly, or transparently switch the program channel to the appropriate feeder channel.

In the above embodiments, the multiple channel architecture module 265 is described that provides for real time broadcast of targeted advertising to individual set top terminals 220. However, the multiple channel architecture module 265 need not broadcast the targeted advertisements in real time. In another embodiment, the targeted advertisements can be broadcast to individual set top terminals 220, and stored within the memory 327 of the set top terminal 220. In this embodiment, the need for feeder channels is eliminated. However, the national and local system-specific switching plans are still provided to the set top terminals 220, either directly from the operations center 202, or from the cable headends 208.

An example of the process for assigning targeted advertisements to program channels and to feeder channels using the spot placement engine 307 will now be described. As discussed above, targeted advertising uses targeting categories and independent groups within each target category to tie three entities together: 1) set top terminals 220; 2) advertisements; and 3) programs. The set top terminals 220 (or viewers) are assigned to groups for each targeting category based on numerous factors. One method to assign the set top terminals 220 to groups is to use the zip code+4 as an index into one of the available demographic marketing databases. From the zip code+4 data, a distinct demographic cluster can be determined. The demographic cluster can then be mapped directly to the specific group within each targeting category. Manual assignment of groups to set top terminals 220 would be a daunting task, for a large population of set top terminals (approaching several million). Therefore, the processor 299 performs this function automatically, using its installed software routines. Alternative methods can also be devised to automatically map individual set top terminals 220 to groups within targeting categories. Once each set top terminal 220 is mapped to one group for each targeting category, the group assignments are delivered to the set top terminals 220 for storage (see Table E).

Next, programs are tied to groups as well. For each program, the percentage of viewers (or set top terminals 220) for each group can be identified 1) initially using estimates, and 2) becoming more accurate over time using actual programs watched data. Table G shows a sample breakdown of viewership for 5 example programs for 3 example targeting categories. The viewership data may be provided from a number of sources including surveys, Nielsen ratings and programs watched data collected by the set top terminals 220, for example. In this example, the three targeting categories are the same as those presented in Table E, and the group assignment numbers are the same as those presented in Table D. Thus, targeting categories 1 and 2 each have 4 groups associated with them, and targeting category 3 has six groups associated with it. Thus, for program 1, the targeting category 1 refers to ADI and under group 1, 25% of the viewers of program 1 from the targeting category ADI reside in the Seattle, Wash. ADI. The viewership percentages for each targeting category for each program sum up to 100%.

each advertisement provided by an advertiser is independently associated with groups. Advertisements from several different advertisers are then used together to optimize use of the feeder channels.

TABLE H

| Ad | Target Category | Group 1 | Group 2 | Group 3 | Group 4 | Group 5 | Group 6 |
|---|---|---|---|---|---|---|---|
| Ad 1 | 1 | 50 | 50 | 0 | 0 | N/A | N/A |
| " | 2 | 30 | 10 | 20 | 40 | N/A | N/A |
| " | 3 | 0 | 0 | 0 | 0 | 0 | 0 |
| Ad 2 | 1 | 0 | 0 | 50 | 50 | N/A | N/A |
| " | 2 | 0 | 0 | 0 | 0 | N/A | N/A |
| " | 3 | 0 | 0 | 0 | 0 | 0 | 0 |
| Ad 3 | 1 | 0 | 0 | 0 | 0 | N/A | N/A |
| " | 2 | 25 | 25 | 25 | 25 | N/A | N/A |
| " | 3 | 0 | 0 | 0 | 0 | 0 | 0 |
| Ad 4 | 1 | 50 | 0 | 50 | 0 | N/A | N/A |
| " | 2 | 0 | 40 | 40 | 20 | N/A | N/A |
| " | 3 | 10 | 30 | 10 | 30 | 10 | 10 |
| Ad 5 | 1 | 40 | 20 | 20 | 40 | N/A | N/A |
| " | 2 | 10 | 30 | 30 | 30 | N/A | N/A |
| " | 3 | 30 | 30 | 30 | 5 | 5 | 0 |
| Ad 6 | 1 | 0 | 0 | 0 | 0 | N/A | N/A |
| " | 2 | 0 | 0 | 0 | 0 | N/A | N/A |
| " | 3 | 10 | 10 | 10 | 10 | 30 | 30 |
| Ad 7 | 1 | 20 | 40 | 40 | 20 | N/A | N/A |
| " | 2 | 25 | 25 | 25 | 25 | N/A | N/A |
| " | 3 | 0 | 30 | 20 | 30 | 0 | 20 |
| Ad 8 | 1 | 30 | 40 | 0 | 30 | N/A | N/A |

TABLE G

| Program | Target Category | Group 1 | Group 2 | Group 3 | Group 4 | Group 5 | Group 6 |
|---|---|---|---|---|---|---|---|
| Program 1 | 1 | 25 | 25 | 25 | 25 | N/A | N/A |
| " | 2 | 30 | 10 | 20 | 40 | N/A | N/A |
| " | 3 | 10 | 10 | 20 | 20 | 20 | 20 |
| Program 2 | 1 | 10 | 20 | 30 | 40 | N/A | N/A |
| " | 2 | 25 | 25 | 25 | 25 | N/A | N/A |
| " | 3 | 10 | 15 | 25 | 25 | 15 | 10 |
| Program 3 | 1 | 40 | 30 | 20 | 10 | N/A | N/A |
| " | 2 | 80 | 10 | 5 | 5 | N/A | N/A |
| " | 3 | 25 | 25 | 10 | 10 | 15 | 15 |
| Program 4 | 1 | 50 | 0 | 50 | 0 | N/A | N/A |
| " | 2 | 0 | 40 | 40 | 20 | N/A | N/A |
| " | 3 | 10 | 10 | 25 | 25 | 15 | 15 |
| Program 5 | 1 | 20 | 40 | 40 | 20 | N/A | N/A |
| " | 2 | 30 | 30 | 10 | 30 | N/A | N/A |
| " | 3 | 10 | 30 | 10 | 30 | 10 | 10 |

Alternatively, if the viewership breakdown by group for a program differs depending on the time of day or day of week a program airs, multiple breakdowns may exist and need to be developed for each day part in which a program may air.

Advertisements can also be broken down as to how well an advertisement ranks with each group within one and up to all possible targeting categories, again using percentages. This information may be provided by an advertiser responsible for the advertisement. Table H shows a sample assignment of group rankings for 8 sample advertisements using the same targeting categories and group numbers as in Table G. Not all advertisements may be assigned to groups for a targeting category if an advertiser does not wish its advertisement to be targeted in the manner required by that targeting category.

Referring to Table H, the data indicates that for ad 1, and targeting category 1 (ADI) the advertiser believes that ad 1 is appropriate the viewers in groups 1 and 2 and is not appropriate for the viewers in groups 3 and 4. The advertiser also believes that ad 1 is equally appropriate for both the group 1 and the group 2 viewers. However, if the group 1 viewers been determined to be more likely to respond to ad 1 than the group 2 viewers, then group 1 could be given a higher percentage than group 2. Table H also shows that ad 1 is not applicable to groups 5 and 6 because only four groups are defined for the targeting category ADI. Thus, all the set top terminals 220 will be grouped into one of groups 1 through 4.

Using this paradigm, advertisements can be targeted using at least two methods. The first is a designated multi-ad campaign where specific unique sets of groups are assigned for each ad of the campaign. In the second method,

TABLE H-continued

| Ad | Target Category | Group 1 | Group 2 | Group 3 | Group 4 | Group 5 | Group 6 |
|---|---|---|---|---|---|---|---|
| " | 2 | 30 | 30 | 10 | 30 | N/A | N/A |
| " | 3 | 20 | 0 | 20 | 20 | 20 | 20 |

Using the information above, the spot placement engine 307 determines: 1) how many feeder channels are assigned to which program; 2) which targeting category is used for which program; 3) which advertisements air on which feeder channels/program channels; and 4) which groups are assigned to which feeder channels/program channels. The algorithm in the spot placement engine 307 that assigns targeted advertisements to the program and feeder channels assumes that of the total number of feeders channels available [TOTAL_FEEDERS], no more than some maximum number of the feeder channels can be or are desired to be assigned to a given program at any given time. This amount is denoted as [MAX_FEEDERS]. The algorithm spreads the available feeder channels among several programs. The algorithm can also be modified to support different rates charged to different advertisers and can take into account the following:

ensuring advertiser's budget is not exceeded defining unique target categories and groups for an advertiser (presumes the advertiser can apply the population of set top terminals 220 to their group definitions)

accounting for multiple program breaks during a program, multiple commercial pods within each program break and multiple length ads for placement in the program breaks ensuring enough margin for timing of actual program breaks to be offset from expected program break start-times The operation of the algorithm will be described with reference to the example values shown in Tables D–H.

Step 1: For each program, determine the advertisement with the highest overall ranking if that advertisement were the only advertisement to be placed in the program. In essence, this step compares the data in Tables G and H. To do this, for each advertisement, multiply the ranking (or program viewership percentage) for each group for each targeting category from Table G by the breakdown percentage of advertising appropriateness shown in Table H for that same group for that targeting category. The process is repeated for each program and the results are summed.

For example, using program 1, ad 1:

| | |
|---|---|
| target category 1: | 50*25 + 50*25 + 0*25 + 0*25 = 25% |
| target category 2: | 30*30 + 10*10 + 20*20 + 40*40 = 30% |
| target category 3: | 0*10 + 0*10 + 0*20 + 0*20 0*20 + 0*20 = 0% |

The cross-multiplied result then shows a measure of effectiveness for each advertisement if displayed in the corresponding program.

Step 2: For each program, determine the advertisement/targeting category combination that results in the highest overall ranking. List the program, the overall ranking, the corresponding advertisement, and the corresponding targeting category. Note that only one advertisement will give the overall highest ranking. Table I shows the results. Thus from Table I ad 5, displayed during a program break in program 2 yields a measure of effectiveness of 50 (highest) and ad 6 along with program 5 yields a measure of effectiveness of 20.

TABLE I

| Program | Highest Overall Ranking | Corresponding Ad | Corresponding Targeting Category |
|---|---|---|---|
| Program 1 | 30 | Ad 2 | 1 |
| Program 2 | 50 | Ad 5 | 2 |
| Program 3 | 25 | Ad 3 | 3 |
| Program 4 | 40 | Ad 1 | 1 |
| Program 5 | 20 | Ad 6 | 2 |

Step 3: Order the resulting list of programs from lowest overall ranking to highest overall ranking. Table J shows the results.

Step 4: Determine the number of programs that may be assigned feeder channels. For example, consider the first [TOTAL_FEEDERS]+1 programs for feeder channel assignment. Thus, if two feeder channels are available, three programs will be examined to determine which program will yield the best use of the available feeder channels. In this case, the three lowest-ranking programs (i.e., programs 5, 3 and 1) are considered for feeder channel assignment. For the remaining programs (i.e., programs 4 and 2), assign the advertisement that yields that highest rating for placement in the program break for that program. For the programs selected for possible feeder channel assignment, perform steps 5–18 of the algorithm, starting with the program in Step 3 with the lowest overall ranking (i.e., in the example, program 5).

TABLE J

| Program | Overall Ranking | Corresponding Ad | Corresponding Targeting Category |
|---|---|---|---|
| Program 5 | 20 | Ad 6 | 2 |
| Program 3 | 25 | Ad 3 | 3 |
| Program 1 | 30 | Ad 2 | 1 |
| Program 4 | 40 | Ad 1 | 1 |
| Program 2 | 50 | Ad 5 | 2 |

Step 5: Separately for each targeting category, multiply the ranking for each group for each advertisement (Table H) by the breakdown percentage for that same group for that program (Table G). Find the highest value possible. In case of a tie, select any of the advertisements with the highest values. Alternately, steps 5–14 could be repeated for every tie. Table K below shows an example case for targeting category 1, where ad 1, group 2 is initially selected (with a high value of 20%). Note that Table K shows a three-way tie.

TABLE K

| Ad | Target Category | Group 1 | Group 2 | Group 3 | Group 4 | Group 5 | Group 6 |
|---|---|---|---|---|---|---|---|
| Ad 1 | 1 | 50*20 | 50*40 | 0*40 | 0*20 | N/A | N/A |
| Ad 2 | 1 | 0*20 | 0*40 | 50*40 | 50*20 | N/A | N/A |
| Ad 3 | 1 | 0*20 | 0*40 | 0*40 | 0*20 | N/A | N/A |
| Ad 4 | 1 | 50*20 | 0*40 | 50*40 | 0*20 | N/A | N/A |
| Ad 5 | 1 | 40*20 | 20*40 | 20*40 | 40*20 | N/A | N/A |
| Ad 6 | 1 | 0*20 | 0*40 | 0*40 | 0*20 | N/A | N/A |
| Ad 7 | 1 | 20*20 | 40*40 | 40*40 | 20*20 | N/A | N/A |
| Ad 8 | 1 | 30*20 | 40*40 | 0*40 | 30*20 | N/A | N/A |

Step 6: Select from the iterations performed in Step 5, the targeting category that yields the largest value. If there is a tie, select any one of the targeting categories.

Step 7: For the target category selected, find the next highest value of the (rank)*(breakdown percentage) product for a group not yet selected. If there is a tie, select the advertisement for which a group with a higher value has already been selected. Continue until all groups have been selected and assigned to an advertisement. Table L shows the results. In Table L, for group 1, either ad 1 or ad 4 could be selected (i.e., the product: (rank)*(breakdown percentage) is 10 for ad 1 and for ad 4). However, for group 2, ad 1 has already been selected. Therefore, because there is a tie for group 1 between ad 1 and ad 4, and because group 2 has ad 1 selected, the algorithm selects ad 1 for group 1. As a result of Step 7, the algorithm limits the number of advertisements that will be run, but maximizes the ranking percentage of the breakdown. The results show that, considering targeting category 1 (ADI) only, ad 1 should be displayed for groups 1 and 2 and ad 2 should be displayed for groups 3 and 4.

TABLE L

| Ad | Target Category | Group 1 | Group 2 | Group 3 | Group 4 | Group 5 | Group 6 |
|---|---|---|---|---|---|---|---|
| Ad 1 | 1 | 50*20 | 50*40 | 0*40 | 0*20 | N/A | N/A |
| Ad 2 | 1 | 0*20 | 0*40 | 50*40 | 50*20 | N/A | N/A |

TABLE L-continued

| Ad | Target Category | Group 1 | Group 2 | Group 3 | Group 4 | Group 5 | Group 6 |
|---|---|---|---|---|---|---|---|
| Ad 3 | 1 | 0*20 | 0*40 | 0*40 | 0*20 | N/A | N/A |
| Ad 4 | 1 | 50*20 | 0*40 | 50*40 | 0*20 | N/A | N/A |
| Ad 5 | 1 | 40*20 | 20*40 | 20*40 | 40*20 | N/A | N/A |
| Ad 6 | 1 | 0*20 | 0*40 | 0*40 | 0*20 | N/A | N/A |
| Ad 7 | 1 | 20*20 | 40*40 | 40*40 | 20*20 | N/A | N/A |
| Ad 8 | 1 | 30*20 | 40*40 | 0*40 | 30*20 | N/A | N/A |

Step 8: Sum the (rank)*(breakdown percentage) products for selected groups for each advertisement.

Corresponding to the example above:

Ad1–Sum=50*20+50*40=30%

Ad2–Sum=50*40+50*20=30%

Step 9: Order those advertisements that have selected groups by decreasing value of the (rank)*(breakdown percentage) product.

Step 10: Select the [MAX_FEEDERs]+1 advertisements with the highest (rank)*(breakdown percentage) products. For example, if it is desired to assign at most one feeder channel to a program, the algorithm selects the two advertisements with the highest (rank)*(breakdown percentage) products.

Step 11: For the advertisements selected (Step 10), examine each group not yet included in the selected advertisements. Assign each non-included group to the advertisement where the (rank)*(breakdown percentage) product is the highest for the selected advertisements.

Step 12: For each advertisement selected, sum the product, (rank)*(breakdown percentage), for the groups assigned to each advertisement.

Step 13: Reorder the advertisements by highest summed amount to the lowest. The advertisement with the highest summed amount will air in the program channel as the default advertisement.

Step 14: Compute the total (rank)*(breakdown percentage) amount of all advertisements combined. In this case, the total is 60% (from step 10).

Step 15: Repeat steps 5–14 above for the same selected program of Step 4 using the remaining target categories.

Step 16: Select the target category that yields the largest total amount. Assign as the Maximum Rank for that program.

Step 17: Repeat Steps 5–16 for the next program selected in Step 4, computing the Maximum Rank for each program.

Step 18: Use the available feeder channels for the programs that yield the largest Maximum Rank. Make use of the relevant targeting category determined in Step 16, with advertisements as determined in Step 10, with group assignments as determined in Step 11.

Step 19: For all other programs, assign the single advertisement that yielded the highest Overall Ranking as determined in Step 3.

The above algorithm is meant to be illustrative and not limiting. Other algorithms are possible for assigning targeted advertising to groups of set top terminals 220 or to individual set top terminals 220. For example, the above algorithm could incorporate a weighting scheme for certain factors. Other targeted advertising routines, such as those described with respect to FIGS. 28–33 can also be incorporated into the above algorithm.

E. Software Subroutines for Television Programming Delivery

The program control information signal 276 is produced substantially by the CAP CPU 264 and the Delivery Control Processor Unit (DCPU) 270. An overview of the software modules, focusing on the processing of signals and communication between CAP CPU 264 and DCPU 270 is shown in FIG. 7. The software modules for the CAP CPU 264 and DCPU 270 include dispatcher 484, processing 486 and communications 488, each of which performs like-named functions, as well as supporting database 490 access. Processing within the CAP CPU 264 is controlled by the dispatcher 484 software module which may generate processing commands based on user command (e.g., do something now), schedule events (e.g., do something at noon) or based on the occurrence of other events (e.g., do something when the database is updated). The dispatcher 484 sends messages to the processing software module 486 instructing it to process information within the database 490 and generate control information for the DCPU 270. For example, based on the updating of information associated with a particular headend 208, the dispatcher 484 may command the CAP CPU 264 to regenerate headend 208 parameters, perform any required database integrity checking and send them to the DCPU 270. Also, in the case of headend 208 information processing, a filtering function (not shown) is performed which eliminates any information that does not either directly or indirectly relate to a given headend 208. Information transfer between the CAP CPU 264 and the DCPU 270 is controlled by the DCPU communications software module 488.

Information received by the DCPU 270 from the CAP CPU 264 is processed at the DCPU processing module 496 and put into a form consistent with the DCPU 270. Some of this information is used for DCPU control, while most is data to be integrated into the program control information signal 261. Some of this information is also used for miscellaneous control 494 for such things as external multiplex equipment, source material generation hardware, transmission equipment and so on. Information destined for the program control information signal 261 may be transmitted once or may be scheduled for periodic transmission. This information is integrated by the processing module 496 with other information, both internal and external. The DCPU scheduler module 497 is responsible for scheduling and regulating this data traffic. Also, the scheduler 497 may perform information filtering. For example, imbedded date/time information within the information records of interest can be used for filtering. External pass-through control information 495 may also be incorporated into the program control information signal 261 to provide external input to this digital data stream. The DCPU multiplexer 498 is responsible for multiplexing external pass-through control information. Finally, a transmission software module 499 in conjunction with appropriate communications hardware (not shown), controls the output of both the program control information signal 261 and the miscellaneous control signals 494.

FIG. 8 is a high level diagram of CAP software subroutines and their interrelations. A Main Program (not shown) orchestrates the use of the various subroutines as needed to perform the CAP's tasks. The Packager Data Entry Interface (PDEI) 400, Marketing Information Interface (MII) 402, and Cable Franchise Information Access (CFIA) 404 subroutines perform the interface functions between the CAP Main Program and outside data or information. The remaining subroutines shown in the center column of FIG. 8 perform the processing and manipulations necessary to the functioning of the CAP 260.

The Packager Data Entry Interface (PDEI) 400 subroutine includes routines that enable the Packager to interactively enter program selections 410, start times of programs 412, price setting 414, transponder allocation 416, and menu editing 418. The PDEI subroutine 400 controls the keyboard and mouse data entry by the packager and runs in concert with the processing and editing subroutines described later.

The Marketing Information Interface (MII) 402 subroutine interfaces the processing and editing subroutines with marketing data. This interface regularly receives programs watched information from billing sites 420, cable headends 208, or set top terminals 220. In addition, other marketing information 422 such as the demographics of viewers during certain time periods may be received by the MII 402. The MII 402 also uses algorithms 424 to analyze the program watched information and marketing data 420,422, and provides the analyzed information to the processing and editing subroutines. In the preferred embodiment, an Executive Information System (EIS) with a yield management subsystem is included in the MII subroutine as described above.

The Cable Franchise Information Access (CFIA) 404 subroutine receives information on cable franchises, as represented at block 426, such as the particular equipment used in a cable headend 208, the number of set top terminals 220 within a cable franchise, groupings of set top terminals 220 on concatenated cable systems 210, distribution of "high-end" cable subscribers, etc. The CFIA 404 generates a cable franchise control signal 428 which is integrated with the program control information 276 output to generate cable headend 208 specific information to be transmitted. The integration algorithm for accomplishing this resides within the Generator subroutine described herein below.

The process program line-up subroutine 430 uses information from the MII 404 and PDEI 400 to develop a program line-up. Importance weighting algorithms and best fit time algorithms are used to assign programs in time slots.

The process menu configurations subroutine 432 determines appropriate menu formats to be used and positions programs on menu screens. Information from the MII 404 and PDEI 400 are used to determine program positions on menus.

The menu display algorithms 434 displays menus as the menus would be seen by the viewer on a large CRT or color monitor.

The editing of menus subroutine 436 works with the menu display algorithm and PDEI 400 to allow the packager to edit menus on-the-fly during viewing of the menus.

The graphical transponder allocation display 438 sends information obtained from the CFIA 404 and PDEI 400 to create graphical displays enabling the packager to comprehend the allocation of transponder space across the entire television delivery system 200.

In a manner similar to the display and editing of menus represented at blocks 434, 436, the packager may utilize the editing transponder allocation subroutine 440 to interactively reallocate assignment of transponder space. In the preferred embodiment, the EIS with yield management may be used by the packager to assist in decisions on allocating transponder space.

The generator subroutine 442 creates the program control information signal for output. The Generator subroutine receives the cable franchise control signal and uses this signal to help create a custom signal for each cable headend 208.

The Packaging Routine 448 obtains and packages the programs, along with the program control information signal 216, for transmission to the transponders.

Figure 9:
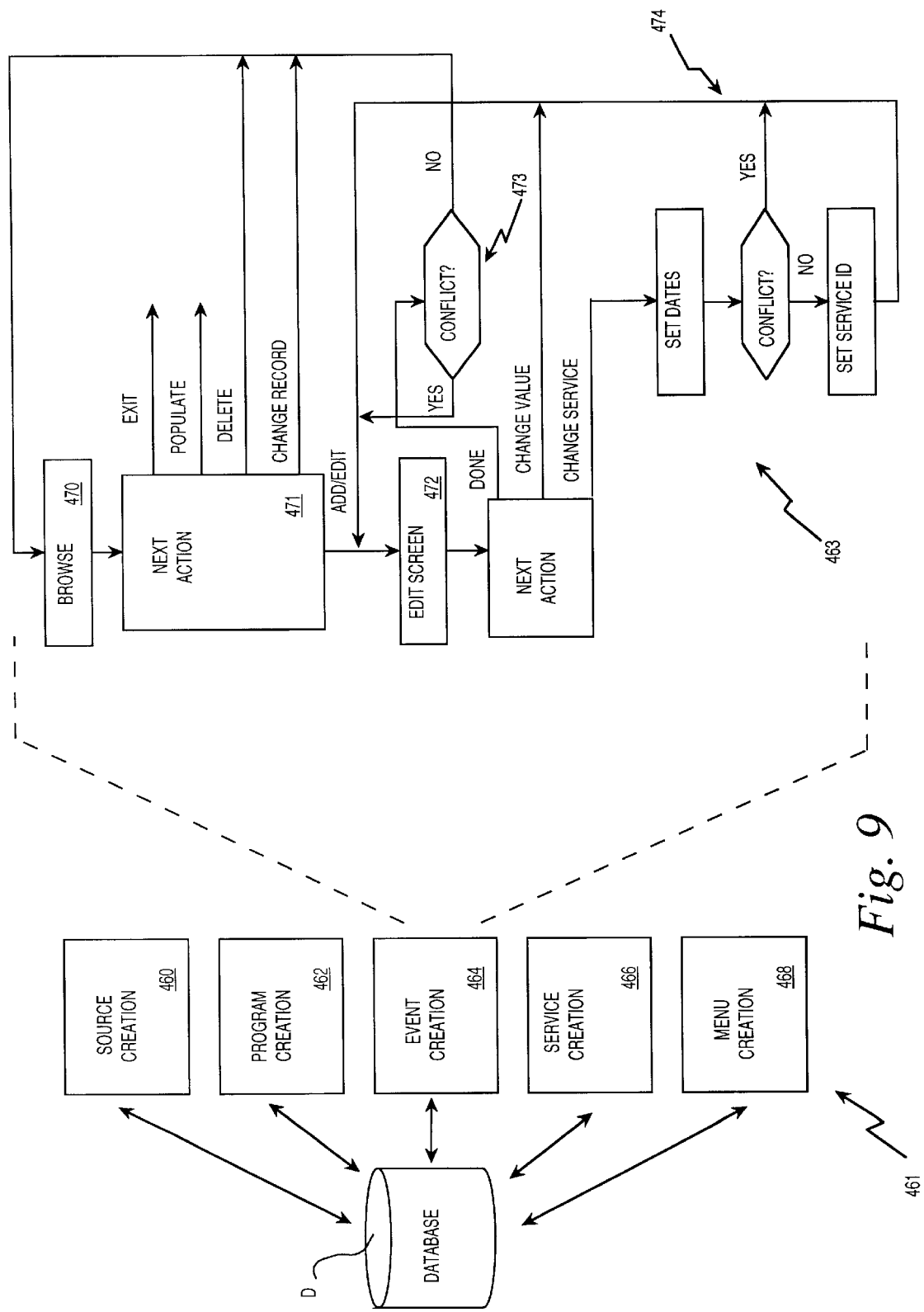
FIG. 9 is a software flowchart representing CAP operations.

With continued reference to FIGS. 7, 8 and 9, the general software flow of the operations center 202 is depicted. The flow can be broken up into modules that apply to parts of the database to allow viewing, editing, and adding records to the database. The software also accomplishes database integrity checking by restricting the user to enter only valid data, and by checking for conflicts.

Figure 11:
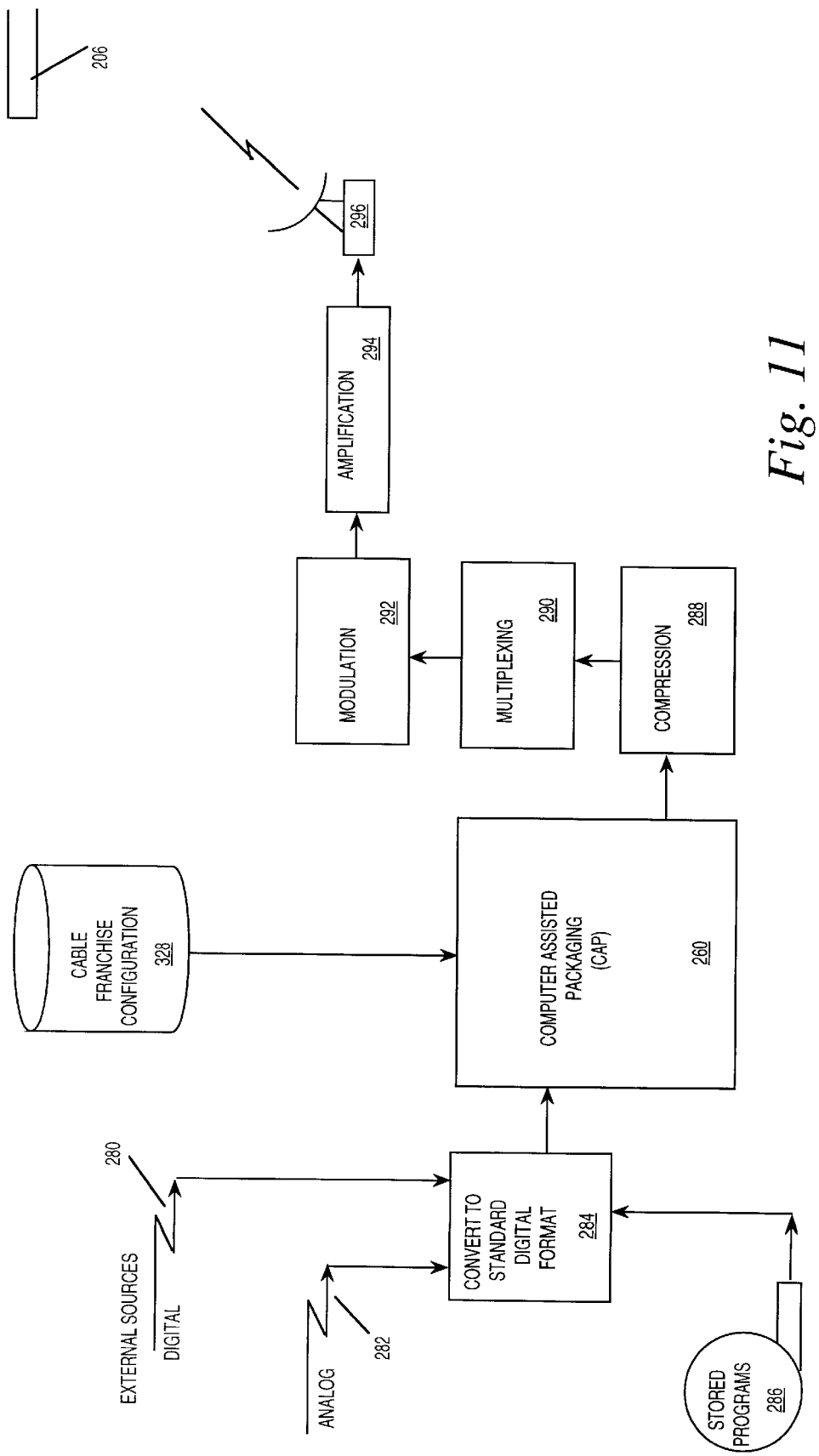
FIG. 11 is a block diagram of the operations center and Master Control Site.

FIG. 9 shows some of the software involved in the creation of programs, events and services. This creation occurs prior to or during the processing of the program line-up 430 shown in FIG. 8. With reference to FIG. 9, a first step is indicated generally at 461 and includes acquiring source materials for program production at the operations center 202 (e.g., tape production). Once the source materials are collected 460, and entered into the database "D", they can be used to create programs 462. These programs are made up of source 'cuts' from various video/audio source materials. Once the programs have been generated and entered into the database "D", events, collections of one or more programs, are created 464. Each event is then schedule onto a service 466, with the software checking for conflicts. Each service is given run times, and days, and checked for conflicts. Once the services and events have been created, the event names can be added to the menus 468. The programs for the events and services may be stored at the operations center (as shown in FIG. 11 at 286). Processing and manipulation of the events or records is depicted generally at 463.

The packager user interface (a portion of 463) for each of the creation modules works substantially identically to each of the other modules to make the interface easy to use and learn. The packager user interfaces forms a portion of the PDEI 400 shown on FIG. 8. The browse system 470 is entered first and allows viewing of records, and selection of specific records. The database can be 'populated' by selection of a button, which activates a populate screen. As represented at block 471, this allows details to be deleted, added or changed for events, programs, and sources. The browse screen also allows access to the edit screen 472, where fields in a selected record can be modified, with conflicts or errors, in scheduling for example, being checked continuously, as at 473 and 474.

In use, the operations center 202 of the present invention performs a variety of management functions which can be broken out into five primary areas: (1) cable headend 208 management, (2) program source management, (3) broadcast program management, (4) internal program storage and management, and (5) marketing, management and customer information. A relational database, such as that represented by FIG. 10, can be used to maintain the data associated with these areas.

Customer billing is not included in any of the above five areas for the operations center 202. Although billing can be handled by the operations center 202 (as shown in the database structure 508, 511), it is preferred that billing is handled at a remote location through traditional channels and methods (such as Cable TV billing provided by Telecorp corporation). Extracts of customer purchases will be provided to the operations center 202. These extracts of information will be formatted and correlated with customer demographics for marketing purposes by the Marketing Information Interface (MII) 402.

(1) Cable Headend Management

Management of the cable headend 208 includes the following activities: defining the cable headend site; profiling the viewers; determining available set top equipment; defining the concatenated cable systems connected to the cable headend site. This information may be stored as cable franchise information within the operations center 202 database by the Cable Franchise Information Access routine 404. Such information can be compiled and maintained in a relational database (described below and shown as 328 in FIG. 11).

(2) Program Source Management

Source programs will be provided by a variety of networks. Information from the contractual records to the actual program tapes should be maintained and includes: tracking of property rights; tracking and profiling source tapes; profiling source providers. A relational database (such as "D" shown in FIG. 9) can be used, for example, that identifies and correlates programs sources. Programs may be received from various rights holders, and such a database would track the person or entity that owns the rights to each program at issue. Other data could be maintained relating to program cuts (a program cut is a portion of a program) that specifies, for example, the program from which the cut is taken. Information relating to time slot allocations, menu entries, and categories, and channel assignments are also maintained in the relational database.

Program services represents a purchasable time slice which is occupied by a type of programming. Each time slice has multiple time constraints. Using the purchasing of through time slices allows for great flexibility. An infinite number of program and time slice combinations are possible. Preferably, services are created using the software shown in FIG. 9, particularly the service creation routine 466. For a service to become available at a cable headend 208 site, it is mapped to the site. At the time of mapping the program service is assigned a program channel.

Program services are defined by the following fields:

| | |
|---|---|
| Service ID | System generated unique ID |
| Description | Describes the service. The description will allow the packager to easily assign a service to a broadcast program. |
| Type | Defines the type of service. Current service types include YCTV ™, Grid, Network and Other. |
| Network ID | Relevant for network services. (examples: ABC, NBC, DISC ™) |
| Broadcast Event | Relevant for a YCTV ™ service. Identifies the current YCTV ™ broadcast event assigned to the service. |
| PICON File | Name of the picture icon (PICON) assigned to the service. This picon is displayed for example on the buy screen for a pay per view event. |
| Expiration Date | Expiration date of the service. Removes the service from the service selection list. |
| Day Start | Each service is a series of days within a week. This represents the starting day. (example: Monday) |
| Day Stop | Represents the last day in the interval. |
| Time Start | Within a day, the service has a time period. This field represents the start of the period. |
| Time Stop | Represents the end of the time period. |
| Required Tape | If stored tapes are required, the number of tapes required by the service. |

(3) Broadcast Program Management

Broadcast program management is one focal point of the data management system. The issues of product, price, promotion and packaging are addressed at this level. Decisions in these areas will affect the actual programming that will be shown to the viewers. Information on description of the content of each program event, program scheduling, broadcast program pricing, TV/set top information flow and information on how broadcast programs will be mapped to viewer channels should be included in the database. Preferably, the EIS system described below will access this data and assist in the Broadcast Program Management.

(4) Internal Program Management

Information on internally stored programs at the operations center 202 should also be maintained. This will allow the operations center 202 to assemble electronically stored programs, CD stored programs and program tapes, and ensure the quality of programs and location of programs.

(5) Marketing and Customer Information

Last, and important, marketing and customer information should be maintained. In order to effectively manage the operations, information is constantly needed on market conditions. Information is needed on the existence of markets for certain programs. The following type of information must be maintained in a Marketing and Customer Information data base: demographic profile of viewers, viewer buy information; correlation of demographic information with buy information, information rapid restructuring of program mix in response to data analysis. As a subscriber uses the system, this viewer information or viewer log data can be stored and maintained in relational database. The Marketing Information Interface 402 gathers the marketing information and indexes the information for inclusion in the Marketing and Customer Information database. An example of the type of information that is needed in this data base is a viewer profile.

The viewer profile data fields are an example of typical fields required in the databases. Definitions of various fields are listed below. The primary purpose of profiling the viewer is to acquire marketing information on the viewer's response to available selections. Ancillary information will be available including the actual program and channel selections of the viewer. Information tracked within the viewer's profile includes:

| | |
|---|---|
| Viewer ID | A unique identifier generated by the system. |
| Set-Top Types | Boolean field which identifies the type of set top used. |
| Headend ID | Links the viewer to a particular cable site. |
| Site Assigned ID | Viewer ID assigned by the cable site. |
| Set-Top ID | ID of the viewer's set top. |
| Hookup Date | Date physical hardware is connected. |
| Survey Date | A demographic profile will be conducted on each user. The following fields represent this demographic information. The data represents when the interview survey was completed. |
| Viewers Age 2–5 | Boolean field if the household has viewers between 2 and 5 years of age. |
| Viewers Age 6–11 | Boolean field if the household has viewers between 6 and 11 years of age. |
| Viewers Age 12–17 | Boolean field if the household has viewers between 12 and 17 years of age. |
| Tape Rental $ | Approximate amount spent on tape rentals on a monthly basis. |
| PPV $ | Household average pay-pre-view expenditures per month. |
| Income | Annual household income. |
| Zip Code | Self-explanatory. |
| Cable Tier | Level of cable service purchased. |
| Number of TV's | Self-Explanatory. |
| Years with Cable | Self-Explanatory. |
| Occupancy | Number of people in household. |
| Highest Education | Highest level of education of any member of the household. |

The compilation of viewer demographic information has an impact on decisions based on marketing. The names of the heads of household are not used due to Privacy Act considerations. Completion of demographic data can be accomplished referencing the cable site assigned ID or the system generated ID. There are numerous variations to the field definitions listed above such as different age groupings.

To maintain the database at the operations center 202, a data base server, communications server, user work station or stations 262, or the suitable equivalent thereof, are needed. The database server performs the following functions: it is the repository for data base files, event logging, event scheduling (example, automated download of files to headends 208), multi-user services, data base server services, and data base security access.

The communications server performs the following functions on data base data: integrity check, filtering, processing, downloading to headends 208, uploading from headends 208, and uploading from remote location.

User work stations 262 perform the following tasks: creation, deletion and access of all database data, system administration and report generation. Database manipulations are performed through the user workstations or remotely. The database structure is designed to support multiple users performing multiple tasks simultaneously. The preferred embodiment includes a network of user workstations 262. The workstations 262, through user interface software, access data within database files on the database server.

For example, once the appropriate database data has been generated for downloading to a cable headend 208, the communications server is instructed to perform the download. Although this may be done manually at the communications server, it is preferred that the communications server automatically send information to the cable headends 208. The communications server retrieves required data from the database server, filters out any data not associated with the specified headend 208, and performs data integrity checks, creates data files to be downloaded and then downloads the data file via modem (or other means such as the DCPU 270). While the communication server is connected with the headend 208, it also requests any data that the headend might be holding for the operations center 202. This may consist of cable headend 208 event log information, set top billing and viewer log data on programs watched, etc.

The communications server may also assist in retrieving information from other remote sites such as remote billing and statistic sites. For example, if a location is being used for billing purposes, the communications server may retrieve viewer log data. Also, the communications server may retrieve billing and viewer log data from actual set top converters in the field. Once the data is retrieved it is sent to the database server. Thus, in the preferred embodiment the communications server will support incoming information via modem or otherwise.

The basic database structure at the operations center 202 consists of multiple tables. Database data tables contain one or more data records, each with multiple fields. Each field contains a piece of data about the particular record. This data may be general information, such as a numeric value, date or text string, or it may be a reference to another database record relating one piece of data to another. Database index files contain information about associated data files to allow for improved data retrieval. The database index file makes retrieval of information much quicker.

In an alternative embodiment where some television programming begins with the procurement of source material in the form of tapes or CDs, additional data about the tapes or CDs may be stored in the operations center database. Each tape or CD may have a database record associated with it, source tape data file. Each tape may contain multiple cuts of which each cut has an associated record in a source tape detailed data file. Additionally, a company data file may contain individual records for the rights of the holders of the source tapes as well as company information about cable headends 208. In this alternative embodiment with tapes, programs may be created from multiple tapes using multiple tape source cuts. The programs created by these source cuts may be stored and the individual cuts that make up the programs may be stored in a database record called "program tape detail." Events may be created that consist of more than one program and details on individual programs that make up these events may be stored in a database file called "event detail." Using this embodiment, events may be sold to subscribers.

Figure 10:
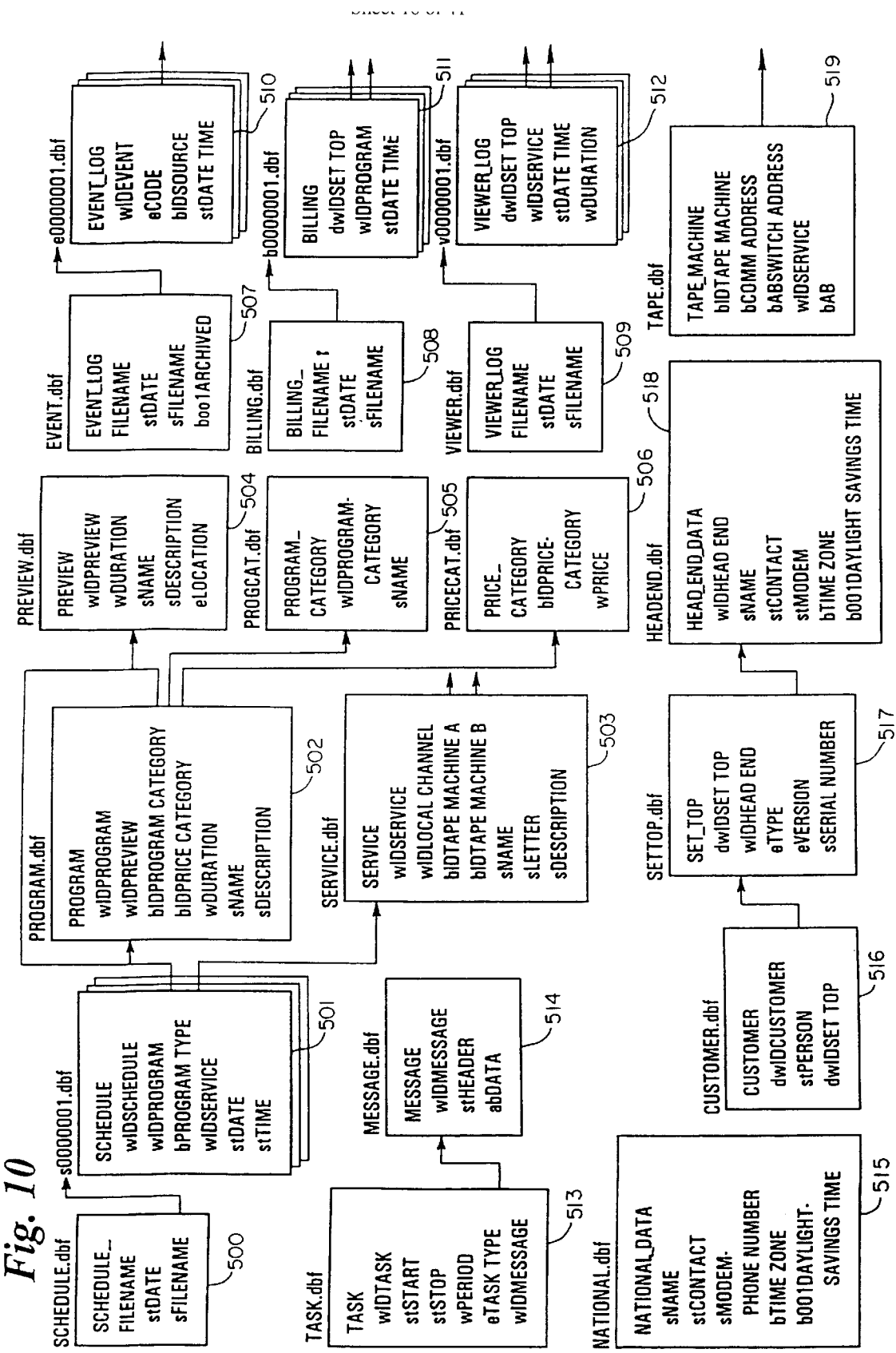
FIG. 10 is a diagram of the database structure for the databases supporting the operations of the CAP.

FIG. 10 and the description below is a more complete example of a database structure that can be used with the present invention. Each database file is listed below along with a description, record field details and explanation of relationships. The software data structures are defined after the description of the database structure.

The SCHEDULE Database file 501 contains scheduling data for a single day. There are many schedule files, one for each day of schedule information. The actual filename for a given days schedule is assigned under computer control. Schedules are broken up into single days so they may be easily created, dispatched and archived. A cross-reference of days to computer generated filenames is kept. Each scheduled event (either a program or a preview) has its own record entry and unique schedule ID This record references the corresponding scheduled program or preview and program type (either program or preview). The service to carry the scheduled program is also referenced. The starting date and time is also specified. Program duration is stored as a program attribute and is not included here. Note that program, preview and service records must be provisioned before they may be referenced in a schedule record.

Another SCHEDULE Database file 500 contains a cross-reference of starting dates data to computer generated filenames.

The PROGRAM Database file 502 contains Program records are contained in another database file 502, with each record representing a source program. Each program has a unique program ID. If the program has a corresponding preview, it is also referenced. Program category and price are also referenced. The structure of the program category database may be modified if multiple categories per program are desired. Program name, description and duration are also given. Note that preview, program category and price category records must be provisioned before they may be referenced in a program record.

The SERVICE Database file 503 contains service records with each record representing an available service. A service may be thought of as a virtual video channel. Virtual channels are non-existent channels which are mapped or created by hardware and software and is described in co-pending patent application Ser. No. 08/160,194, entitled ADVANCED SET TOP TERMINAL FOR A CABLE TELEVISION DELIVERY SYSTEM, incorporated herein by reference. Services are then mapped into local headend channels. Since initial distribution of video source material may be by "Federal Express" instead of a video channel, a service ID is used to identify the virtual channel being used for the desired service. "60 Minutes" could be distributed and then be mapped into any desired local headend channel. The service database exists at both the national site and at each local headend 208. Every service has a name, call letters and a description of the service. Every service also has an assigned local channel, "A" tape (or CD) machine ID and "B" tape (or CD) machine ID. Note that these last three parameters only apply to the service databases at the local headends 208. The local headend service database performs an equivalent function of a "channel map." For a further description of the cable headend function, see co-pending patent application Ser. No. 08/735,549, entitled NETWORK CONTROLLER FOR A CABLE TELEVISION DELIVERY SYSTEM, filed by the same assignee.

The PREVIEW Database file 504 contains preview records with each record representing a source preview. A preview is like a program that is scheduled and distributed over a service. It differs from a program in that multiple previews may be distributed over the same service at the same time. Also, previews are free. Each preview specifies its location on the TV screen. This is generally done by selecting from a menu of valid screen positions. Unlike programs, previews do not reference program and price categories or other previews.

The PROGRAM CATEGORY Database file 505 contains program category records with each record representing a valid program category. Examples of program categories are movies, sports, educational and news. Multiple program categories per program may be accommodated if desired with simple changes to the database structure.

The PRICE CATEGORY Database file 506 contains price category records with each record representing a valid price category. Price categories are used to provide pricing consistency throughout the system. It also provides flexibility at the headend 208 to price various categories differently should this be desired. For example, distributed movies may be assigned the price category "movie" at the national site. Each headend 208 could then charge differing amounts for their movies by manipulating their local price category database. If a current price structure needed to be changed, the change would be made once in the price category database instead of in each program record.

The EVENT LOG Database file 510 contains event data for a single day. There are many event files, one for each day of event information. The actual filename for a given days events is assigned under computer control. Events are broken up into single days so they may be easily archived. A cross-reference of days to computer generated filenames is kept.

Each event record contains a unique ID, an event code, ID of the process that generated the event and date/time stamp of the event.

The EVENT LOG FILENAME Database file 507 contains a cross-reference of start date to computer generated filenames.

The VIEWER LOG Database file 512 contains viewer log data for a single day. There are many viewer log files, one for each day of viewer log information. The actual filename for a given days viewer log data is assigned under computer control. Viewer log data is broken up into single days so it may be easily archived. A cross-reference of days to computer generated filenames is kept.

Each event record contains a unique ID, an event code, ID of the process that generated the event and date/time stamp of the event. The Marketing Information Interface 402 accesses the VIEWER LOG Database file as necessary to retrieve "program watched" information 420.

The VIEWER LOG FILENAME Database file 509 contains a cross-reference of date to computer generated filenames.

The BILLING Database file 511 contains billing data for a single day. There are many billing files, one for each day of billing information. The actual filename for a given days billing data is assigned under computer control. Billing data is broken up into single days so it may be easily archived. A cross-reference of days to computer generated filenames is kept.

Each event record contains a unique ID, an event code, ID of the process that generated the event and date/time stamp of the event.

The BILLING FILENAME Database file 508 contains a cross-reference of start date to computer generated filenames.

The NEWS FILENAME Database file 509 contains a cross-reference of date to computer generated filenames.

The SET TOP Database file 517 contains set top converter records with each record representing a unique set top converter. Each set top is assigned to a headend 208. Set-top type, software version and serial number is also stored. Note that headend records must be provisioned before they may be referenced in a set top record.

The HEAD END Database file 518 contains headend records with each record containing headend 208 data specific to a single headend 208. Each headend 208 has a name, contact name, address, phone number, modem information, time zone (relative to GMT) and daylight savings time flag. This information may be stored in a separate database file called Cable Franchise Configuration (shown as 328 in FIG. 11).

The NATIONAL Database file 515 contains a single record containing national site information. This includes site name, contact, modem information, time zone and daylight savings time flag.

The CUSTOMER Database file 516 contains customer records with each record containing customer data specific to a single customer. This includes personal information (name, address, phone number, . . . ) and assigned set top converter.

The TAPE MACHINE Database file 519 contains video tape or CD machine information. Each machine is assigned a unique ID, its control port address, its A/B switch address (if present), its assigned service and an A/B assignment. This database is only located at the headends 208.

The MESSAGE Database file 514 contains available system messages. They are detailed in nature and are pre-programmed. Each message has an associated function. To schedule a desired function, the appropriate message is referenced in the scheduler task list.

The TASK Database file 513 contains scheduled tasks to be performed periodically. It is used in conjunction with a scheduler process to control computer system functions such as data dispatch and retrieval, archival and database maintenance. Each task is assigned a unique ID, start time, stop time, period in minutes) and task type (single, periodic, round-robin). Functions are actually scheduled by scheduling the appropriate message to be sent to the appropriate process. Available messages are kept in a separate database. Note that these messages must be provisioned before they may be referenced in a task record.

F. System Operations

FIG. 11 shows the basic operations that must occur in order for the packaged signal to be sent to the satellite 206. External digital 280 and analog signals 282 must be received from television programming sources and converted to a standard digital format by a converter 284, as described above. Also within the operations center 202, stored programs 286 must be accessed using banks of looping tape machines or other video storage/retrieval devices, either analog or digital, and converted to a standard digital format by the converter 284 prior to use by the CAP 260.

The programmer or program packager utilizing the CAP 260 must input a variety of information, including program information, in order to allow the CAP 260 to perform its function of generating program control information and packaging programs. Some of the information required by the CAP 260 are the date, time slots and program categories desired by the television programmer.

The CAP 260 system includes one or more CPUs and one or more programmer/packager consoles, together identified in FIG. 4 as workstations 262. In the preferred embodiment, each packager console includes one or more CRT screens, a keyboard, a mouse (or cursor movement), and standard video editing equipment. In large operations centers 202, multiple packager consoles 262 may be needed for the CAP 260.

Figure 12:
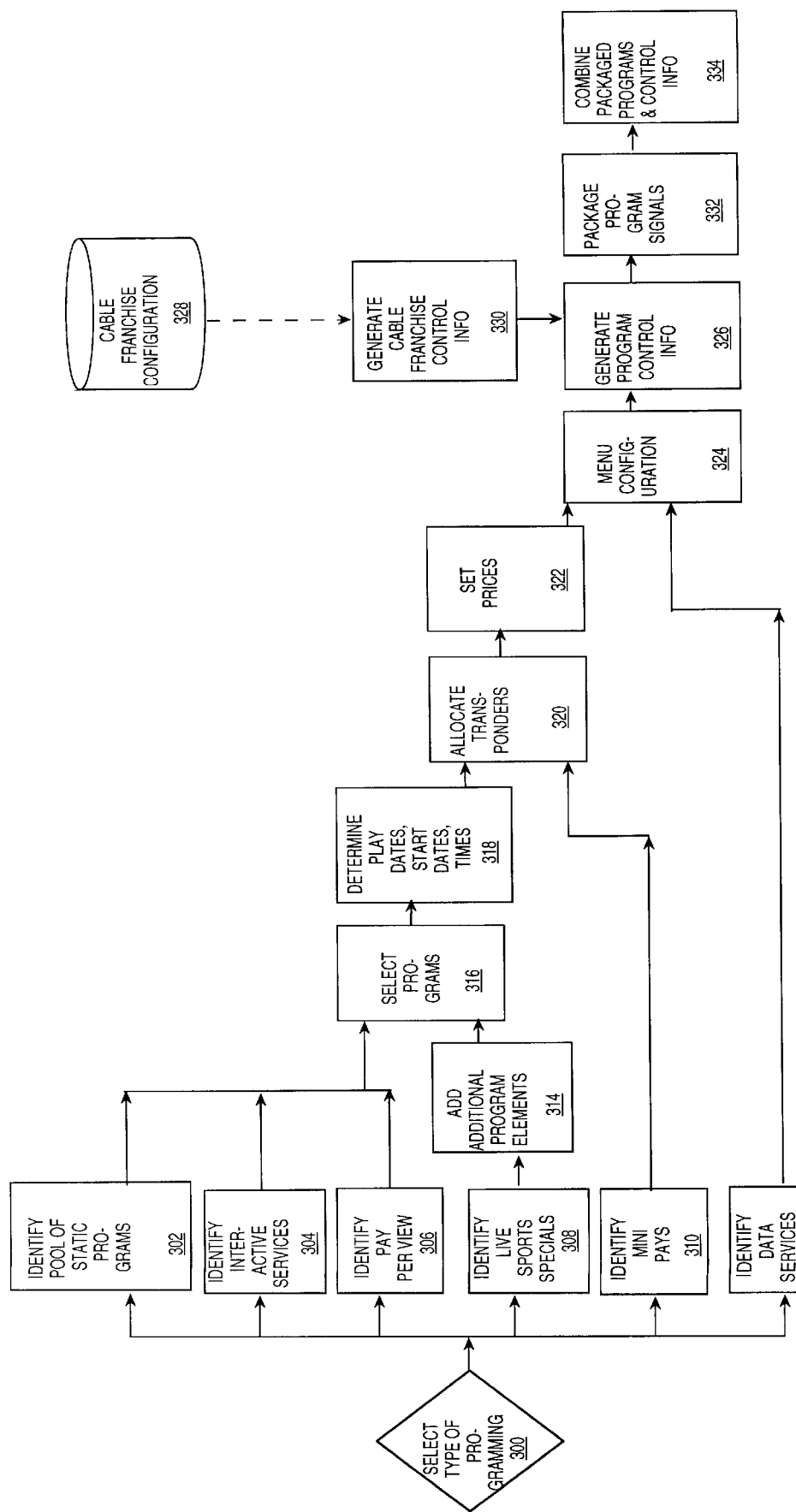
FIG. 12 is a block diagram of the computer assisted packaging shown in FIG. 11.

As shown in FIG. 12, the first step in the operation of the CAP 260 is selecting the type of programming 300 which will be packaged. Basically there are six broad categories in which most television programming can be classified: static programming 302, interactive services 304, pay per view 306, live sports specials 308, mini pays 310, and data services 312. Static programs are programs which will show repetitively over a period of time such as a day or week. Static programs include movies showing repetitively on movie channels, children's programs, documentaries, news, entertainment. Program services, with defined start and end time periods, behave like static programs and may be handled in a similar manner.

Interactive services 304 typically include interactive programs using the Vertical Blanking Interval (VBI) or other data streams synchronized with the programming to communicate interactive features (such as those used in education), and games. Using this feature, interactive home shopping programs are possible. Pay per view 306 are programs which are individually ordered by the subscriber. After ordering, the subscriber is authorized to access the program for a limited time, (e.g. three hours, two days, etc.). Live sports specials are live events usually related to sports which subscribers are unlikely to watch on taped delay.

Mini pays 310 are channels to which existing set top converter boxes (not shown) and the set top terminals 220 of the present invention may subscribe. The subscriptions for mini pays 310 may be daily, weekly, or monthly. An example would be the Science Fiction channel. Data services 312 are services in which information is interactively presented to the subscriber using a modem or other high rate of speed data transfer. Some examples are Prodigy, services for airline reservations, and TV guide services (e.g. TV Guide X*PRESS™, InSight™, etc.). Data could also include classified or other forms of advertising.

The packager begins the CAP processing using the Packager Data Entry Interface Software 400 and a workstation 262. After selecting the type of programming, the packager must identify a pool of programs (within a category) to be packaged. The next CAP step varies for different program categories. For the category of live sports 308, additional program interstitial elements 314 such as promos and other sports news may be added before further processing. For the live sports 308, static (or program service) 302, interactive services 304 and pay per view 306 categories, the next CAP 260 step is for one television program to be selected 316. This is followed by each program individually being assigned dates to be played, a start date (for continuous play) and start times 318. Many dates and start times may be assigned to any given program. Using this methodology, programs may be purchased by viewers in time slices (e.g., one week). The program information for these categories may then be processed for allocation of transponder space and setting of prices, as indicated at blocks 320, 322, respectively.

Mini pays 310 and data services 312 require less processing by the CAP 260. After identifying the mini pays 310, the CAP 260 may proceed to allocation of transponder space and pricing, block 320, for the mini pays 310. Data services in the preferred embodiment generally do not require allocation of transponder space and generally do not require price setting. The information for data services 312 may be directly processed for menu configuration, block 324. In alternate embodiments, the data services 312 may be processed through these portions of the CAP 260 program.

The CAP 260 uses an interactive algorithm 416 to allocate transponder space 320 and set prices 322. The factors weighed by the algorithm are: 1. buy rates of the program, 2. margin of profit on the program, 3. length of the program, 4. any contractual requirement which overrides other factors (such as requirement to run a specific football game live in its entirety). The information on buy rates of the program may be obtained by the Marketing Information Interface 400 from a Central Statistical and Billing Site, a Regional Statistical and Billing Site, the cable headend 208 or directly from the set top terminals 220 as will be described later. The CAP 260 must consider the priority levels of programming (e.g., FIG. 16) when allocating transponder space. Particularly, as in the preferred embodiment, transponders are assigned to three specific priority levels. The CAP may automatically (without packager intervention) access the MII 400 and the EIS to obtain necessary decision making information on transponder allocation.

Following transponder allocation and price setting 320, 322, respectively, the CAP 260 proceeds to menu configuration 324. The positioning of programs within the menu configuration 324 can have an effect on subscriber buy rates for the program. (The processing of menu configurations 432 is also described in reference to FIG. 8.) Therefore, an algorithm accounting for either a manually assigned program importance or a calculated weight of the program importance is used to determine each programs position within the menu scheme. For instance, a popular program with a high profit margin may be assigned a high weight of importance and shown in a prominent place in the menu scheme. Alternatively, a high profit program with sagging sales may be manually assigned a prominent place in the program schedule to increase sales.

After a series of entries by the programmer/packager at the operations center 202, the CAP 260 displays draft menus 434 or schedules (including priority levels) for programming. The packager may now manipulate the menus and schedules and make changes as necessary 436. After each change, the packager may again display the menus or schedules and determine if any more changes are necessary 436. The packager may use the Executive Information System with yield management as described below to assist in editing the menus and schedules. When the packager is satisfied with the menu configuration 324 and scheduling of television programs, the packager may then instruct the CAP 260 to complete the process.

After menu configuration 324, the CAP 260 may begin the process of generating a program control information signal 326 (see also FIG. 8 software description at 442 and 404). In order to generate program control information signals 326 which are specific to a particular cable headend 208 system, the CAP 260 incorporates cable franchise configuration information 328. In the preferred embodiment, unique cable franchise configuration information 328 is stored at the operations center 202. The cable franchises upload changes to their specific franchise information 426 from time to time to the operations center 202 for storage 328. Preferably, a separate CPU (not shown) handles the management of the cable franchise information 328. From the stored cable franchise information 328, the CAP 260 generates a cable franchise control information signal 330 unique to each franchise.

Using the unique cable franchise control information signals 328 and the menu configuration 324 information, the CAP 260 generates the program control information signal 276, as shown at function block 326. The program control information that is unique to a particular cable franchise may be identified in various ways such as with a header. With the header identification, the cable headend 208 may extract the portions of the program control information signal 276 it needs. Now, the CAP 260 may complete its process by electronically packaging the programs into groupings 280 for the signal transmission and adding the program control information 276 to the packaged programs 334 to form a single signal for transmission. Through manual entries by the packager (PDEI 400) or by comparing against a list of programs, the CAP 260 will determine whether the programs are arriving from external sources 280 or sources internal 286 to the operations center 202.

Referring back to FIG. 11, upon completion of the CAP's functions, the operations center 202, or the uplink site 204 (FIG. 1), compresses 288 (if necessary), multiplexes 290, modulates 292 and amplifies 294 the signal for satellite transmission 296. In a basic embodiment, the CAP 260 will also allow entry of time slots for local avails where no national programming will occur.

Figure 13:
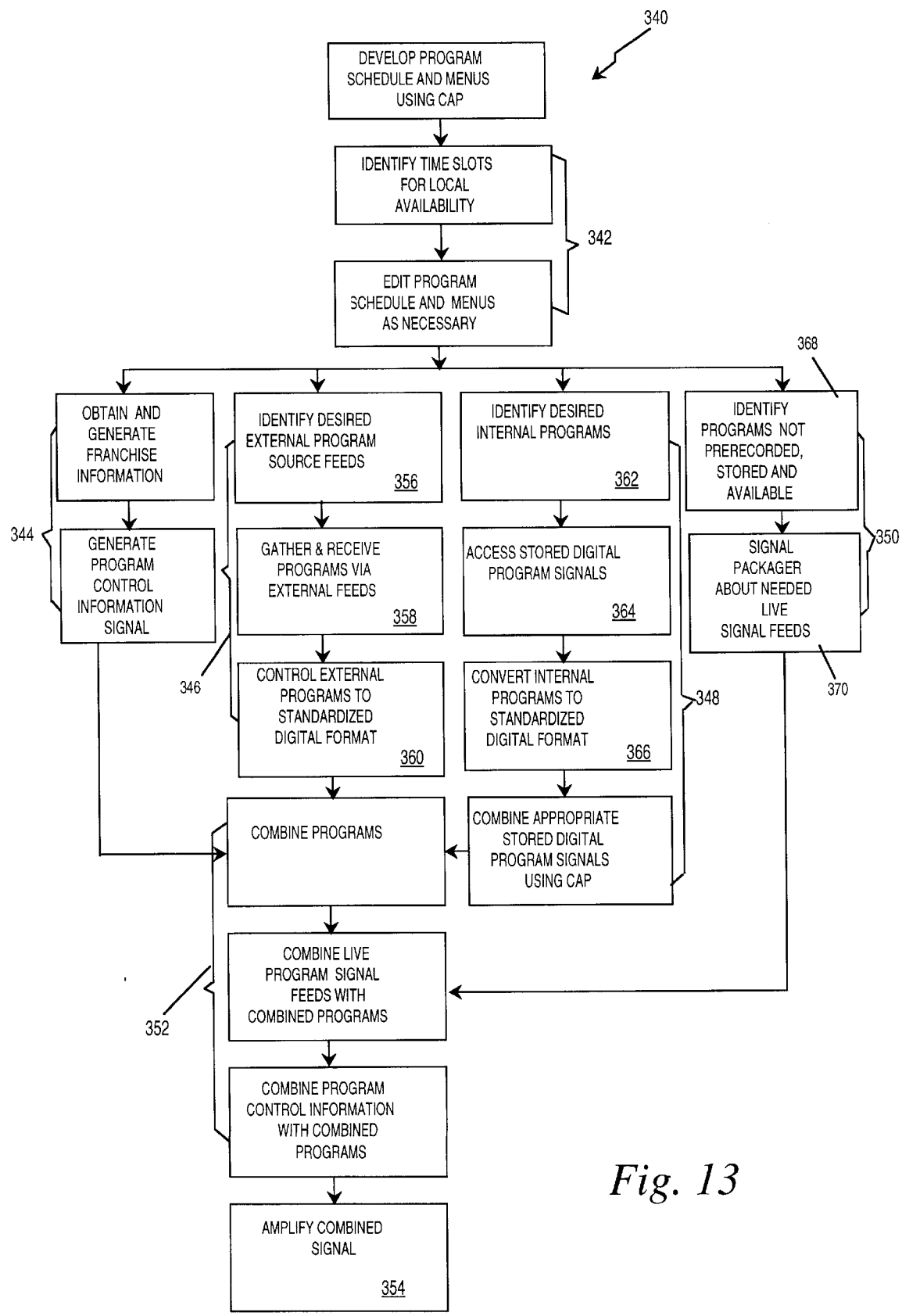
FIG. 13 is a flow chart of the processing occurring at the operations center.

FIG. 13 is a more detailed flow chart 340 of some of the functions performed by the CAP 260 after an initial program schedule has been entered and menu configurations generated. This flow chart highlights that some of the functions described earlier in reference to FIGS. 8, 9, 11 and 12 can be performed in parallel. The flow chart 340 shows six basic functions that are performed by the CAP 260: (1) editing program schedule for local availability 342 (only for non-standard services, i.e., those services that are not national cable services); (2) generating program control information signals 344; (3) processing external programs 346; (4) processing internal programs 348; (5) processing live feeds 350; and, (6) packaging of program information 352. In an alternate embodiment, the CAP 260 is capable of incorporating local programs and accommodating local availability for local television stations.

Following completion of the programming scheduling (accounting for local availability if necessary) and menu generation 342, the CAP 260 may perform three tasks simultaneously, generating program information signals 344, processing external programs 346 and processing internal programs 348.

The CAP 260 automatically identifies external programs feeds 356 and identifies which external feed to request the external program 358. The CAP 260 gathers and receives the external programming information 280, 282 (FIG. 11) and converts it to a standard digital format 360 for use. The CAP 260 also identifies internal programs 362 (and defined program services), accesses the internal programs 364 (and program services), and converts them to a standard digital format 366, if necessary. In addition, the CAP 260 identifies live signal feeds 368 that will be necessary to complete the packaged programming signal 370. In its last task depicted in FIG. 13 the CAP 260 completes the packaging of the programs and combines the packaged program signal with the program control information signal 352, amplifies the signal 354 and sends it out for further processing prior to uplink.

G. Allocation of Cable System Bandwidth

Figures 14, 15:
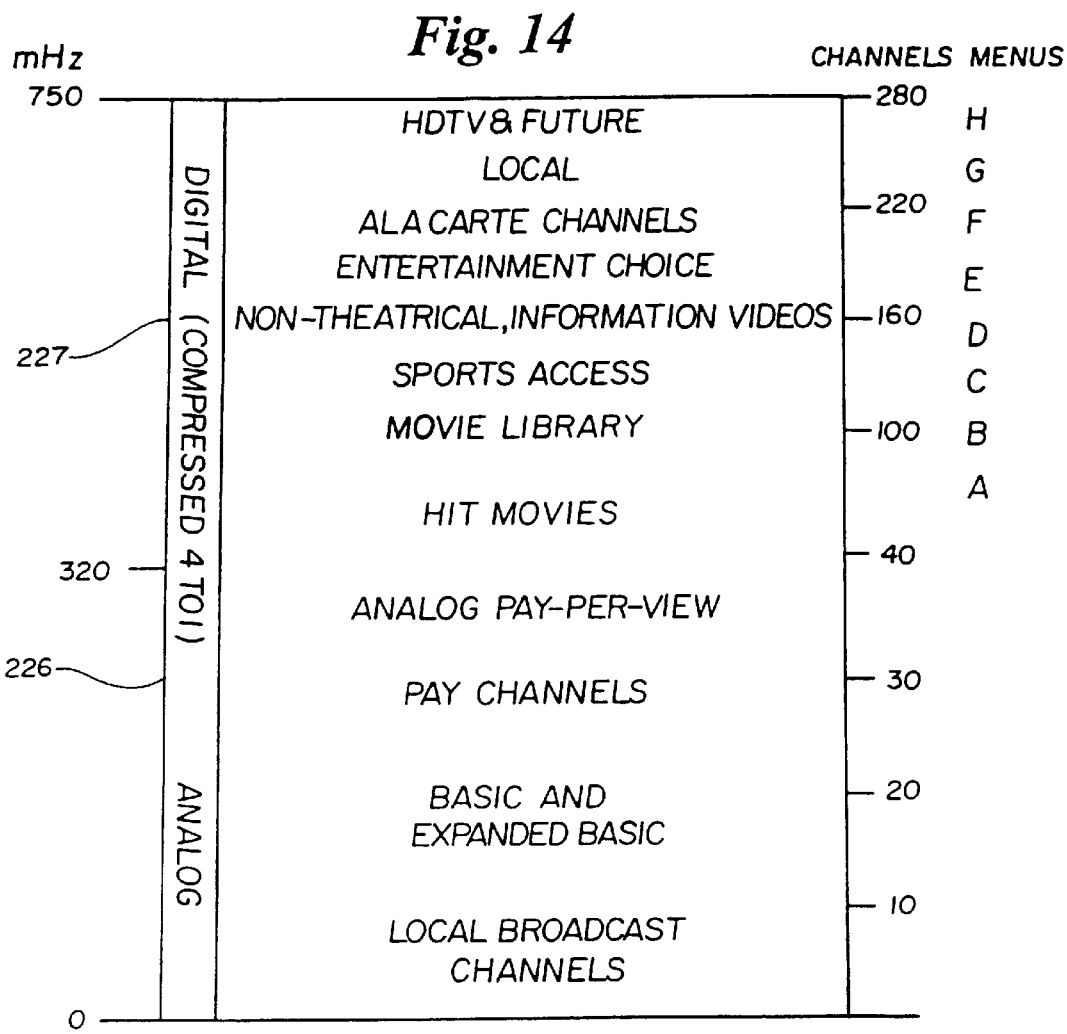
FIG. 14 is a diagram of the bandwidth allocation for a 750 MHZ system.
FIG. 15 is a diagram/chart of the compressed channel allocation for the system.

One of the primary tasks of the operations center 202 is, with assistance from the cable headends 208, effective utilization of available bandwidth from the operations center 202 to the subscriber homes. FIG. 14 shows effective allocation of 750 MHZ of bandwidth (I MHZ to 750 MHZ) for television programming. In FIG. 14, bandwidth is allocated for both analog 226 and digitally compressed 227 signals. In the preferred embodiment, the bandwidth is divided so that each category of programs receives a portion of the bandwidth. These categories correspond with major menus of the set top terminal software. The representative categories shown in FIG. 14 include: (1) high definition TV (HDTV) made possible through the use of compression technology, (2) A La Carte Channel category which provides specialty channels for subscription periods such as monthly, and (3) pay-per-view.

FIG. 15 shows a chart 228 of compressed channel allocation for a variety of programming categories 229 that have been found to be desirable to subscribers. By grouping similar shows or a series of shows into blocks of channels 230, the system 200 is able to more conveniently display similar programming with on-screen television menus. For example, in the movie category, which has the greatest allocation of channels, the same movie may be shown continuously and simultaneously on different channels. Each channel starts the movie at a different time allowing the subscriber to choose a more suitable movie starting time (e.g., every 15 minutes).

In order to accommodate cable TV systems that have different bandwidths and channel capacities, the television programming and television program control information may be divided into parts such as priority one, two and three. The large bandwidth cable TV systems can accommodate all the parts of the television programming and all parts of the television programming control information. Those cable TV systems with a more limited bandwidth are able to use the program delivery system 200 by only accepting the number of parts that the cable system can handle within its bandwidth.

For instance, as is shown in FIG. 16, three cable television systems with different bandwidths may use the program delivery system 200 simultaneously with each system accepting only those parts of the information sent which it is capable of handling. Priority one television programming and menus 240 are accepted by all three systems. Priority two television programming and menus 242 are not accepted by the cable television system whose capacity is the smallest or in this case 330 MHZ (40 channels) system. Priority two television programming and menus 242 are accepted and used by the two larger capacity cable television systems shown. Priority three television programming and menus 244 are only used by the largest capacity television system which is capable of handling all three parts—Priority one, two and three programming and menu information.

With this division of television programming and menus, the program delivery system 200 may be utilized simultaneously by a variety of concatenated cable systems 210 (depicted in FIG. 1) with varying system capacities. By placing the heavily watched or more profitable programming and menus in the priority one division 240, both users and owners of the cable TV systems will be accommodated as best as possible within the limited bandwidth.

Figure 17:
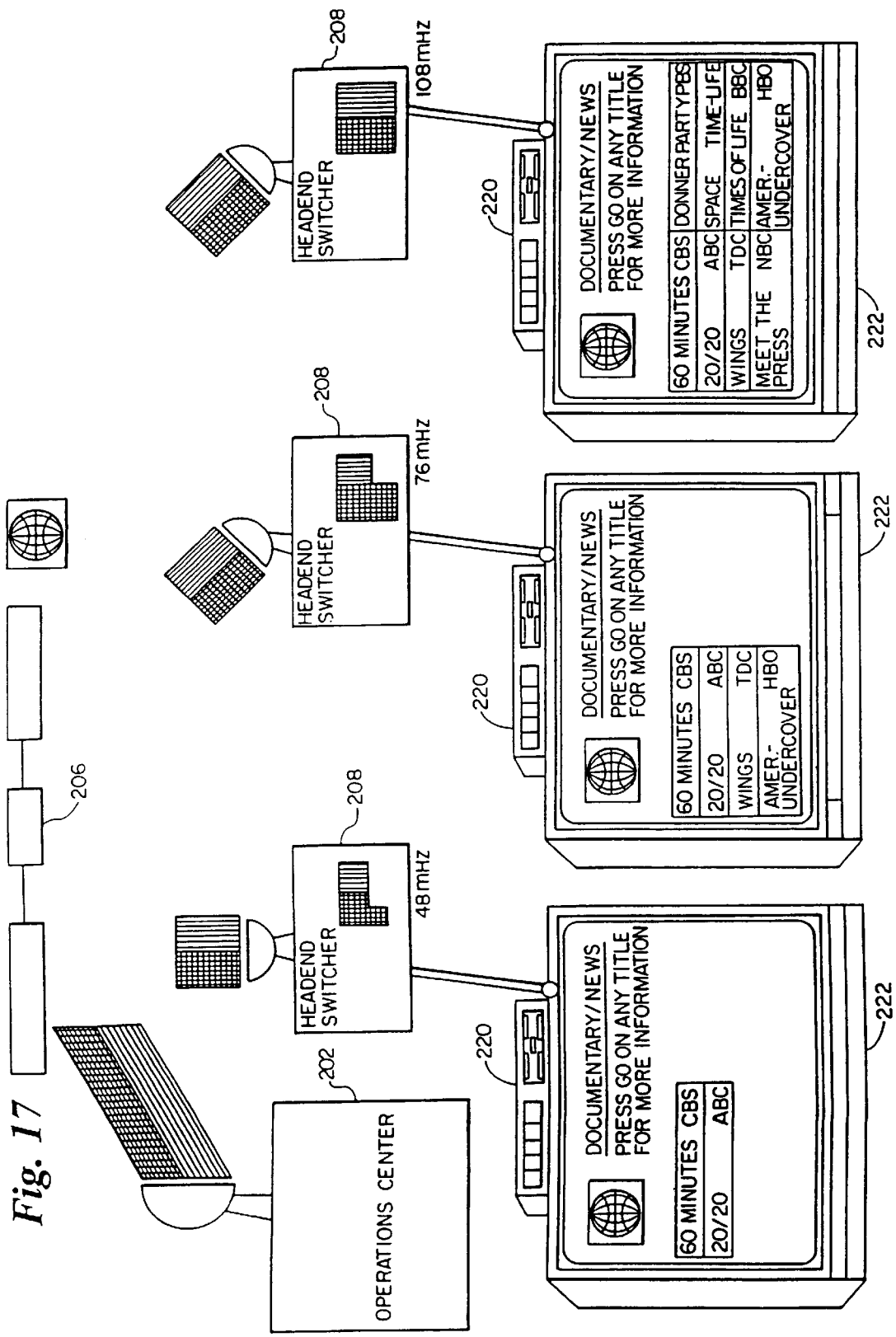
FIG. 17 is a diagram showing three different cable headend systems, each system receiving the entire satellite signal and stripping those parts of the signal which cannot be handled by the local cable system.

FIG. 17 shows three different cable headend 208 systems, each system receiving the entire satellite signal from the operations center 202 and stripping those parts of the signal which cannot be handled by the local cable system due to bandwidth limitations. In this particular embodiment, the three local cable television systems shown have bandwidth limitations which correspond with the bandwidth limitations depicted in the previous FIG. 16. As the bandwidth decreases, the programming options available to the viewer in the exemplary on-screen menu decreases. Using this preferred embodiment, the operations center 202 is able to send one identical signal to the satellite 206 that is sent to all the cable headends 208. Each cable headend 208 accepts the entire signal and customizes the signal for the local cable system by stripping those portions of the operations center signal that are unable to be handled by the local cable system. An alternate embodiment (not shown) requires the operations center 202 (and uplink sites 204) to send different signals for reception by different capacity cable headends 208.

There are several ways in which a cable headend 208 may strip the unnecessary signal from the operations center 202. A person skilled in the art will derive many methods from the three examples discussed below. The first method is for the signal originating from the operations center 202 (and uplink site 204) to be sent in portions with each portion having a separate header. The respective cable headend 208 would then recognize the headers and transmit to the concatenated cable system 210 only those signals in which the proper headers are identified. For example, using three concatenated cable systems shown in FIG. 17, the headers may be "001," "002," and "003." A wide bandwidth concatenated cable system can accept program signals with all three headers, while the narrowest bandwidth concatenated cable system may only be able to accept signals with a "001" header. For this first method, a central operations center 202 must divide the program signal into three parts and send a separate leading header before each signal for each part. This method requires has the additional signal overhead of a header on the program signal. The header would be transmitted from time to time as necessary.

A second method requires a set of transponders to be assigned to each priority level and the cable headend 208 to route signals from the transponders corresponding to the proper priority level for the concatenated cable system 210. For example, if there are three priority levels and eighteen transponders, transponders one through nine may be assigned to priority level one, transponders ten through fourteen priority level two, and transponders fifteen through eighteen assigned to priority level three. Thus, a concatenated cable system 210 capable of operating only at priority level two, would only receive signals from transponders one through nine, and ten through fourteen from the respective cable headend 208. The program signal from transponders fifteen through eighteen would not be transmitted to the priority level two concatenated cable system. This method requires the operations center 202 to properly assign programs to transponders by priority level. This can be accomplished by the CAP using the software described earlier (e.g., FIG. 8 at 438 and 440).

The third and the preferred method is for the cable headend 208 to pick and choose programming from each transponder and create a customized priority one, two, and three signal with chosen television programming. The cable headend 208 would then route the appropriate customized signal to each part of the concatenated cable system 210 that the cable headend 208 serves. This third method requires that the cable headend 208 have a component, such as the combiner (described in greater detail in a co-pending U.S. patent application Ser. No. 08/160,283, entitled DIGITAL CABLE HEADEND FOR A CABLE TELEVISION DELIVERY SYSTEM, owned by the assignee of the present application) which can select among programs prior to combining the signal for further transmission on a concatenated cable system 210. The third method requires the least coordination between operations center 202 and the cable headend 208.

Figure 18:
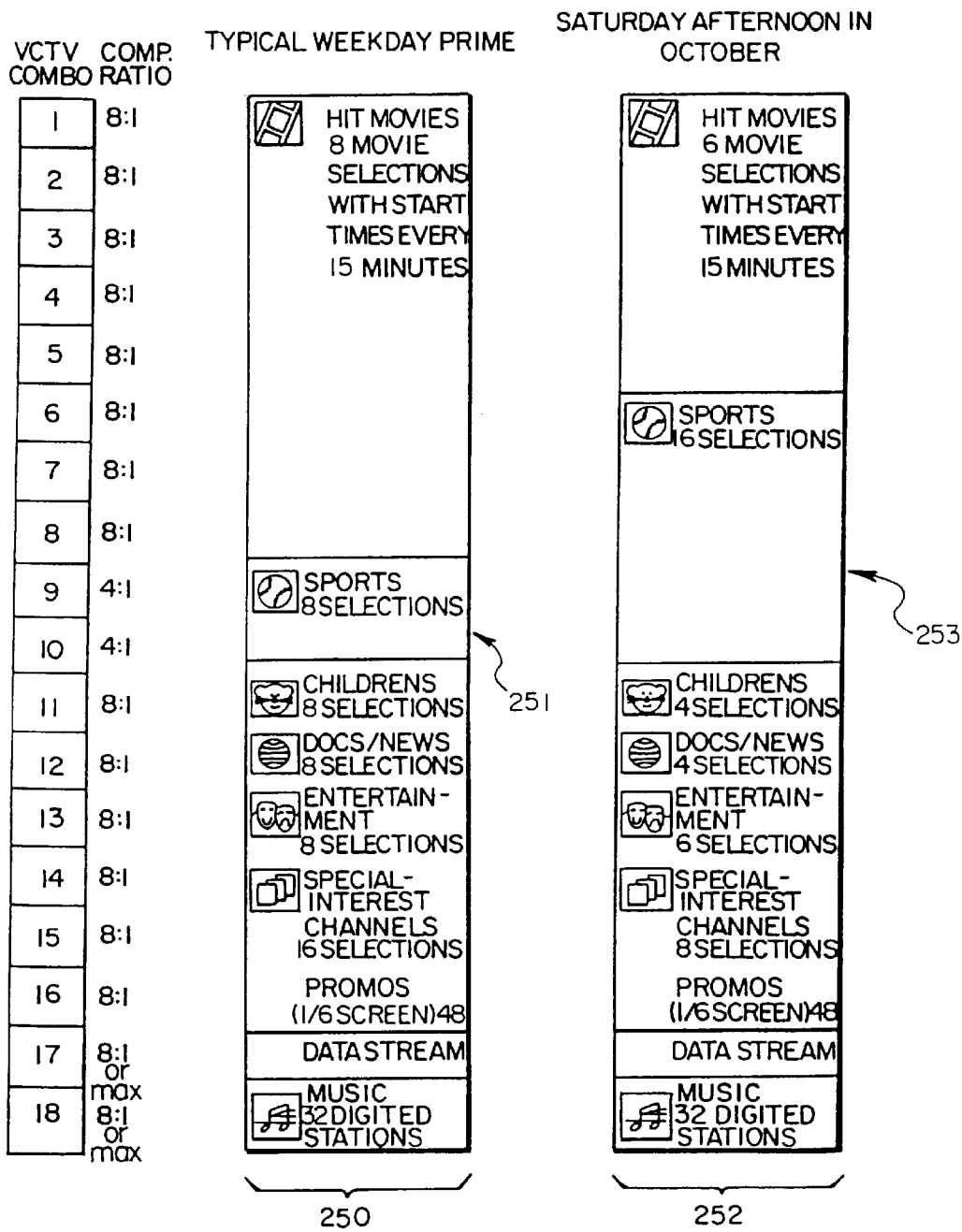
FIG. 18 is a diagram showing dynamic change in bandwidth allocation from a typical week day prime time program signal to a Saturday afternoon program signal.

In addition to dividing the television programming and menus into parts, the operations center 202 of the preferred embodiment is also capable of dynamically changing the bandwidth allocation for a particular category of programming. FIG. 18 depicts this dynamic change in bandwidth allocation from a typical week day prime time signal 250 to a Saturday afternoon in October signal 252 (during the college football season). FIG. 18 highlights the fact that the bandwidth allocated to sports is limited to eight selections 251 during week day prime time 250 but is increased to sixteen selections 253 during a Saturday afternoon in October 252. This dynamic increase in bandwidth allocation allows the system to accommodate changes in programming occurring on an hourly, daily, weekly, monthly, seasonal and annual basis.

In addition to dynamically allocating bandwidth for programming categories, the operations center 202 can also dynamically change the menu capacities in order to accommodate the change in programming and bandwidth. For example, on a Saturday afternoon in October 252, the major menu for sports may include a separate subcategory for college football. This subcategory would, in turn, have a separate submenu with a listing of four, six, eight, or more college football games available for viewing. In order to accommodate this dynamic menu change, the operations center 202 must add a submenu listing to the major sports menu, create a new or temporary submenu for college football, and allocate the necessary menu space on the college football submenu.

Once the television programs have been packaged and a program control information signal is generated to describe the various categories and programs available, the packaged programs are then digitized, compressed, and combined with the program control information signal. Upon the signal's departure from the operations center 202 the breakdown into categories is insignificant and the signal is treated like any other digitally compressed signal H. Compressing and Transmitting Program Signals After packaging, the packaged television program signal is prepared for satellite transmission and sent from the operations center 202 to the cable headend 208 via satellite 206. Depending on the specific embodiment, the television program signal may need to be compressed, combined/multiplexed, encoded, mapped, modulated, up converted and amplified. This system, which is intended to be compatible with existing C and Ku Band satellite transmission technologies, accepts video, audio and data signals ranging in signal quality, and input from a number of sources.

As shown in FIG. 3, in the preferred embodiment, the packaged program signal will be treated at a master control uplink site 211 prior to being transmitted to the satellite 206. Following compression the channels must be multiplexed for each transponder carrier and sent to the satellite 206 dish that will provide the uplink. A variety of multiplexing schemes may be used in the system. In some situations, it may be advantageous to use different multiplexing schemes in different parts of the overall system. In other words, one multiplexing scheme may be used for satellite transmission 206 and a second remultiplexing scheme for the land transmission. Various satellite multi-accessing schemes and architectures can be used with the system, including both single channel per carrier (SCPC) frequency division multiplex (FDM) and multiple channel per carrier (MCPC) time division multiplexing (TDM). Time division multiplexing is the more desirable scheme.

Once the signal has arrived at the uplink or master control site 211, it must be modulated, up converted, and amplified. Various types of satellites and transponders capable of handling digital signals may be used in this cable television packaging and delivery system. One of the achievements of the present invention is effective utilization of digital compression technology by packaging television programs into categories that allow easy access to television programs by consumers. With current digital compression techniques for video, the typical 50-channel capacity cable satellite receiving system can be increased to 300 channels.

Presently, one transponder is used for each satellite delivered channel. The preferred embodiment uses 18 satellite transponders and compression ratios of 4:1 to 8:1 to achieve a capacity of 136 satellite delivered channels. More transponders or higher compression ratios can be used to deliver up to the channel capacity of any existing cable system.

An example of a satellite that may be used is the AT&T Telstar 303. The signal is transmitted from the satellite 206 to the cable headend 208 where a computer system including a digital switch treats the signal and delivers it through cables to a subscriber's home. In alternate embodiments, multiple operations center 202 and multiple uplink sites 211 can be simultaneously utilized.

In order to limit the amount of bandwidth needed to transmit the program control information signal, various compression techniques employed for non-video may be used such as block coding, contour coding, blob encoding, and run-length encoding. Further, the program control information signal may be divided into text and graphics, or video, text and graphics and then recombined at the set top terminal 220 using a text generator, graphics decompression, and video decompression as necessary.

As shown in FIG. 2, an analog cable TV system 205 can continue to exist alongside and within the digitally compressed system of the present invention. The digital transmissions do not effect the analog system. In fact, the analog cable signal may be transmitted simultaneously on the same cable as the digital signal. Cable headends 208 may continue to supply subscribers with local channels in an analog signal format.

In the preferred embodiment, the operations center 202 and uplink 204 (FIG. 1) or master control site 211 (FIG. 3) are collocated. However, the operations center 202 and uplink site 204 may be located in different geographical places. Also, functions and equipment within the operations center 202 may be remotely located. For instance, the program storage may be at a different site and the programs may be sent to the CAP 260 via landline.

Alternate embodiments of the system 200 of the present invention may use multiple operations centers described above. In such an embodiment, it is preferred that one operations center be designated the Master Operations Center and all other operations centers be Slave Operations Centers. The Master Operations Center performs the functions of managing and coordinating the Slave Operations Centers. Depending on the method in which the Slave Operations Centers share functions, the Master Operations Center coordination function may involve synchronization of simultaneous transmissions from multiple Slave Operations Centers. To perform its functions, the Master Operations Center may include a system clock for synchronization.

An efficient method of dividing tasks among multiple operations centers is to assign specific satellite transponders to each operations center 202 and to assign external program sources to the nearest operations center 202. Of course, this division of resources may not always be possible. Since programming will be grouped into priority levels with each priority level likely to be assigned specific satellite transponders, it is also possible to assign each operations center 202 to a priority level. For example, in a three priority level system with two Slave Operations Centers A and B and 18 transponders, the Master Operations Center may be assigned priority level 1 and assigned 9 transponders. Slave Operations Center A may be assigned priority level 2 and 5 transponders, while Slave Operations Center B is assigned priority level 3 and 4 transponders. In a multiple operations center configuration dynamic bandwidth allocation and dynamic menu capacity allocation becomes more complex and will be coordinated by the Master Operations Center.

Just as in the alternate embodiment wherein multiple operations centers 202 are used, a delivery system may have multiple satellite uplinks. Preferably, each operations center 202 has one or more uplink sites. Each operations center 202 controls the functions of its assigned uplink sites and may assign one site as a master uplink site.

In another alternative configuration, in regions or areas without cable services, where subscribers might use backyard satellite systems (TV RO) to receive packaged television services, the set top terminal 220 will include the appropriate hardware to allow connection to the backyard satellite reception equipment, i.e., a typical communication port. In this configuration, the backyard satellite system will receive programming signals originating from the operations center 202 directly from the satellite transponders. No cable headend 208 is utilized with a backyard satellite system. The menu system within the set top terminal 220 will be programmed directly from the operations center 202. The operations center program signals and control signals arrive at the set top terminal 220 essentially unchanged. Additionally, in this configuration, an upstream communication mechanism must be in place at the subscriber's home (e.g., modem) to communicate information to the operations center 202 such as program ordering information. The set top terminals 220 can be equipped with a modem port for this upstream communication to the operations center 202. The two alternative embodiments described in the preceding four paragraphs, and other such embodiments not specifically referred to herein but within the understanding of those skilled in the art, incorporate or combine one or more of the components of the system 200 of the present invention.

I. Network Controller Description

1. Monitoring and Control of Set Top Terminals

Figure 19:
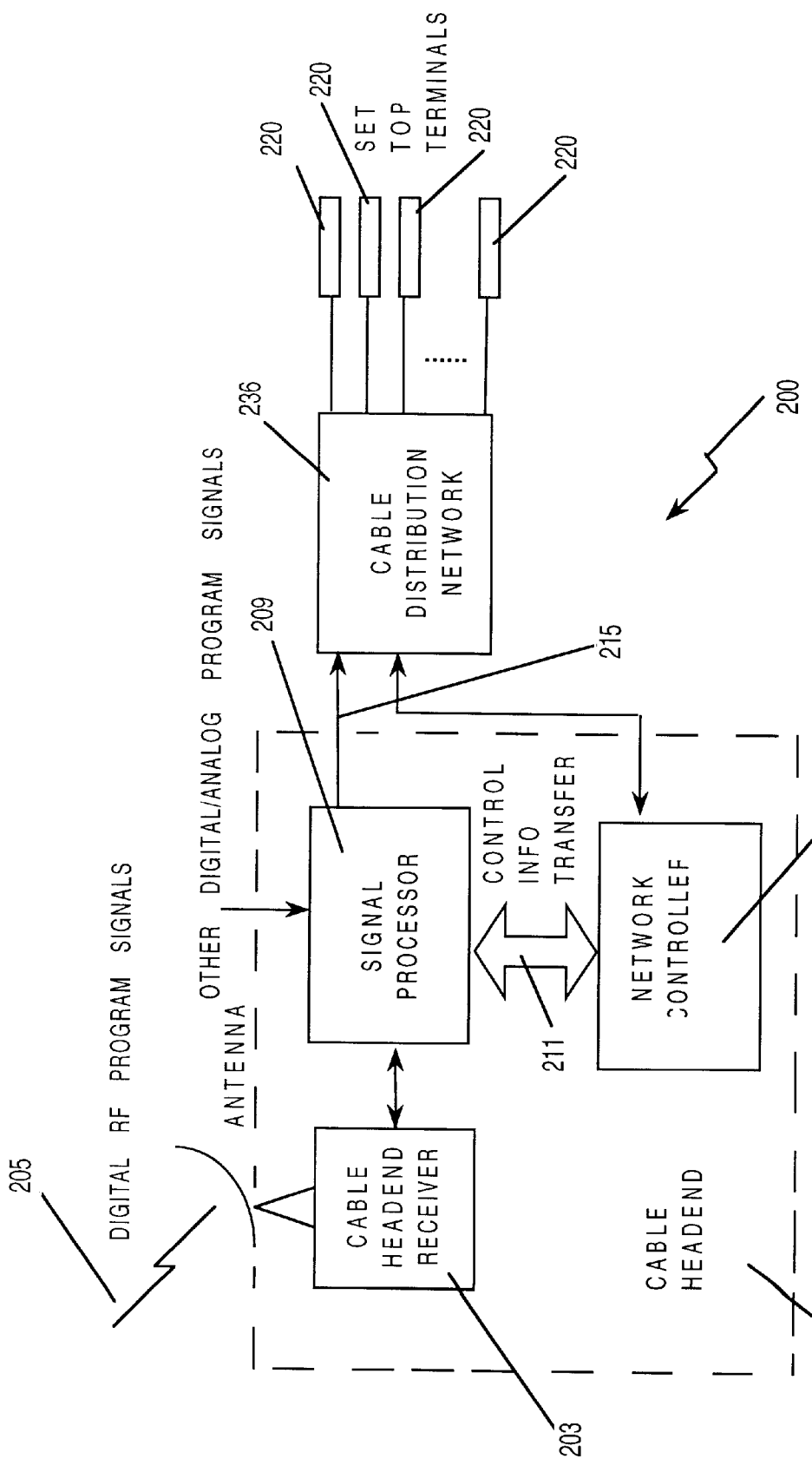
FIG. 19 is a diagram of the primary components of the cable headend.

As noted above, the targeted advertising process an be executed at a regional or national operations center such as the operations center 202. However, the process can also be executed at a local cable headend, such as the cable headend 208, for example. FIG. 19 shows the network controller 214 of the present invention as part of the cable headend 208 operating in the expanded cable television program delivery system 200. The network controller 214 monitors program selections at subscribers' homes, maintains accurate account and billing information and authorizes both subscriber channel access and particular set top terminals 220 to operate in the system.

The network controller 214 performs its monitoring and control capability by working with other system components housed, in part, within the cable headend 208. These cable headend components include a cable headend receiver 203 and a signal processor 209. As shown in the FIG. 19, digital RF program signals 205 are received and processed for further distribution to a subscriber's home through a set top terminal 220. The program signals 205 are digitally compressed and multiplexed signals that may be processed at the cable headend 208 or simply passed through to the cable distribution network. In the embodiment shown in FIG. 4, the program signals 205 are received by the cable headend receiver 203 and transmitted to the signal processor 209.

The signal processor 209 prepares the program signals 205 that are received by the cable headend 208 for transmission to each set top terminal 220. In the preferred system, the network controller 214 supervises and, in some cases, instructs the signal processor 209 in routing the signals to subscribers. In this way, the network controller 214 and signal processor 209 work with one another to perform basic control functions in the cable television system 200. Typically, this work is accomplished by the transfer of control information, represented at 211, between the network controller 214 and the signal processor 209.

Although it is preferred that the signal processor 209 and network controller 214 be co-located at the cable headend 208, the network controller 214 may be remotely located from the cable headend 208, as long as it remains in communication with the signal processor 209 in order to exchange control information 211.

In many instances, the program signals 205 received from the operations center 202 must be modified prior to being sent to the set top terminals 220. These modifications to the program control information 211 are made by the network controller 214 working in conjunction with the signal processor 209 to send the STTCIS. From the signal processor 209, the network controller 214 receives the program signals 205, which include cable franchise specific information added by the operations center 202. The network controller 214 modifies the program signals 205, if necessary, and communicates the new information back to the signal processor 209. The signal processor 209 then forwards the information to the set top terminal 220 in the form of the STTCIS, arrow 215. In most instances, the network controller 214 will modify the program signals 205 by adding additional information; however, the program signals 205 can be passed through the cable headend 208 to the set top terminal 220 without any modification.

The signal processor 209 and network controller 214 are both capable of handling the addition of simple local availabilities (e.g., local advertisements) into the signal sent to the set top terminal 220. The network controller 214 is also capable of handling more sophisticated local programming needs such as targeting video commercials, informercials, interactive programming and certain data services. The network controller 214 receives all electronic signals sent by the set top terminal 220, including those sent in response to interactive service requests and some data service requests. The network controller 214 coordinates the necessary switching and access to allow the subscriber to enjoy these services.

The network controller 214 has the capability of performing "on the fly programming" changes, assisting in (i) partitioning portions of subscriber's television screens (split screen video), (ii) selecting different audio signals for the same video (foreign languages), and (iii) interactive features. In addition, the network controller can create programming changes. For last minute changes to programming (such as for a local emergency or important regional events), an operator using the network controller 214 can modify the program signals 209 "on the fly" and change menus available to the subscriber. This accommodates short notice changes to program packaging that cannot be handled by the operations center 202 in advance.

In order to accommodate split screen techniques for promo and demo video (which will be described later), undesired video portions of the television or menu screen may be masked. The network controller 214 can send the necessary control information to inform the set top terminal 220 to mask portions of a specific channel's video. For example, a video channel with a split screen showing four separate videos would require a three-fourths mask to focus the viewer on the featured video clip.

Tiered programming allows different users to view different video even though they are "tuned" to the same channel. For example, the network controller 214 may know the demographics of its subscribers through a database generated, in part, from prior subscriber choices, an interactive selection, or other means. Using the demographics information, the network controller 214 may target commercials to the correct audience by showing different commercials to subscriber's with different demographics. Information on programs watched may also be used to target commercials. Even though subscribers will believe they are "tuned" to one channel, they will be switched to a different channel for the tiered video and targeted commercial. Alternatively, individual subscribers may be offered a menu with the option of several commercials from which to choose.

To accommodate foreign speaking subscribers, multiple audio channels for television programming may be provided. The subscriber may be shown menus of programs available in the subscriber's native language. The function of choosing the correct audio to correspond to the selected language may be handled by either the set top terminal 220 or the network controller 214 depending upon the configuration. Local programming in several languages or additional audio channels for a foreign language translation of a popular television program may be provided by the network controller 214. Using a picture-on-picture feature, sign language may be similarly made available to certain set top terminals 220 for the deaf. The sign language video may be transmitted to the set top terminal 220 on a separate channel. Also, a text overlay for the deaf may be easily produced on the lower part of the screen. The control signals for producing the text overlay may be handled by the network controller 214.

In other embodiments, the network controller 214 can act as a central computer and provide intra-set top terminal interactive games, inter-set top terminal interactive games, computer bulletin board type services, message services (Electronic mail), etc. For example, a subscriber may play war games with six of his (anonymous) fellow subscribers each in their own home each operating a separate tank. The network controller 214 gathers the players using set top terminal 220 communications and acts as the referee. The network controller software "plays" the game and generates the video control signals to be transmitted to the set top terminals 220. From the video control signals, the set top terminal generates a view of the playing field and shows movement of the tanks. Using a similar method, a bulletin board or message system can be set up to discuss a particular program such as "Twin Peaks Whodunit" for enthusiasts with set top terminals 220.

2. Monitoring and Control of Cable Headend Signal Processor

Figure 20:
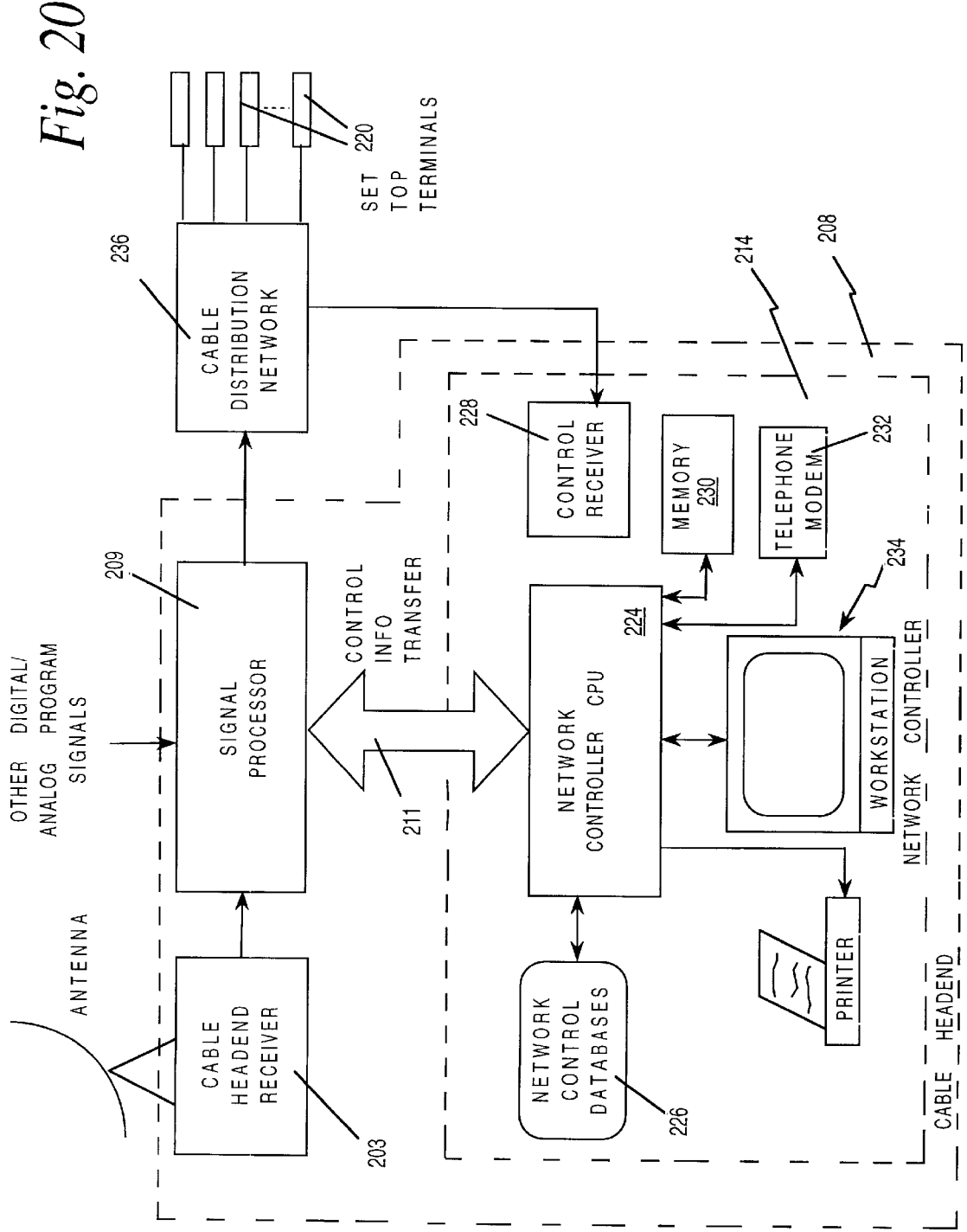
FIG. 20 is a diagram of the cable headend showing the primary components of the network controller.

FIG. 20 shows the network controller's major components and how these components relate with other components of the cable system 200. The network controller's internal components include a network controller CPU 224, databases 226, control receiver 228, local memory 230 and telephone modem 232. The network controller's CPU 224 and databases 226 may be accessed through an operator control station, which may include peripherals such as a computer workstation, CRT display, and printer, represented by the workstation 234.

Information required to operate the network controller 214 will be stored in databases 226 and local memory 230 (e.g., either in RAM, ROM, or magnetic or optical Read/Write devices) at the cable headend 208 as well as in memory (RAM and/or ROM) within each subscriber's set top terminal 220. In the preferred embodiment, two-way communications between the network controller 214 and set top terminal 220 will occur over cable lines. The network controller 214 and the set top terminals 220 also communicate using telecommunications systems such as plain old telephone service (POTS) and the Internet. Many other methods of communication, including those which do not require cables or wires, may be used with the present invention. Using two-way communication, interactive television programming can be accommodated through the network controller 214. In addition, the preferred network controller 214 will be able to access set top terminals 220 via phone lines for trouble shooting, special features or sophisticated reprogramming.

The network controller CPU 224 controls the interface, depicted at 211, between the network controller 214 and the signal processor 209. This interface 211 allows control information to flow or transfer between the two cable headend 208 components. Standard RS-232 or RS-422 links, an IEEE-488 bus or other interface media may be used. During standard operation, program control information is passed through this interface 211 to the network controller CPU 224 from the signal processor 209 (i.e., the program control information having been sent to the signal processor 209 over satellite from the operations center 202 with the RF program signals 205, not shown in FIG. 5). The network controller CPU 224 processes the program control information based on data stored in the network control databases. This processing includes modifying the program control information to accommodate regional programming needs.

After processing, the network controller CPU 224 passes the program control information, including any modifications, back to the signal processor 209 for distribution over the cable system 200, via the cable distribution network 236. In this fashion, the network controller 214 provides programming and network control instructions to the set top terminals 220 through the signal processor 209.

The processing of program control information by the network controller CPU 224 can also make use of any data received by the network controller's control receiver 228. The control receiver 228 is a microprocessor-based device that receives "status reports" directly from the set top terminals 220. The status reports received by the control receiver 228 generally include information that allows the network controller 214 to track, among other things, a subscriber's program access history, as described below. The control receiver 228 can store the status reports internally in a local storage or memory device and transfer them to the network controller CPU 224. Typically, the control receiver 228 is interfaced with the network controller CPU 224 using standard RS-232 or RS-422 links, an IEEE-488 bus or the like.

In the preferred embodiment, the network controller CPU 224 scans the control receiver 228 at a predetermined rate (e.g., once every few seconds) to initiate the status report transfer. Upon transfer, the network controller CPU 224 adds the data and control information in the status reports to the network control databases 226 by: checking for changes in previously received status information, processing the new information and updating the corresponding parameters in the network control databases 226. The network controller 214 processes the information stored in its databases with any program control information relayed through the signal processor 209 from the delivery system's operations center 202. This processing capability allows the network controller 214 to modify prior control signals and create new ones. The network controller 214 transfers both modified and unmodified control signals, along with any local combined program signals 205, to the signal processor 209 to be combined with others program signals 205 for distribution over the cable system 200.

3. Modifying the Program Control Information Signal

Tables A–C, described previously, provide an example of some information that can be sent in the program control information signal to the set top terminals 220. The program control information signal generated by the operations center 202 provides data on the scheduling and description of programs. The program control information signal may be sent through the network controller 214 or, in an alternate configuration, directly to the set top terminal 220 for display to the subscriber. In the preferred embodiment, the program control information signal is stored and modified by the network controller 214 and sent to the set top terminal 220 in the form of the STTCIS. This configuration can accommodate, among other things, differences in individual cable systems and possible differences in set top terminal 220 devices.

The set top terminal 220 integrates either the program control signal or the set top terminal control information stream together with data stored in the memory of the set top terminal 220, to generate on-screen menu displays for assisting the subscriber in choosing programs for viewing. (Throughout the description the term "program control information" is being used to indicate control information coming from the cable headend 208 to the set top terminal 220, whether it is sent directly from the operations center 202, processed by the network controller 214 and then forwarded to the set top box (STTCIS), or transmitted over telephone lines.)

The types of information that can be sent using the program control signal includes: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information. In addition, the program control information signal may be used periodically to reprogram or reconfigure a set top terminal 220 or group of set top terminals 220 (described in detail in co-pending patent application Ser. No. 08/160,281, entitled, REPROGRAMMABLE TERMINAL FOR SUGGESTING PROGRAMS OFFERED ON A TELEVISION PROGRAM DELIVERY SYSTEM, filed by the same assignee incorporated herein by reference).

4. Processing the Program Control Information Signal

Figure 21A:
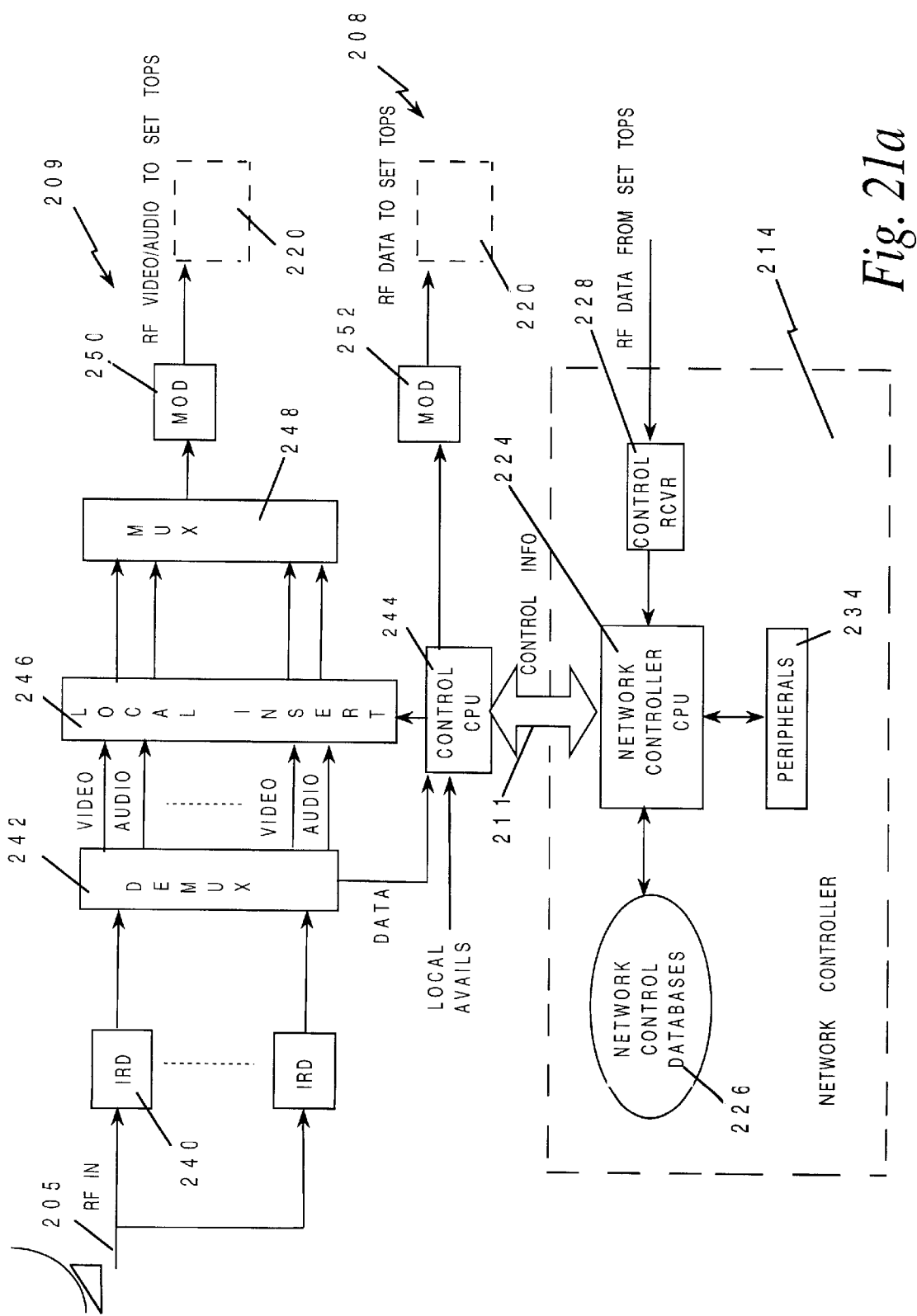
FIG. 21a is a schematic of a basic cable headend having network controller components.
Figure 21B:
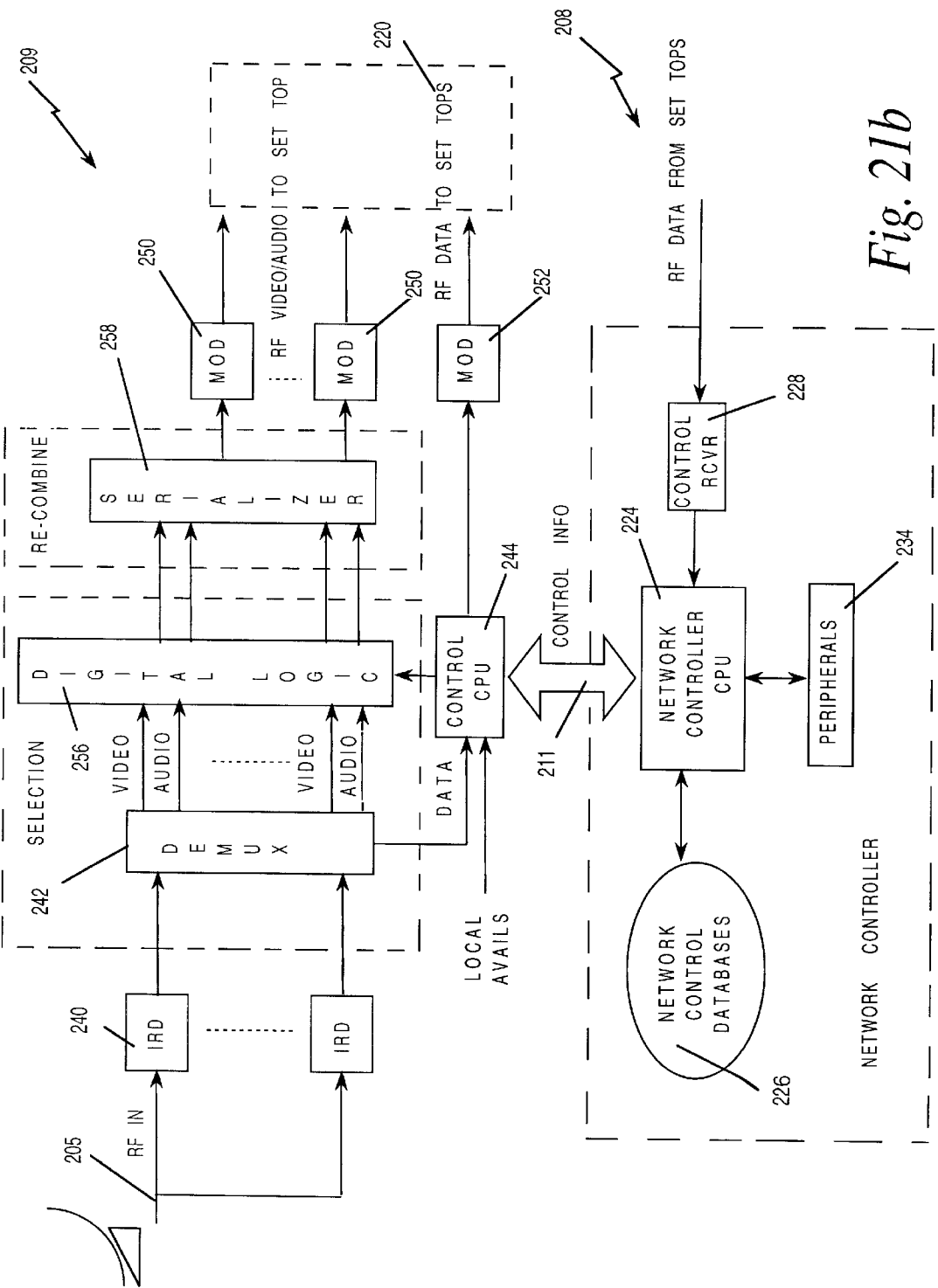

FIGS. 21a and 21b show a more detailed schematic of the components of the cable headend 208, focusing on the interplay between the network controller 214 and the signal processor's 209 major hardware components. The network controller 214 uses, among other components, the signal processor 209 to implement its monitoring and control capabilities. Although the network controller 214 of the present invention will work with nearly any cable headend signal processing equipment, it is preferred that the signal processing equipment be modem equipment capable of handling digitally compressed video.

FIG. 21a depicts an embodiment of the basic signal processing capabilities of the cable headend 208 and shows connections to components of the network controller 214. As shown in the figure, RF cable signals 205 are received at the headend 208 through a bank of integrated receiver demodulators (IRDs) 240. Each IRD 240 includes customary RF processing equipment, including a low noise amplifier, a demodulator and other filtering devices (not shown). As each RF feed is fed through the individual IRDs 240, the signals are manipulated and transferred to the demultiplexer and other signal processing equipment for further processing. The demultiplexer 242 splits each cable TV signal into its respective video and audio signal components. In addition, the demultiplexer 242 extracts data from the cable television signals and inputs such data to the control CPU 244.

The control CPU 244 exchanges control information with the network controller 214, as shown at 211. This control information is exchanged between the signal processor's control CPU 244 and the network controller CPU 224. In particular, the network controller 214 and signal processor 209 pass control information through the interface linking the two CPUs in order to perform any modifications to the program control information signal. The network controller CPU 224 oversees such modifications, accessing various network control databases 226 for guidance in instructing the signal processor's control CPU 244. The instructions provided by the network controller 214 in turn guide the signal processor 209 in combining and/or adding programming signals and advertisements for transmission to the set top terminals 220.

The local insertion component 246 of the signal processor 209 allows the control CPU 244 to execute the instructions received from the network controller 214 and insert any local programming and advertisements. Once such regional programming and advertisements have been inserted, the local insertion component 246 passes the various signals to a multiplexer 248 that combines the various programming and advertising signals. The output of the multiplexer 248 is transferred to RF modulator 250 that disseminates the composite video and audio signals to the set top terminals 220. The data extracted from the cable television signals by the demultiplexer 242, which is also sent to the control CPU 244, is transmitted to the set top terminal 220 using a separate RF modulator 250.

The network controller 214 accommodates two-way RF data communications with the set top terminals 220. Upstream data transmissions from the set top terminals 220 are received by the network controller's control receiver 228. These upstream data transmission capabilities are described in detail below.

FIG. 21b diagrams another embodiment of a basic cable headend 208 having a network controller 214 and more sophisticated signal processing equipment. Again, RF cable television signals 205 are fed into a bank of IRDs 240 as described above. These signals 205 are demultiplexed into individual video and audio signal components, with data being extracted and sent to the control CPU 244. The individual video and audio signal components are fed into a digital logic circuit 256 that is flexible enough to select individual video and audio signals for repackaging. The network controller 214 oversees such repackaging by: (i) receiving the program control information from the control CPU 244, (ii) modifying or manipulating the signal as necessary, and (iii) transferring the modified program control information signal back to the control CPU 244.

With instructions from the network controller 214, the control CPU 244 may insert local avails into the digital logic system 256 and execute the various selections of individual video and audio signals for subsequent transmission to the set top terminals 220. Once individual video and audio signals have been selected and all local insertions have been made, the outputs of the digital logic circuitry 256 are transferred to a serializer 258 which recombines all the signals into a serialized format. The serially-formatted signals are in turn transferred to RF modulators 250 for distribution over the cable network 200. The selection and recombining components of the signal processing equipment are described in greater detail in a co-pending patent application, Ser. No. 08/160,283, entitled DIGITAL CABLE HEADEND FOR CABLE TELEVISION DELIVERY SYSTEM, incorporated herein by reference; however, such sophisticated combining circuitry is not necessary for the operation of the network controller 214. Rather, a simpler signal processing system may readily be used.

In the embodiments diagramed in FIGS. 21a and 21b, the signal processor 209 may, acting alone or in conjunction with control instructions from the network controller 214, incorporate local programming and/or local advertisements into the program signals and forward the revised signal to the set top terminals 220. To accommodate this local programming availability, the signal processor 209 must combine the local signal in digital or analog form with the program signals 205 received from operations center 202. If a local cable system 200 uses a compression algorithm or standard that is different than the one used by the operations center 202, the signal processor 209 must also decompress and recompress incoming signals so they may be properly formatted for transmission to the set top terminals 220. In addition, the signal processor 209 performs any necessary signal decryption and/or encryption.

Figure 22:
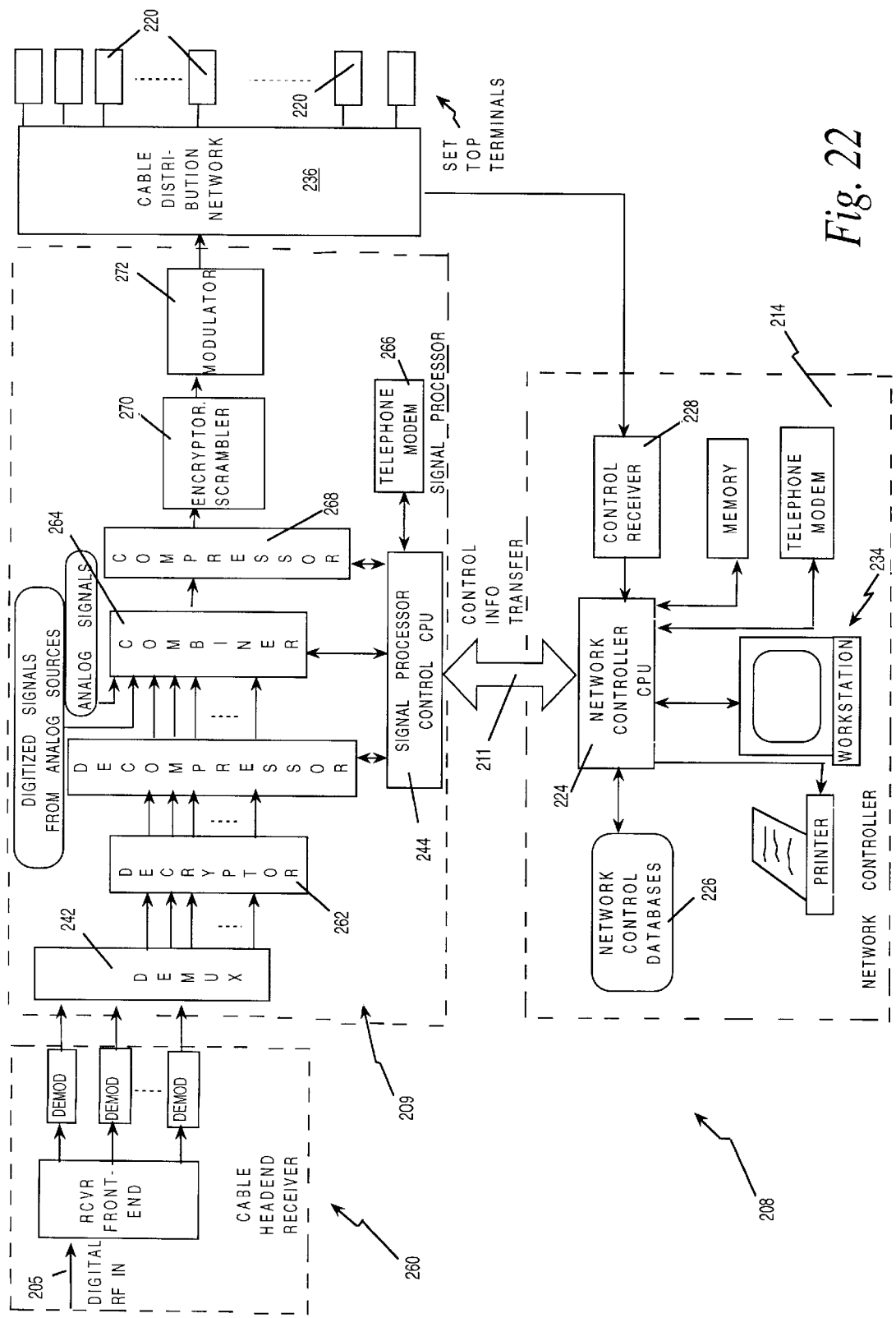
FIG. 22 is a detailed diagram of the components of the cable headend.

FIG. 22 diagrams an alternative embodiment of a digital/analog cable headend 208. In particular, this embodiment includes decompression and recompression capabilities, showing the types of signal processing components that the network controller 214 may control. As shown in FIG. 22, the cable headend 208 receiver front-end, indicated at 260, demodulates the received transponder signals 205, which may contain four, six, eight or more audio/video channels of information, into a digital bit stream of multiplexed digitized MPEG or MPEG 2 format video. The signal processor 209 receives the multiplexed signals and initially performs any demultiplexing required to process the received signals. The demultiplexers 242 separate the multiplexed signals into separate individual MPEG or MPEG 2 format digital channels. Depending on the transponder signal received, the demultiplexer 242 may have four, six, eight or more cross connects to the combiner 264. The outputs of the demultiplexers 242 are selectively enabled by the control CPU 244. Those outputs of the multiplexer 248 that are enabled are then input to the combiner.

Decrypting may be necessary and can be conducted by a separate decrypting device 262 included as part of the signal processor's internal components. The signal processor's control CPU 244 may be controlled by a remote site (such as a national site) via a modem or similar connection 266. Therefore, the remote site is able to control the output of the demultiplexers 242. Alternatively, instead of enabling the outputs of the demultiplexers 242, the inputs of the combiner 264 may be selected by the control CPU 244. By enabling or selecting multiplexer 248 outputs, the control CPU 244 is able to control which television programs are combined and transmitted to the viewers.

The combiner 264 combines the enabled or selected outputs of the demultiplexers 242 into the proper format and outputs the signals through a compressor 268, and an encryptor 270 (if desired), to a digital modulator 272. The modulator 272 outputs a modulated RF carrier combined with other carriers onto the cable distribution network 236. The set top converter terminals 220 in subscribers' homes select and demodulate a particular channel selected by the user. As selections are made, the set top terminal 220 stores the programs accessed in its local storage for later transmission to the network controller 214 at the cable headend 208.

5. Receiving Information from Set Top Terminals

The network controller 214 is equipped to receive information from the set top terminals 220 on a regular or random basis. Upstream information received from the set top terminals 220 typically includes, for example, program access data gathered at each set top terminal 220. Such information may be communicated to the network controller 214 through a variety of methods including any of the following methods: (1) cyclic polling, (2) random access, and (3) telephone modems and the Internet. Cyclic polling and random access methods make use of two-way RF.

As described below, the preferred embodiment employs a cyclic polling method. Although various polling schemes will work with the present invention, a roll-call polling scheme is preferred over other schemes such as hub polling or token-passing since roll-call polling provides the greatest degree of centralized control.

Using this preferred method, program access information is stored at each set top terminal 220 until it is polled by the network controller 214 for information retrieval using a polling request message format 920 as shown previously in FIG. 6a. Using any such polling request message format 920, the network controller 214 interrogates each set top terminal 220 sequentially, one by one. In this type of access strategy, the network controller 214 is designated as the central controller of the cable distribution network 200 and is responsible for control of the communications links between itself and the set top terminals 220. This control includes issuing commands to the set top terminals 220 and receiving responses back from the set top terminals 220.

Basically, the network controller 214 instructs the signal processor 209 to transmit to each set top terminal 220 a polling request, which asks whether a set top terminal 220 has any information to transmit. The set top terminals 220 are identified by the unique address and set top terminal identifier 928. It is preferred that the set top terminal 220 transmit information and messages to the network controller 214 only when given permission by the network controller 214 to do so.

Where, for example, specialty programs have been accessed since the previous poll, the set top terminal 220 is given permission to transmit a polling response in the form of a status report that includes any such access information. The network controller's control receiver 228 is tasked with the receipt of set top terminal 220 polling responses or status reports. These status reports generally include information that allows the network controller 214 to track a subscriber's program access history. As described above, the control receiver can store the status reports locally and/or transfer them to the network controller CPU 224.

The network controller CPU 224 immediately processes each polling response as it is received from each set top terminal 220. The network controller CPU 224 updates pertinent databases 226 with the received information, and then sends another polling request to the next set top terminal 220 on its list. A set top terminal 220 with no information to transmit so indicates in a reply to the network controller 214. Once all set top terminals 220 have been given permission to transmit status reports, a cycle is complete and a new cycle begins.

Through a polling cycle, the network controller 214 acquires the information needed to operate the system 200. During the cycle, the network controller 214 sends signals to the set top terminals 220 to authorize both their operation and access to specific channels. If, for example, a subscriber has failed to pay a recent bill, the network controller 214 can deauthorize the subscriber's set top terminal 220. Likewise, when a subscriber orders a program or channel, the network controller 214 checks the subscriber's account for good standing by reading the proper database file. After the check, the network controller 214 then either authorizes or deauthorizes access by the set top terminal 220 using the data transmitted in a modified program control information signal. As a result, the cycle requires a series of requests and responses to operate.

FIG. 6b shows an example frame format 920' for the status reports received from the set top terminals 220 during the polling cycle. This frame format is substantially identical to the polling request message format 920 (FIG. 6a), and includes: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message, each designated by a common number with respect to FIG. 6a, but with the prime indicator (') added.

The second method for the network controller 214 to receive information from the set top terminals 220 is through the use of a random access scheme. In an alternate embodiment that uses this method, individual set top terminals 220 can send control-related messages to the network controller 214 without being polled. This scheme is particularly useful in networks where subscriber regions include potentially large numbers of subscribers. High concentrations of subscribers may be found, for example, in large metropolitan areas. In such cases, the polling cycle can be replaced with a more sophisticated random access strategy such as carrier-sense multiple access with collision detection (CSMA/CD). In this scheme, each set top terminal 220 must "listen" before it transmits and then does so only if it senses an idle medium. When the return link to the network controller 214 is silent, a given set top terminal 220 can transmit its messages. Any messages sent from a set top terminal 220 to the network controller 214 would set the P/F bit 930' to a "0" position to indicate that the message is not in response to any command or polling request. In addition to CSMA/CD, other random access schemes can be used with the system, such as CDSL.

The third method for the network controller 214 to receive information from the set top terminals 220 is through the use of telephone modems or the Internet. In an alternate embodiment, the set top terminals 220 communicate program access information and orders to the network controller 214 using telephone modems. In this embodiment, the set top terminals 220 are equipped with a modem port to facilitate such operation. Thus, communications between a given set top terminal 220 and the network controller 214 can be established over telephone lines when cable traffic or other primary traffic is congested. The preferred method of using telephone modems is in combination with a control or "hit" signal from the network controller 214. A group (or region) of set top terminals 220 is "hit" simultaneously by the network controller 214 via the cable. Only those set top terminals 220 within the group that have data for the network controller 214 call the network controller 214 by modem. The network controller 214 is equipped with a bank of modems (organized to roll-over telephone calls) to answer the incoming calls.

In yet another embodiment, the set top terminals 220 connect directly to the Internet, using for example, standard telephone lines. The set top terminals 220 then provide access to web sites and data bases on the Internet, and also provide communications with the cable headends 208 and the operations center 202. The set top terminals 220 may also connect to the Internet via a separate processor, such as a stand alone personal computer.

Among the three methods discussed for the network controller 214 to receive information from the set top terminals 220, the use of the cyclic polling scheme depicted in FIGS. 6a and 6b, is preferred. Polling is preferred because it allows the network controller 214 to conduct and control communications with set top terminals 220 over the cable network in an orderly fashion. In particular, the network controller 214 can schedule data retrieval by polling the set top terminals 220 one by one. A random access method, on the other hand, does not allow the network controller 214 to maintain such orderly communications. Instead, the network controller 214 receives data from the set top terminals 220 at random, depending on when the cable medium is idle. This random reception of data lessens the degree of control that the network controller 214 has over set top terminal transmissions. Likewise, the third method, which uses telephone modems and/or the Internet, is less desirable than the polling method since the use of modems does not allow for upstream interactivity over the cable medium.

6. Processing Information Received from Set Top Terminals

Figure 23:
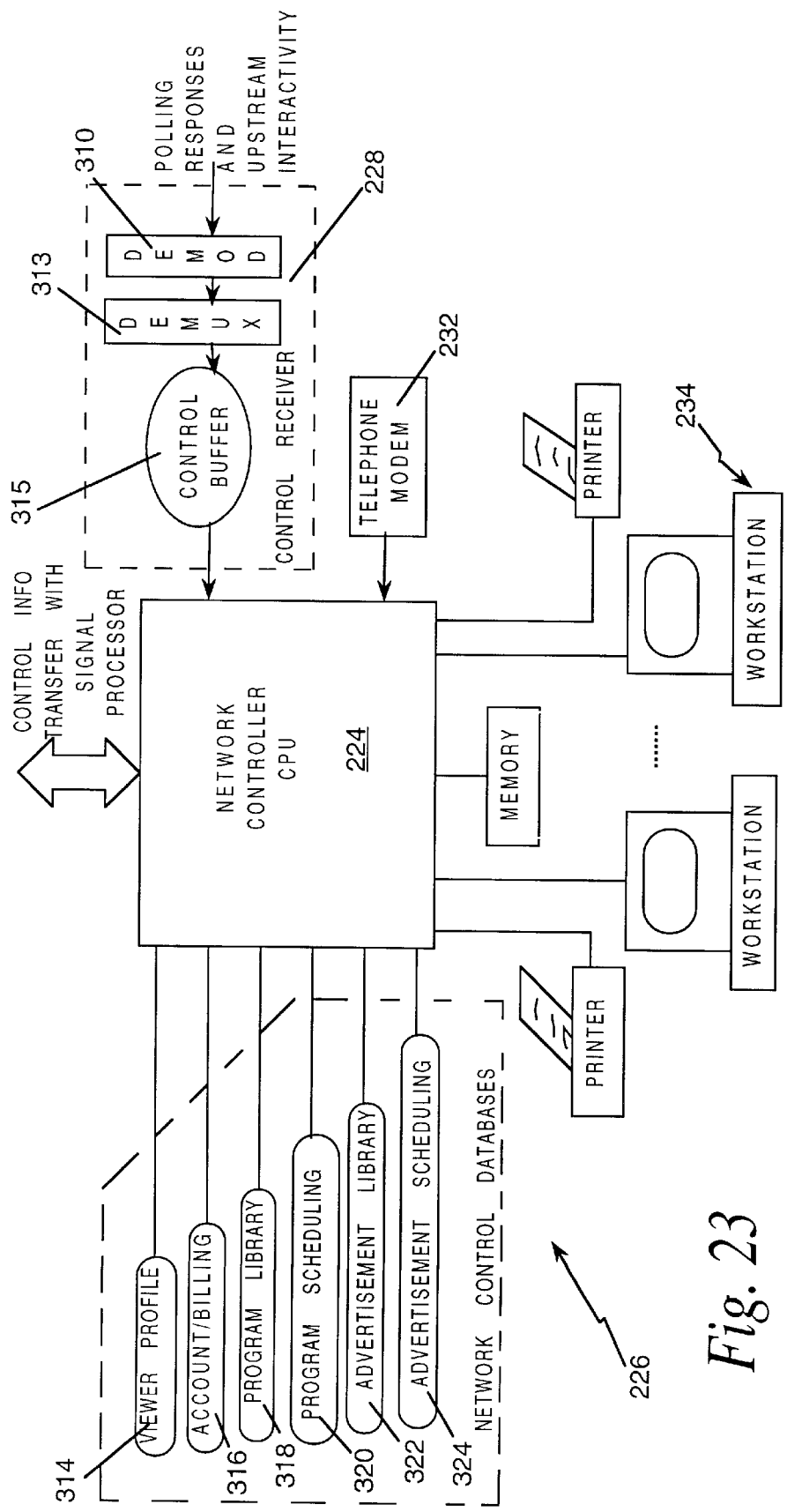
FIG. 23 is a diagram of the network controller CPU and its relational components.

Regardless of the scheme used by the set top terminals 220 to access the network controller 214, any polling responses and upstream interactivity is received by the network controller's control receiver 228 as shown in FIG. 23, depicting the components of the control receiver 228, which includes a demodulator 310 and demultiplexer 313 to demodulate and demultiplex transmissions received from any set top terminal 220 in the cable distribution network 200. As described above, the control receiver 228 transfers, through a control buffer 315, the received information to the network controller CPU 224 for processing.

Processing is accomplished by the network controller CPU 224. Operator instructions are input to the network controller CPU 224 through the operator control station 234 that includes, for example, a computer/workstation with a CRT display, printer and other peripherals. Multiple operator control stations 234 can be used to assist in control operations.

Regional operator control stations (not specifically shown, but substantially identical to stations 234) may be used and may include multiple operator control stations each assigned to a particular subscriber region corresponding to a geographic region where set top terminals 220 are located. Thus, each regional operator control station is assigned to a subscriber region, providing monitoring and control capabilities over such regions. All regional program control information is transferred to the network controller CPU 224 for processing, as in the case where a single control station 234 is used. Likewise, during this processing, portions of the network control databases 226 may also be updated.

No set number of databases 226 are required for the network controller 214 to perform its operations, and a single temporary database may be used. In the preferred embodiment, however, the network controller 214 uses several databases (indicated at 226) that are accessed during network control operations. These databases 226 are identified in FIG. 23 and include: (1) the Viewer Profile database 314, (2) the Account/Billing database 316, (3) the Program Library database 318, (4) the Program Scheduling database 320, (5) the Advertisement Library database 322, and (6) the Advertisement Scheduling database 324.

Figure 24:
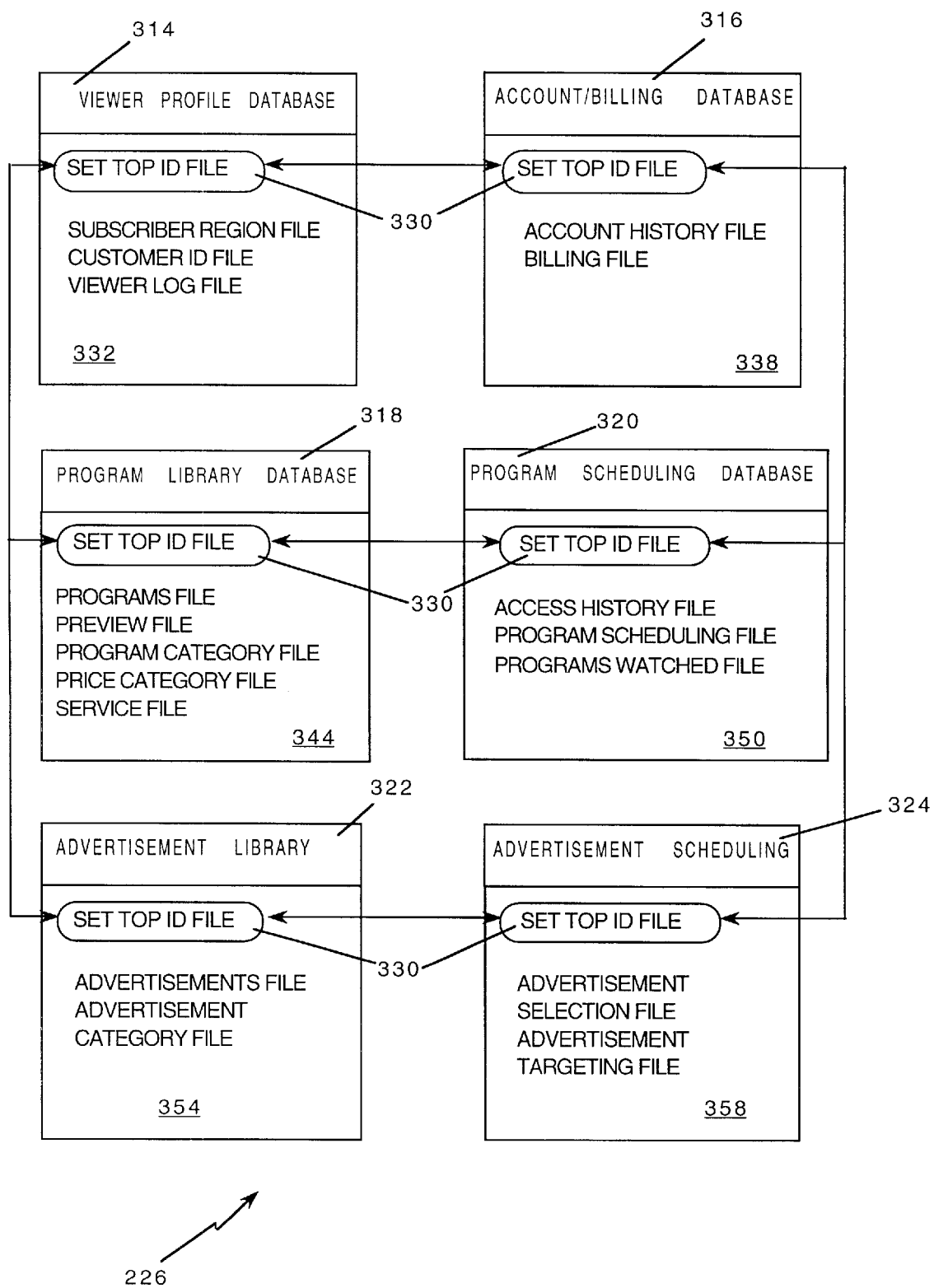
FIG. 24 is diagram of the network control database structure.

FIG. 24 shows one example of a network controller's basic database structure including the databases identified in the preceding paragraph. The data stored in these databases is not simply raw data. Rather data may be processed, correlated and appropriately indexed to create a true relational database 226.

As shown in FIG. 12, the Viewer Profile database 314 includes: (i) a Set top ID File, (ii) a Subscriber Region File, (iii) a Customer ID File and (iv) a Viewer Log File, the latter three files being indicated generally as a file group 332. The Set top ID File 330, common to each of the databases comprising the network controller's database 226, contains set top converter records with each record representing a unique set top terminal 220. Examples of information stored in this file includes set top terminal type, software version and set top terminal identification/serial number. The Set top ID File 330 contains the key data that links each relational database with one another, as described below.

The Subscriber Region File, part of file group 332, includes information such as headend 208 assignment, regional operator control workstation assignment and a designation for the subscriber's geographical area. The Customer ID and Viewer Log Files, part of file group 332, include the subscriber's personal information, such as name, address and telephone number, and information on the subscriptions to cable services for each customer as well as a personal profile for each viewer, respectively.

The personal profile consists of demographic information that may be gathered in a number of ways. The set top terminal 220 builds the personal profile for each viewer and stores the information in a memory file by viewer name. To build a personal profile in the preferred system, the viewer answers a series of questions presented on a series of menu screens. These personal profile screens request the viewer to input information such as name, sex, age, place of birth, place of lower school education, employment type, level of education, amount of television program viewing per week, and the number of shows in particular categories that the viewer watches in a given week such as, sports, movies, documentaries, sitcoms, etc. Any demographic information which will assist the set top terminal 220 in targeting advertisements to the viewer may be used.

In addition to gathering demographics at the set top terminal 220, the personal profile can be compiled using other methods. For instance, the information can be gathered using questionnaires sent by mail and subsequently entered in the Viewer Profile Database 314 by the network controller's control station operator.

As an alternative to gathering demographic data, a simulated profile can be generated using an algorithm similar to that described below that analyzes access history and viewing habits. Using test information generated from a statistically significant number of viewers, the simulated profile algorithm estimates the viewer's age, education, sex and other relevant information. The analysis requires reviewing the viewer's programs watched and statistically comparing the viewer's programs watched with the test group. Also, the algorithm can place the subscriber or viewer in a viewer category. This analysis is transparent from the subscriber's point of view and attempts to accurately profile the viewer. Various viewers or viewer categories can later be targeted with different advertisements.

The Account/Billing database 316 includes (i) the Set top ID File 330, and (ii) an Account History File, and (iii) a Billing File, the latter two files indicated at 338. The Set top ID File, as described above, contains information unique to each subscriber, including set top terminal type, software version and set top terminal identification/serial number. The Account History and Billing Files contain information concerning each subscriber's past bills and account record and information on the most recent bill, including data from which the next billing report can be generated, respectively.

The Program Library database 318 include (i) the Set top ID File 330, and (ii) a Programs File, (iii) a Preview File, (iv) a Program Category File, (v) a Price Category File and (vi) Service File, the latter five files identified at 344. As usual, the Set top ID File identifies each set top terminal 220 by identification number. The Programs File contains information on every program offering in the system, including name, length and type of program. The Preview File contains information on previews for specialty programs stored in the Programs File. The Program Category File contains a set of categories into which each program may be placed, such as movies, sports, science fiction and news. The Price Category File contains information on pricing for various categories of programs, grouping programs and services into categories by price. The Service File maintains information on the various cable services available in the system 200.

Figure 27:
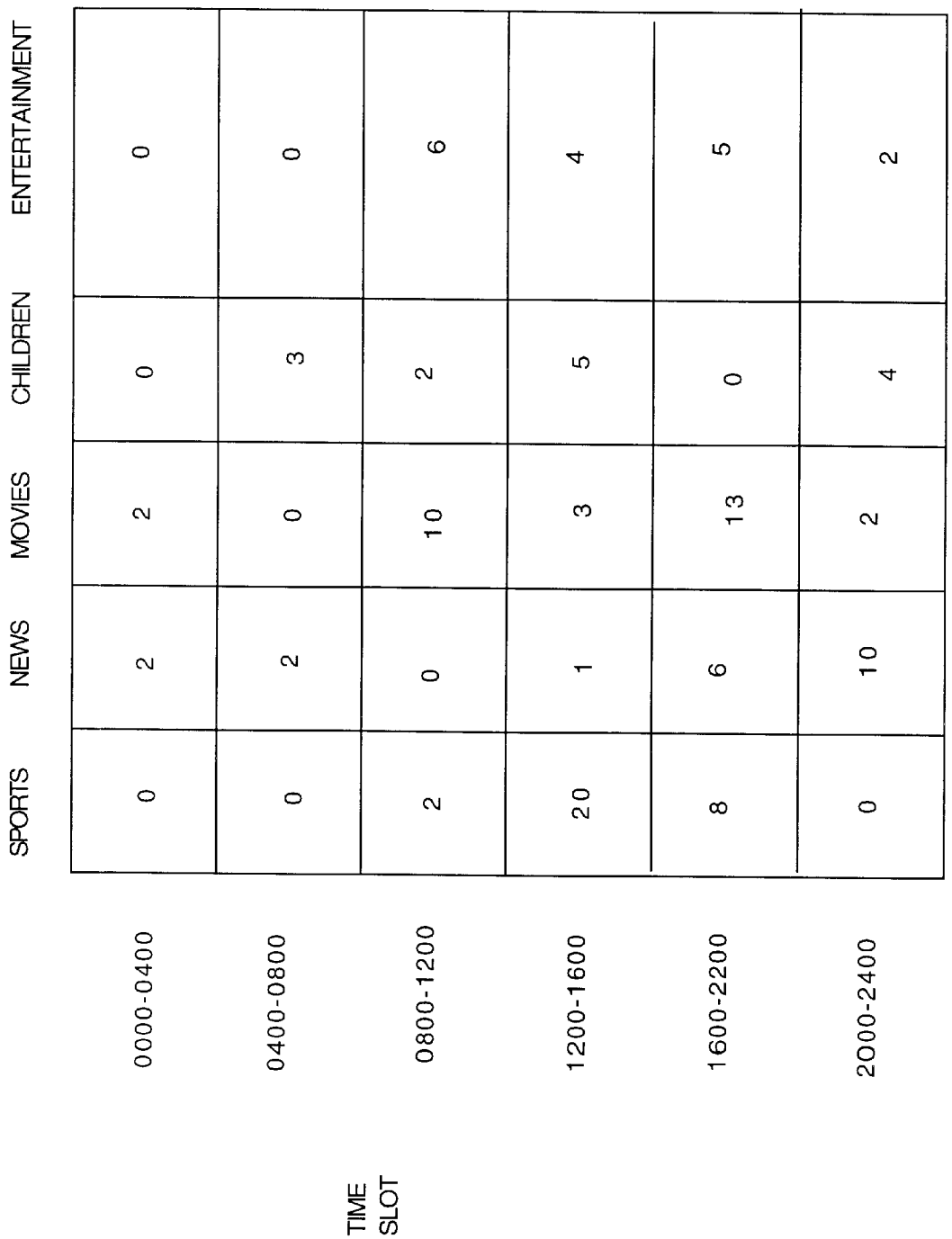
FIG. 27 is a diagram of a sample programs watched matrix.

The Program Scheduling database 320 includes (i) the Set top ID File 330, and (ii) an Access History File, (iii) a Programs Watched Matrices File and (iv) a Program Scheduling Library, the latter three files indicated at 350. The Access History File contains information on the programs that the set top terminal 220 has accessed and the Programs Watched Matrices contains information on the number of programs watched in a given program category during different times of day. Relative to the Programs Watched Matrices file, a programs watched matrix is shown in FIG. 27 and further described below. The Program Scheduling File contains information on the times of day and the corresponding programs that are being offered for viewing at each subscriber location.

The Advertisement Library database 322 includes (i) the Set top ID File 330, and (ii) an Advertisements File, and (iii) an Advertisement Category File, the latter two files being indicated at 354. The Advertisements File contains information on every advertisement in the system, including name, length and type of advertisement, and the Advertisement Category File contains a set of categories into which each advertisement can be placed.

The Advertisement Scheduling database 324 includes (i) the Set top ID File 330, and (ii) an Advertisement Selection File, and (iii) an Advertisement Targeting File, the latter two files identified at 358. The Advertisement Selection File contains information on the advertisements that have been offered to each subscriber and keeps track of the ones that have been selected. The Advertisement Targeting File contains information on the advertisements and advertisement categories that have been chosen by the system as being of the most interest to a specific subscriber.

The network control databases 314, 316, 318, 320, 322, 324 comprising the database 226 are relational databases generally keyed to information in a single file. Specifically, the relational key is a set top terminal 220 identification number stored in Set top Terminal ID File 330, as shown in FIG. 11. This set top terminal identification number allows the database files that correspond to a particular subscriber to be linked together by a common reference. In other words, the databases are structured such that subscribers are referenced in each database file by a unique set top terminal identification number. In this way, each database may be accessed based on set top terminal identification number alone. Thus, using a subscriber's set top terminal identification number, the network controller CPU 224 can access and process information pertaining to that subscriber from any of the above described database files. In configurations where multiple set top terminals 220 are allocated to a single customer (or household), a unique subscriber identification number may be added to the database 226 to group the set top terminals 220 by customer. With the set top terminal identification as a relational key, many additional databases may be created that correlate and store pieces of subscriber-specific information from the six databases and underlying files.

7. Overview of Software Routines

Figure 25:
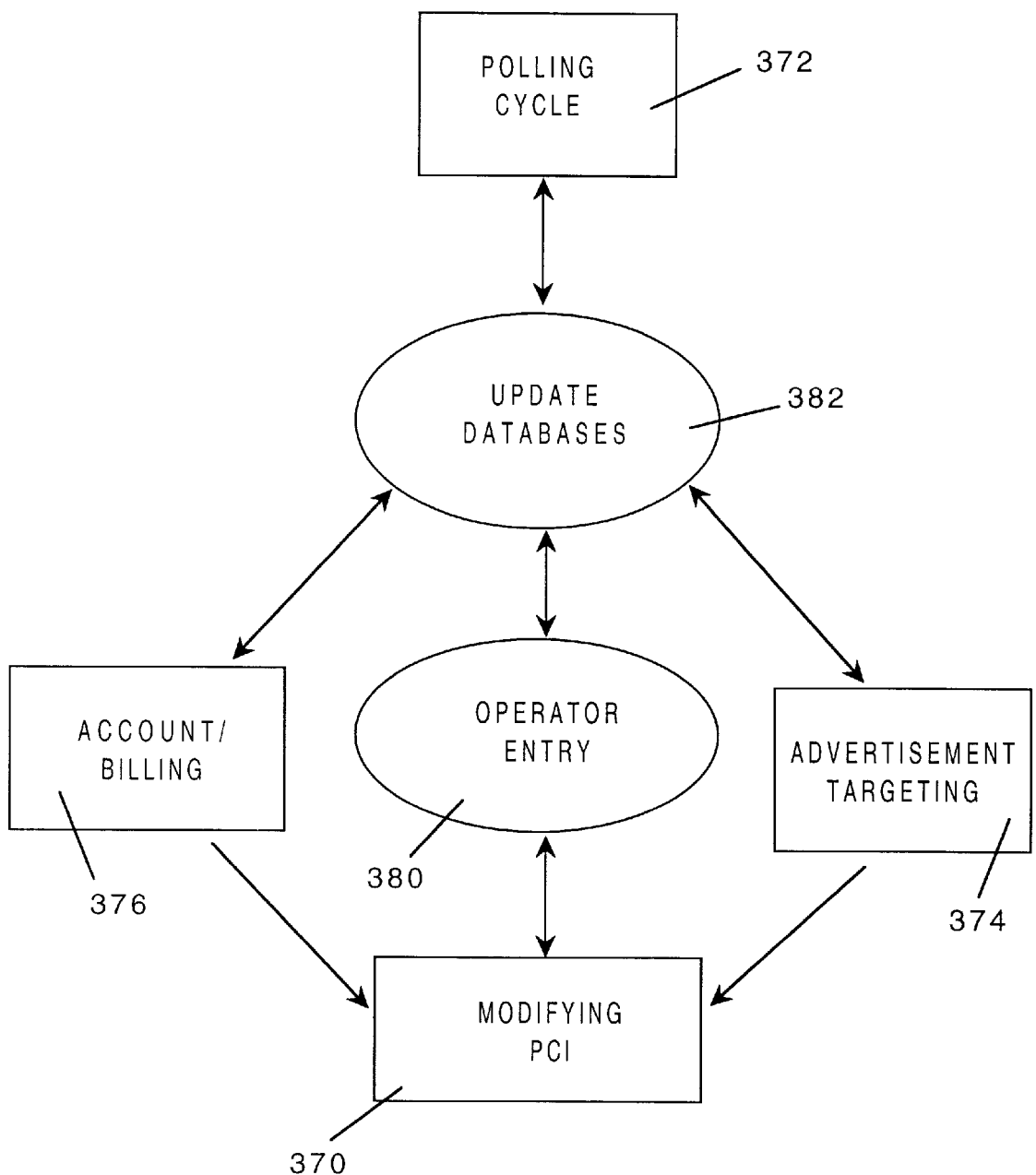
FIG. 25 is a diagram of the relationship between the major software routines.

FIG. 25 shows the major software routines initiated and executed by the network controller CPU 224. These routines are: (1) the Modifying PCI routine 370, (2) the Polling Cycle routine 372, (3) the Advertisement Targeting routine, and (4) the Account/Billing routine 376. Together, these routines, along with the operator entry and update functions 380, 382, respectively, enable the network controller 214 to perform its major functions.

The Modifying PCI routine 370 is the software that enables the network controller 214 to modify the program control information (PCI) signal received from the signal processor 209. This software routine generally allows the network controller CPU 224 to modify the PCI signal content so that changes and additions in programming and advertisements can be accommodated. Such changes and additions include access authorizations and deauthorizations in the form of authorization and deauthorization messages, respectively.

The Polling Cycle routine 372 is the software sequence that interactively executes the network controller's polling cycle allowing the network controller 214 to schedule and perform polling of all set top terminals 220 operating in the system 200. The software also provides the network controller 214 with a means of processing status reports received from set top terminals 220 in response to polling requests. For a random access system (not depicted), the software of this routine 372 would be changed.

The Alternate Advertisement Targeting routine 374 is the software that generates packages of television commercials and advertisements geared towards particular viewers and makes use of a viewer's demographic information and viewing habits to determine those advertisements that are of most interest to that particular viewer. In so doing, the routine 374 outputs packages of advertisements targeted towards each viewer or groups of viewers.

The Account/Billing routine 376 is the software that the network controller CPU 224 runs to generate billing reports for each set top terminal 220. In general, the routine 376 correlates the programs accessed with pricing information to generate each report.

8. Polling Cycle Routine

Figure 26:
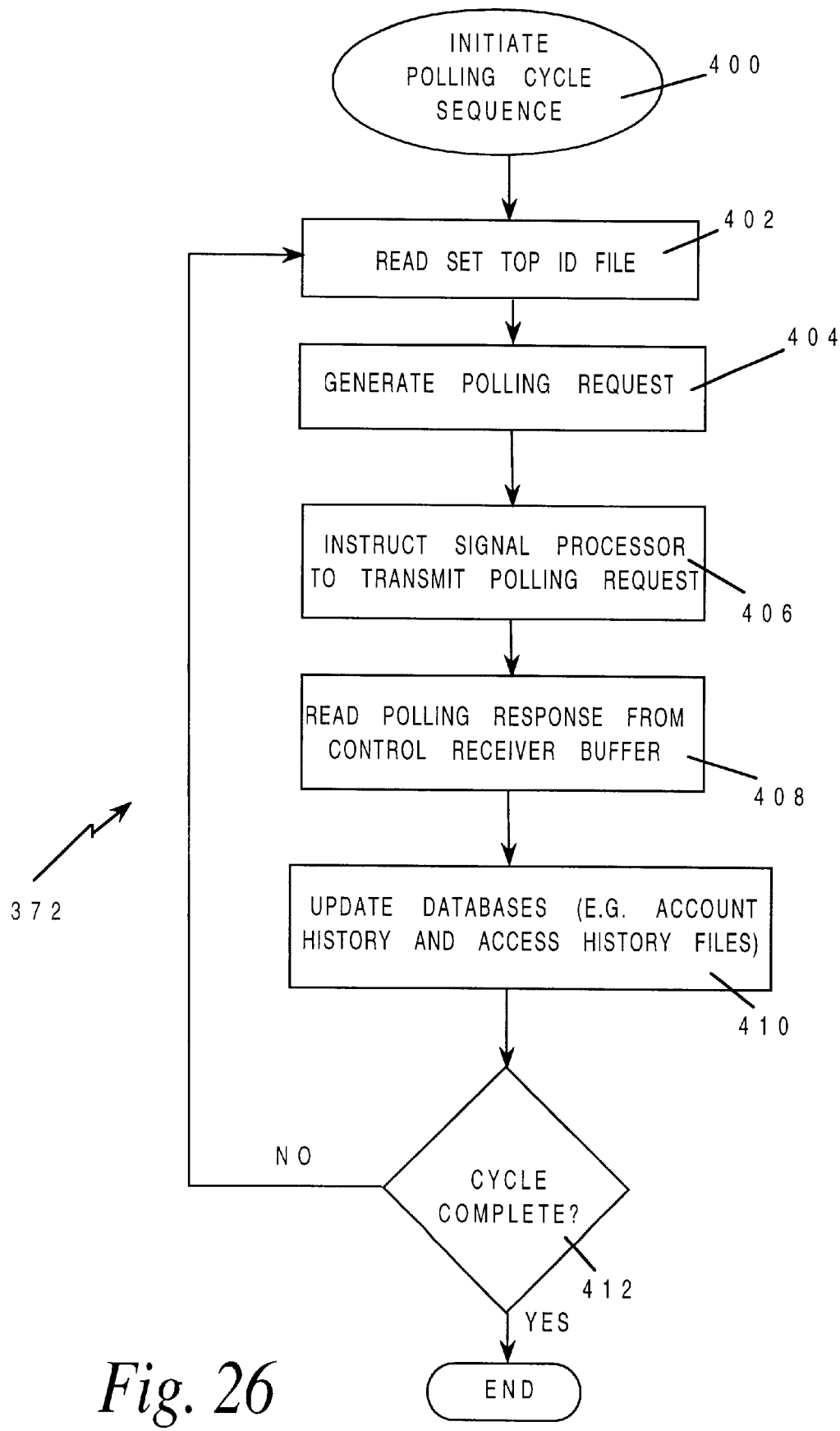
FIG. 26 is a block diagram of the software flow chart for the Polling Cycle routine.

FIG. 26 shows a software flow diagram for the network controller's Polling Cycle routine 372, which interactively executes the network controller's polling cycle. The number of iterations correspond to the number of set top terminals 220 being polled. The network controller CPU 224 initiates the Polling Cycle sequence periodically on a predetermined basis, block 400. Typically, this period is set by the operator at the network controller's operator control station 234 at once per day, although other periods (e.g., multiple times per day or once per week) can be used.

Upon initiation of the sequence 400, as depicted at function block 402, the network controller CPU 224 reads the Set top Terminal ID File 330 and begins generating, block 404, a polling request frame (shown in FIG. 6a and described above) for the first set top terminal 220 identified in the file 330. Once the necessary polling request information is complete, the frame is transferred to the signal processor CPU 244 through the interface between the signal processor 209 and network controller 214. After transfer to the signal processor 209, the frames may be transmitted to the set top terminals 220, block 406. Meanwhile, the network controller's control receiver 228 awaits the corresponding response.

Upon receipt of a polling response, as depicted at block 408, the network controller CPU 224 reads the received information from the control buffer 315. The network controller 214 reads the information field of the polling response frame format, as described above. The network controller CPU 224 processes, indexes and stores the data in an appropriate format, updating the corresponding database files with the information received, block 410. The processing and indexing of the raw data into a relational database 226 is important to the ability of the network controller 214 to quickly take actions such as targeting commercials without lengthy processing time. The polling routine subsequently returns to the Set Top Terminal ID File 330, as shown at decision block 412, to continue the polling cycle for the next set top terminal 220 identified in the file 330. When the routine 372 sequences through the last set top terminal 220, the cycle is complete and the routine 372 ceases until the next polling period.

Most often, the files that require updates during the polling cycle are the Access History File, the Programs Watched Matrices File and the Account History File 338. For example, FIG. 27 shows an example of a 30-day programs watched matrix, denoted 351, for one set top terminal 220. The matrix 351 is divided into six rows, corresponding to six four-hour time slots. The columns of the matrix 351 are divided, as necessary, by the program categories available for viewing. Each entry in the matrix 351 denotes the number of programs watched in a particular program category and time period.

After the status report is received on each set top terminal 220, the polling response routine (see FIGS. 6a and 6b) determines which time slot and category of program numbers in the matrix 351 need to be increased. Thus, entries in the matrix 351 are updated upon receipt of each set top terminal's polling status report, thereby maintaining a running total of the programs watched. For example, during the 0800–1200 time period, the matrix 351 shows that this set top terminal 220 has been used to watch ten movies during the past month. Preferably the program watched identifying information is stored in addition to the running totals in the Programs Watched Matrices file. Use of programs watched matrices is further described in the following section describing the Advertisement Targeting routine.

9. Alternate Advertisement Targeting Routine

Figure 28:
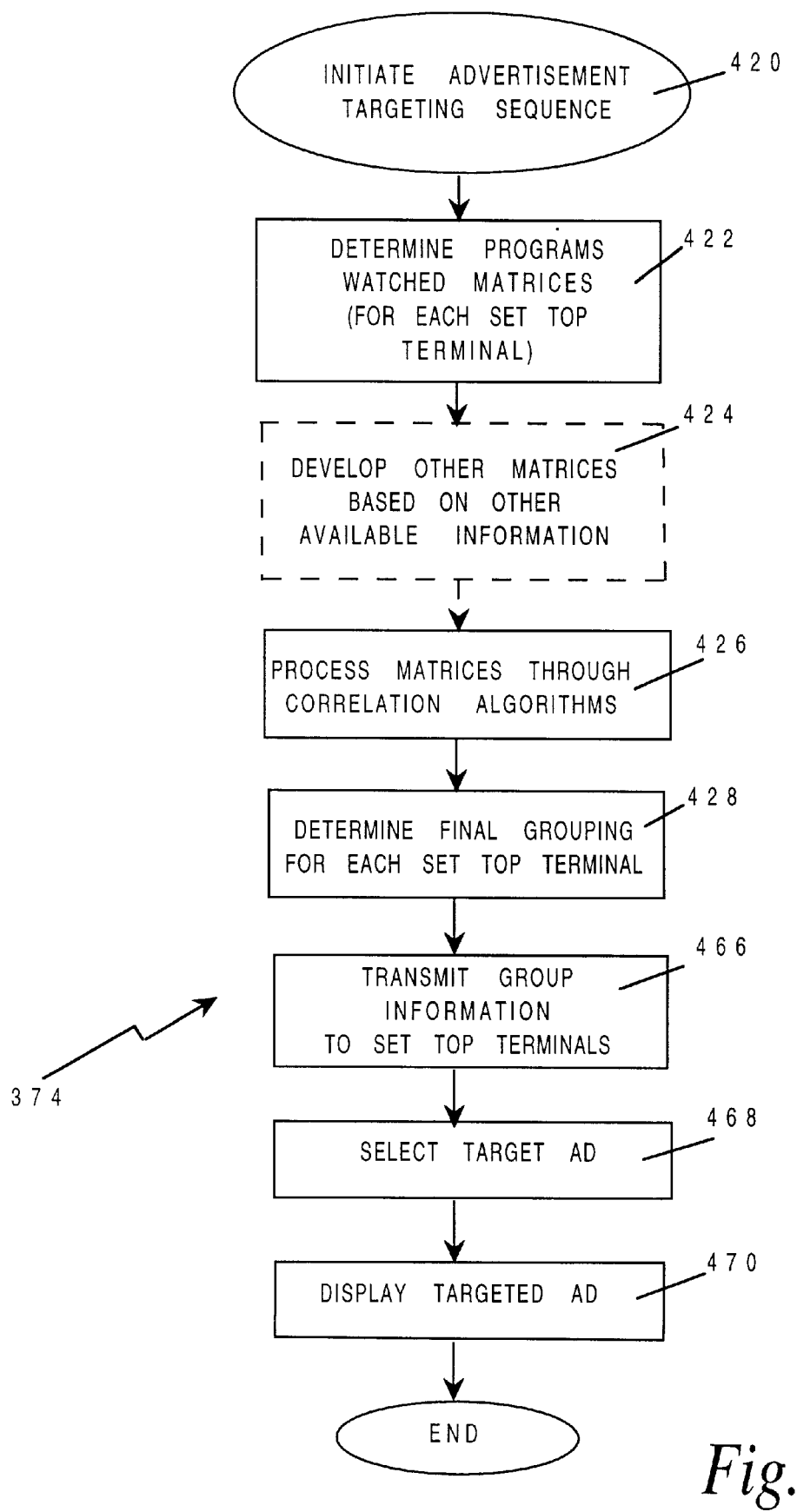
FIG. 28 is the software flow chart for the Alternate Advertisement Targeting routine.

Targeted advertising, using a multiple channel architecture has been described previously. FIG. 28 shows the seven primary functions of an alternate advertisement targeting routine 374. The function of this routine is to target video for set top terminals 220 based on historical viewing data and other data that is available at the network controller 214. Advertisements that may be targeted include video, commercials and infomercials, with infomercials being time varying video segments (e.g., thirty seconds, fifteen minutes). In the discussion that follows, the alternate advertisement targeting routine 374 is described as executed at the cable headend 208. However, as previously noted, the same routine could be executed at a regional or national operations center such as the operations center 202.

When initiated, block 420, the first subroutine, identified at function block 422, accesses the programs watched matrices (exemplified by matrix 351) stored in the Programs Watched Matrices file in the Program Scheduling database 320. The subroutine uses a unique set top terminal ID to access a specific matrix for one set top terminal 220. These matrices are maintained and updated by the polling response routine.

The second subroutine, function block 424, which develops other matrices based on other available information, is an optional subroutine not required for the functioning of the system. For groups of set top terminals 220 or for each individual set top terminal 220, matrices may be developed based on the demographic information, billing information, pricing information, age information and other information which may be stored in the network controller 214 databases.

The third subroutine, block 426, processes all matrices through a set of correlation algorithms. In particular, this subroutine 426 takes matrices developed in the first two subroutines and processes the matrices until reaching a final matrix.

Figure 29:
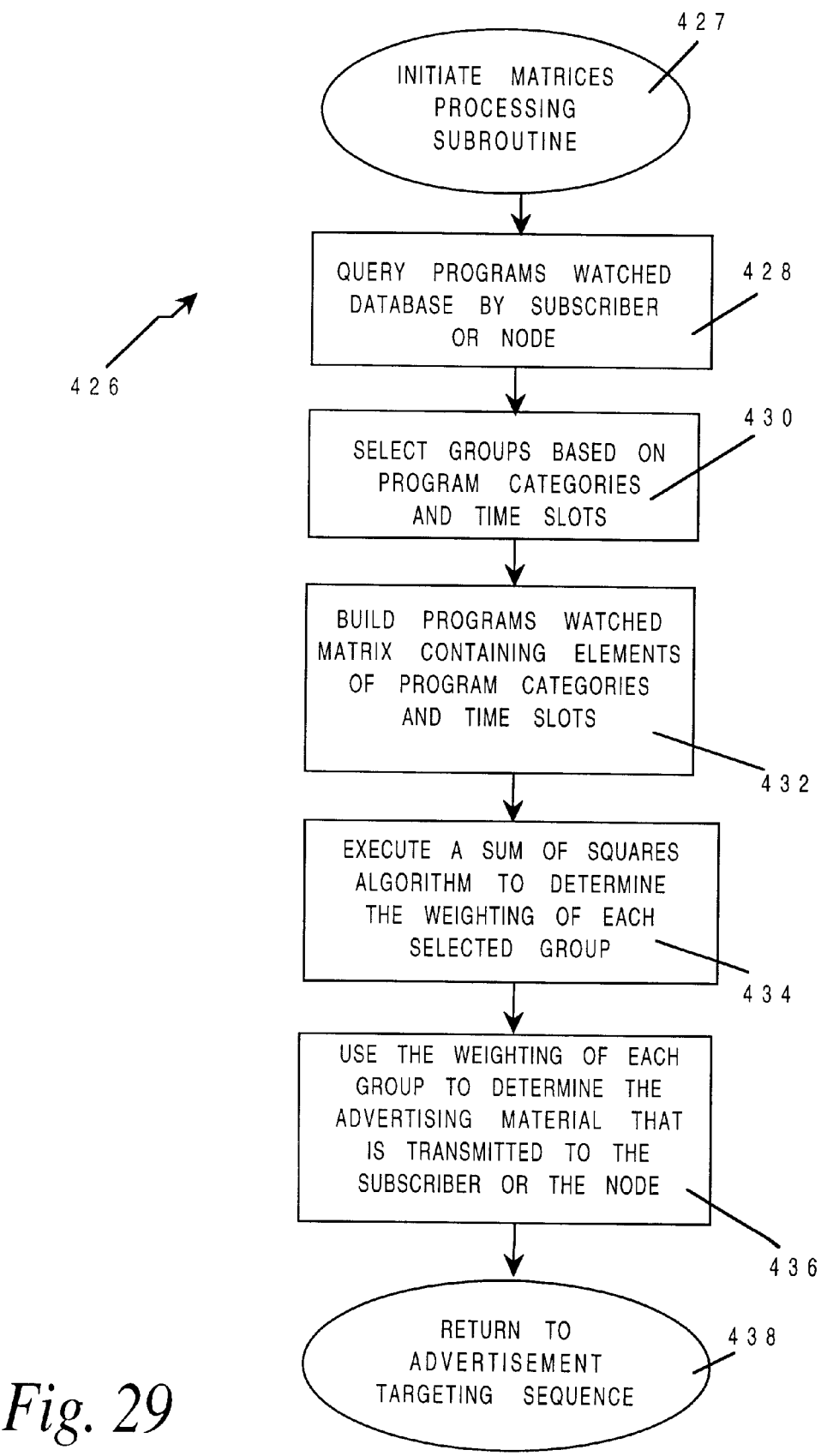
FIG. 29 is the subroutine flow chart for processing programs watched matrices through correlation algorithms.

FIG. 29 diagrams an embodiment of this matrices processing subroutine 426 which is called by the advertisement targeting sequence shown in FIG. 28. As shown in FIG. 29, the subroutine 426 is initiated 427 and then accesses or queries, block 428, the programs watched file and gathers information regarding either an individual subscriber or a group of subscribers. The software can gather the programs watched information in this way for individual subscribers or a set of subscribers.

Once the programs watched information has been gathered from the databases, the routine 426 selects and groups, function block 430, programs watched based on program categories and time slots. The software initially takes each program category (e.g., sports, news, movies, etc.) and establishes the number of programs watched for a given time slot. The time slots may be set to any length of time, including, for example, one, two, three or four hour time frames. The software will loop through such a counting process for each group and timeslot and then proceed to build a programs watched matrix, block 432, based on the program categories and time slots. Essentially, all programs watched in a particular category and time slot will be entered into the programs watched matrix. Once the matrix has been built, the subroutine 426 will process the matrix for a given subscriber or node of subscribers through the correlation algorithms.

A number of correlation algorithms may be used to weight each selected program category group. For example, as shown at block 434, a sum of squares algorithm may be used to determine the weighting. Once the groups have been weighted, the weighted groups will be correlated, as at block 436, with various advertisements stored in the network control databases. The software can then select a set of the most heavily weighted advertisements for transmission to individual subscribers or sets of subscribers in a cable distribution network node. Having determined the weightings of each group and prioritizing the groups accordingly, the subroutine returns 438 to the advertisement targeting sequence 374 of FIG. 28.

Referring back to FIG. 28, the fourth subroutine, as represented at function block 428, uses the final matrix developed by the correlation and weighing algorithm described above, to select a grouping (or selective filter) for each set top terminal 220. The final groupings of advertisement that may be sent to the set top terminals 220 or group of set top terminals 220 may use a subroutine as diagramed in FIG. 30.

Figure 30:
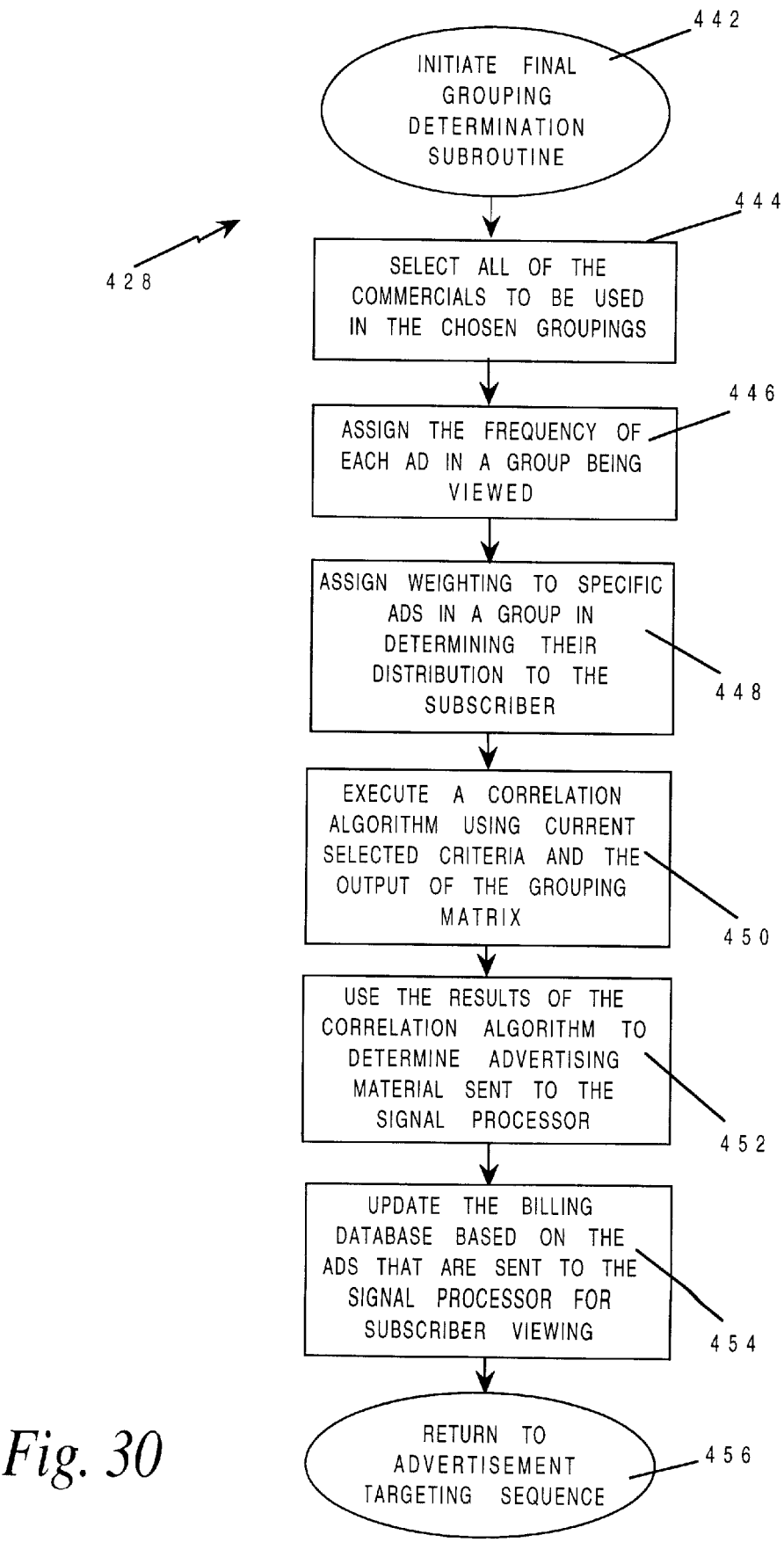
FIG. 30 is the subroutine flow chart for determining final groupings of set top terminals.

The subroutine 428 depicted in FIG. 30 is called or initiated by the advertisement targeting sequence 374 of FIG. 28 in order to determine the final groupings. Basically, this subroutine selects a set of commercials that will be used in the chosen groupings, function block 444. This selection process typically involves advertisements from various advertisement categories (from a number of advertisers which have purchased "air time"). Each advertisement will subsequently be assigned a number of times that it will be shown in a given time frame, block 446. This frequency of display may be based on various factors, including the number of requests and cost paid by the respective advertisers to have the commercial displayed. Such factors are used in the next step of the subroutine, block 448, which assigns a weighting to specific commercials or advertisements in each advertisement category or group. These weightings are used to prioritize the advertisements that will be sent to individual set top terminals 220 or group of set top terminals 220.

Once the advertisements have been weighted, the software executes its correlation algorithm, 450, using selected criteria (i.e., the various factors used to weight the advertisements) as well as the output of each programs watched matrix. Any number of correlation algorithms and weighting algorithms may be used with the software, including the sum of squares weighting algorithm described above.

The results from the correlation algorithm subsequently determine the advertisements and programming material that is sent to the signal processor 209 for distribution over the cable network, as represented at block 452. Once the subroutine 428 completes these steps, the network controller CPU 224 updates the account and billing database based on the ads that are sent to the signal processor 209 for subscriber viewing, as shown at block 454. These billing database updates allow the advertisers to track the costs and frequency of the advertisements targeted to specific set top terminals 220 or nodes of set top terminals 220. Following the updates, the subroutine returns to the advertisement targeting sequence shown in FIG. 28, block 456.

Figures 31, 32:
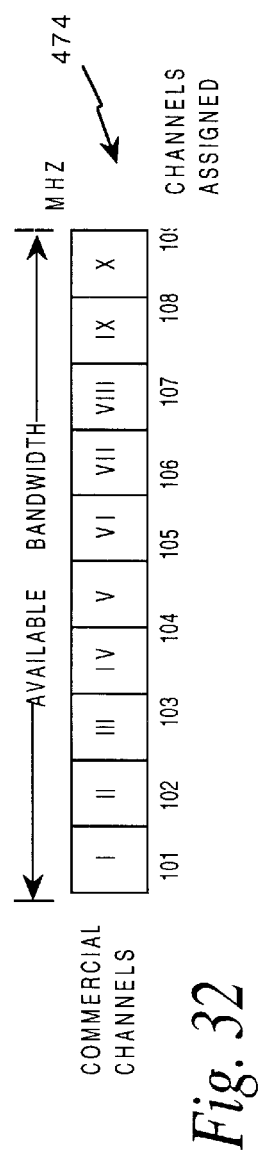
FIG. 31 is a diagram showing a sample assignment of advertising channels to set top terminal groups watching particular categories of programs.
FIG. 32 is a diagram assigning available bandwidth for multiple advertising channels.

Referring to FIG. 31, set top groupings (1 through 5) 460 are shown. The number of set top groupings available may be determined by the bandwidth available to transmit commercials. The bandwidth of the system will limit the number of commercials which are available at the set top terminal 220 at any given time.

Referring back to FIG. 28, the fifth subroutine, represented at function block 466, prepares set top group information for transmission to the set top terminals 220. This subroutine 466 modifies the PCI signal and includes set top group information in the information field of the frame format given earlier. The various methods for transmitting the group information to the set top terminals 220 are described below.

The sixth subroutine, block 468, selects the target video and is the last decision making process in targeting a commercial for a viewer and, can be performed by either the set top terminal 220 or the network controller 214. As noted above, targeted advertising can be based on watching a specific program or a category of programs. In an embodiment, the set top terminal 220 performs this last step by correlating (or matching) the program being watched by the viewer with the set top group information that has been previously transmitted by the network controller 214. For example, using the multiple channel architecture, and referring back to Tables E and F, the set top terminal 220 compares the Group Assignment matrix to the switching plan, switches program channels as appropriate, and the targeted advertisement is then displayed, as shown at block 470. Alternately, the targeting is done by program categories. FIG. 31 shows an exemplary table matching set top terminal groups 460 and program category being watched 470 with a specific channel (continuously) showing commercials. The commercial channels are shown in FIG. 32 at 474 and are assigned Roman numerals I through X, for example. The number of set top groupings and channels showing commercials can vary. FIG. 32 shows a division of available bandwidth to carry ten videos, ten commercial channels. In this example, the channels 474 are numbered 101–110.

The network controller 214 will transmit group information to a set top terminal shown as row names 460 on FIG. 31. The network controller 214 will also transmit data which informs the set top terminal 220 which of the multiple commercial channels 474 is assigned to a television program category shown as Columns 470 on FIG. 31. Each set top terminal 220 only requires the data related to that set top terminal's assigned group (or row). For example, in FIG. 31, the set top terminal in group 1 (row 1) is provided with data on the commercial channel which are assigned for sports programs as I, children's programs as IV and movie category as III. In this manner, each set top terminal 220 is only required to store information related to its own grouping. Therefore, a set top terminal 220 which is in group 1 only needs to store the information related to group 1, which is found in row 1 of FIG. 31. This information includes one commercial channel assignment for each of the eight program categories. Using this information, the set top terminal 220 first determines the specific program or the category of the television program currently being watched and then is able to quickly determine which channel to switch the viewer when an advertisement availability occurs during the program.

The network controller 214 can also perform the step of correlating program category watched 470 and set top terminal grouping 460 to select the target video. The network controller 214 perform this function by gathering information on the program currently being watched by the viewer. To obtain this information in a polling system, set top polling must occur on a real-time basis (i.e., 10 minutes).

During the target commercial selection process, the set top terminal programming will default to the existing commercial during a program if it is missing any of the information needed to determine which of the continuously playing commercial channels to show. In alternative embodiments, the default that is shown on the regular programming channel will correlate with one of the assigned set top groupings and program categories. FIG. 31 shows, at 478, that the default has been assigned to set top terminal grouping 3 for program categories "children" and "entertainment."

The methods to transmit targeted commercials to a set top terminal 220 are: (1) the Multiple Channel method; (2) the Storage method (i.e., storing advertisements in the set top terminal); (3) the Additional Bandwidth method (or individual video access); and (4) the Split Screen method. Each method has certain advantages and disadvantages. The Multiple Channel method requires a set top terminal 220 "transparently" to change channels during a scheduled advertisement from the channel of the currently viewed program to the channel which is carrying the targeted commercial. Although this channel changing method may be transparent to the viewer, it creates difficulty in terms of timing and synchronizing the commercials to begin and end during an advertisement availability occurring in the normally scheduled program. The channel changing is done within the set top terminal 220 using the existing tuner(s).

Figure 33:
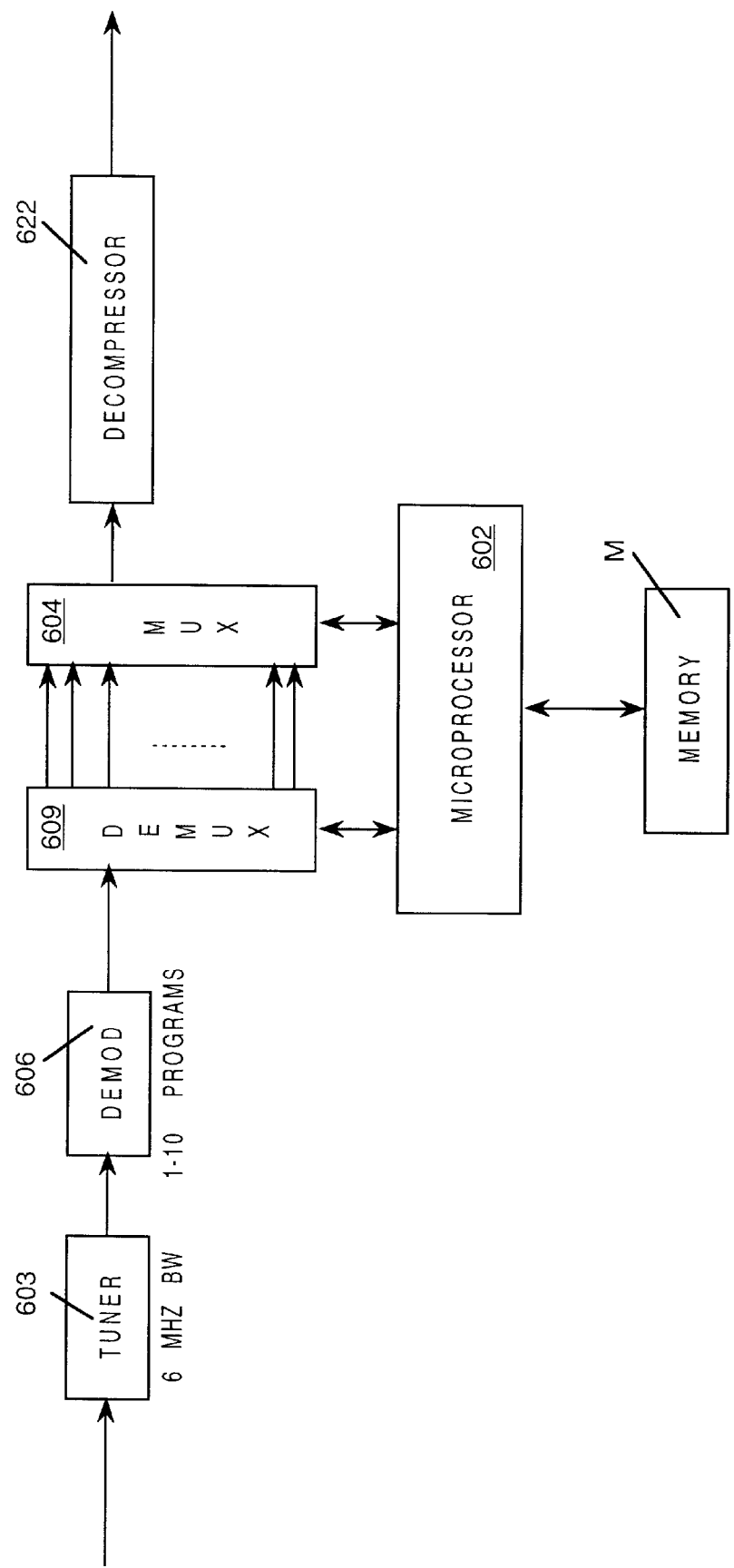
FIG. 33 is a diagram of channel switching hardware.
Figure 34:
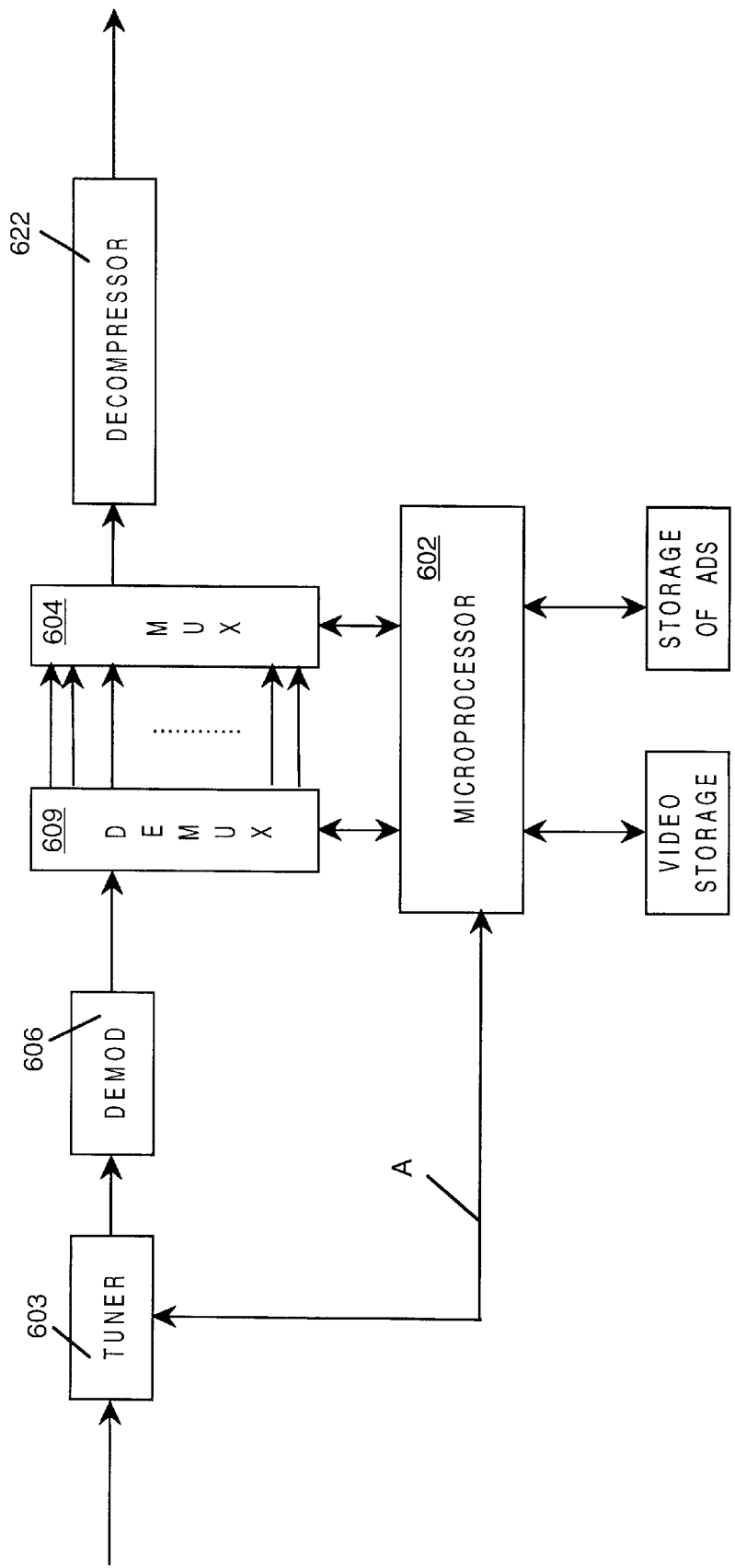
FIG. 34 is a diagram of an alternate channel switching hardware.

The hardware required to accommodate such transparent channel switching capabilities are shown in FIGS. 33, and 34. FIG. 33 shows the set top terminal hardware components which accommodate channel switching within a single 6 MHZ channel bandwidth. These components include a tuner 603, a demodulator 606, a demultiplexer 609, a multiplexer 604, a decompressor 622, a microprocessor 602, and local memory M. The tuner 603 operates by tuning to a specific 6 MHZ bandwidth which includes the displayed video and a number of channels carrying advertisements. The demodulator 606 processes these signals and sends them to the demultiplexor 609, which converts the received signal into separate program and advertisement signals. During this processing, the microprocessor 602 coordinates the demultiplexing of the programming signals. Once the video signal pauses for a commercial break, the microprocessor 602 instructs the multiplexer 604 to select the advertisement or advertisements for decompression and subsequent display on the subscriber's television. This hardware configuration allows the set top terminal 220 to switch between channels within the 6 MHZ bandwidth and display various advertisements for viewing, regardless of the video currently being watched by the subscriber.

Where a targeted advertisement falls outside the tuned 6 MHZ bandwidth containing the video that the subscriber is currently watching, the hardware configuration shown in FIG. 34 is used. In this configuration, the microprocessor 602 instructs the tuner 603 to return to another 6 MHZ channel bandwidth, as represented by bidirectional arrow A.

Figure 35:
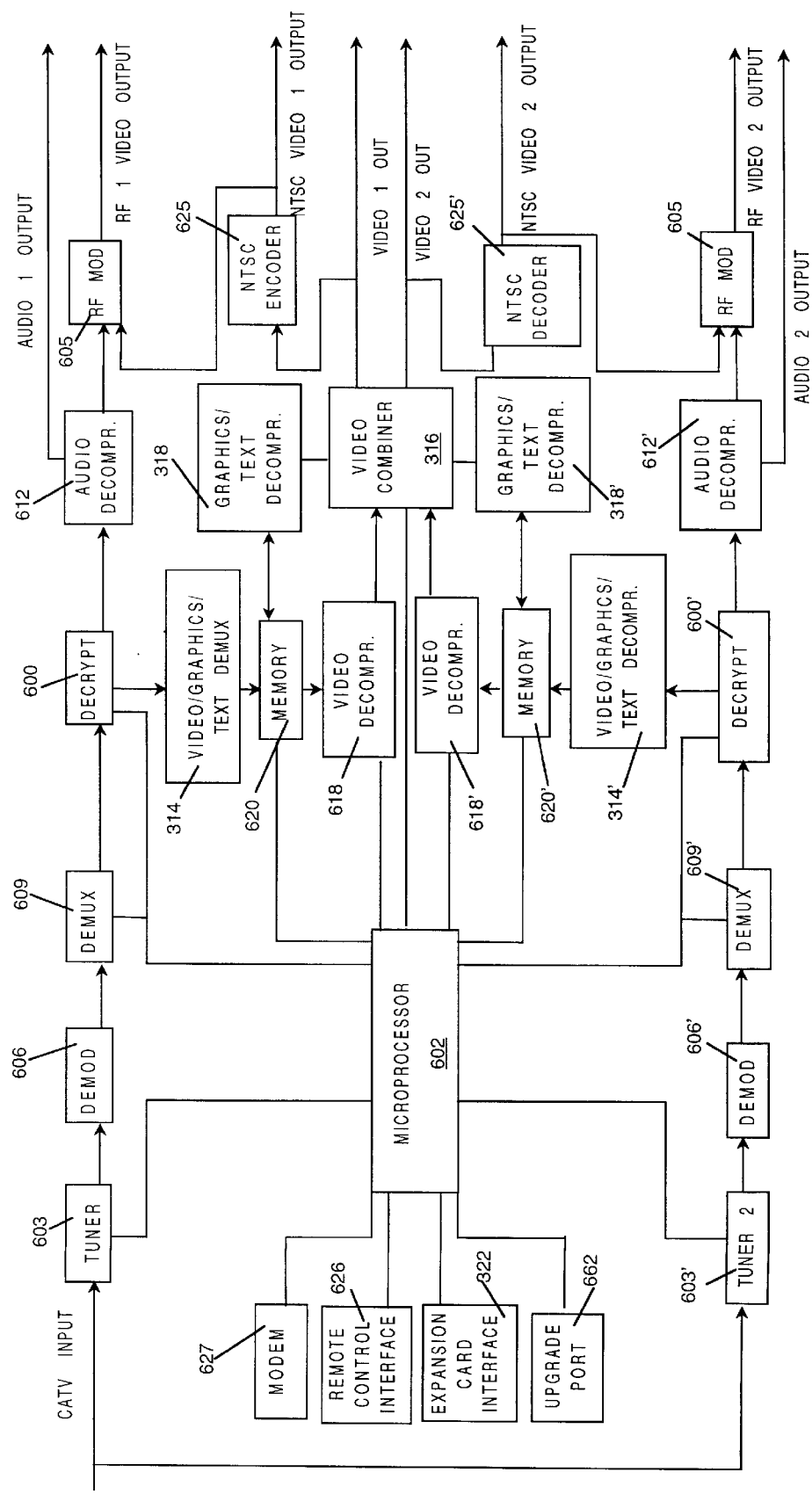
FIG. 35 is a diagram of a television terminal incorporating two tuners.

Working together, the microprocessor 602 and tuner 603 allow targeted advertisements, which have been transmitted in another 6 MHZ bandwidth, to be tuned with minimal acquisition time and delay. In particular, this configuration allows the set top terminal 220 to tune outside a given 6 MHZ bandwidth (to another 6 MHZ bandwidth) in order to select a targeted advertisement for display. This alternative embodiment may require the use of a full screen mask in order to minimize any annoying screen rolling during the tuning process. The masking is intended to cover any glitches which would otherwise be displayed during the acquisition time (e.g., 0.5 seconds) for returning to another 6 MHZ channel bandwidth.

Where the acquisition time or delay becomes unreasonable, an alternative embodiment can include the use of two tuners similar to the configuration shown in FIG. 35. This alternative configuration using two tuners, trades an increased cost for lower acquisition times. In set top terminals 220 equipped with two tuners, the terminal can use the second tuner to tune the channel showing the commercial. Set top terminals with two tuners are described in detail in co-pending patent application, Ser. No. 08/160,194, entitled, ADVANCED SET TOP TERMINAL FOR CABLE TELEVISION DELIVERY SYSTEMS, incorporated herein by reference. Again, the channel changing is transparent to the viewer who believes the same channel is continuously being shown. Those skilled in the art will recognize a number of other configurations of set top terminal hardware that will accommodate a transparent channel switching feature.

The Storage method (described above with reference to the Multiple Channel method, requires the set top terminal to store a certain number of targeted advertisements in memory. The group assignment and switching plan development described for use with the Multiple Channel method is then used to direct the set top terminal to retrieve the appropriate advertisement from memory during program breaks. In this embodiment, the stored targeted advertisements are retrieved, based on a file name, for example, that is identified by comparing the Group Assignment matrix and the switching plan. The Storage method has the advantage of not requiring additional feeder channel to continuously broadcast targeted advertisements.

The Additional Bandwidth method allows flexibility by more specifically targeting commercials before the commercials are transmitted to a set top terminal 220. However, it requires a great deal of available bandwidth in the delivery system. This is difficult with a cable system 200 but possible when a telephone or personal communications system is used to transmit the commercials to the set top terminal 220.

The Additional Bandwidth method allows the network controller 214 to run through a set top terminal's specific correlation algorithms and target specific commercials from hundreds for each set top terminal 220. This method allows for the greatest customizing of targeting and allows for a greater selection of commercials to be shown. Only after a commercial advertisement is selected by the network controller 214 for the specific set top terminal 220 does transmission of the commercial occur.

The Split Screen method transmits multiple commercials on a single channel using a split screen technique; commercials being pre-recorded and prepared prior to transmitting to the set top terminal 220. Although many commercials can be transmitted on a single channel, in the preferred form of the split screen method, only four commercials are shown. As the number of commercials increases the size and the amount of video information transmitted for each commercial decreases proportionately (i.e., 6, 8, 12, etc.). Using split screen methodology, either a masking technique or a scaling and repositioning of video technique must be used at the set top terminal 220 to show the ad. The masking and repositioning-scaling techniques are further defined in co-pending U.S. Patent Application entitled, ADVANCED SET TOP TERMINAL FOR CABLE TELEVISION DELIVERY SYSTEMS, Ser. No. 08/160,194, owned by the assignee of the present invention and incorporated herein by reference. The scaling and repositioning technique produces better quality commercials, but requires expensive equipment at the set top terminal 220. The set top terminal 220 will perform audio switching with the split screen method to amplify the correct audio.

Figure 36:
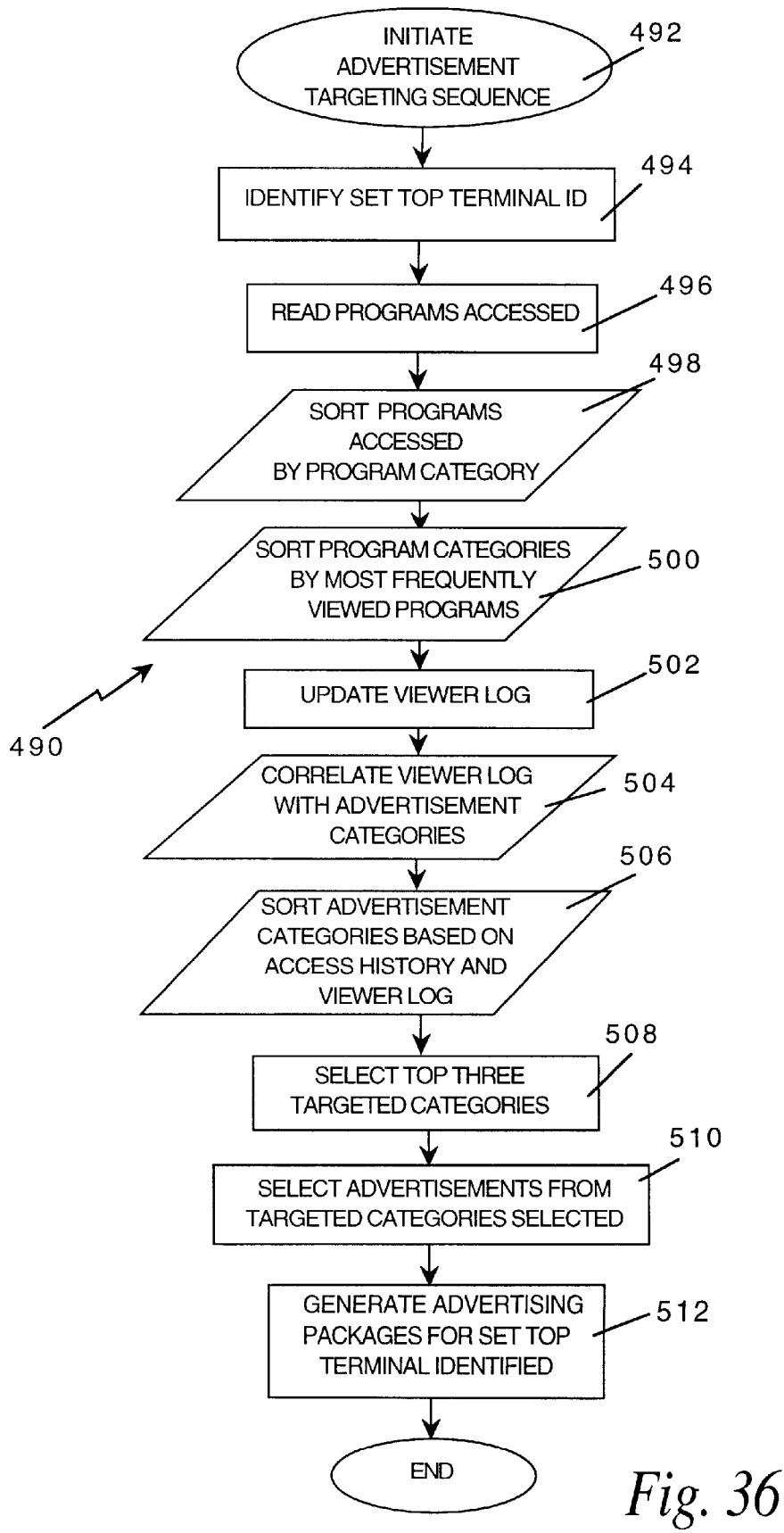
FIG. 36 is the software flow chart for an alternative to the Alternate Advertisement Targeting routine.

FIG. 36 shows a software program flow 490 that is an alternative to the network controller's Alternate Advertisement Targeting routine 374, depicted in FIG. 28. The alternative program 490 allows each set top terminal 220 to be individually targeted with specific advertisements and is initiated automatically, block 492, by the network controller CPU 224 upon receipt of each polling response from a set top terminal 220. Thus, once the network controller 214 receives program access information from a set top terminal 220, the network controller CPU 224 begins the process of selecting a package of advertisements that is based on, among other things, that subscriber's demographic information and viewing history.

Upon receipt of a polling response from a set top terminal 220, the network controller CPU 224 reads the set top terminal identifier, 494, and the programs accessed, 496, from the polling response (or status report) (depicted in FIG. 6b). The network controller 214 writes information on the programs accessed to the Program Scheduling database 320, updating the Access History File which contains listings of all programs accessed within the past week, month or year.

With continued reference to FIG. 36, the network controller CPU 224 then calls a subroutine that sorts the programs accessed by program category, block 498. In turn, the program categories are sorted, 500, based on the number of times that programs appearing in each particular category are accessed. In so doing, this sorting subroutine determines and ranks those programs and program categories that are most frequently viewed by that set top terminal 220.

The subroutine can interactively produce rankings for different time slots in a given day. In this way, different rankings can accommodate different viewing preferences during those time slots for a single set top terminal 220. For example, where rankings for eight three-hour time slots are desired, the subroutine determines a ranking of programs and program categories for each three-hour viewing period. Thus, a different ranking may be produced, for instance, for a morning time slot and an evening time slot. All rankings of programs and program categories for that set top terminal 220 are written to the Viewer Profile database 314, updating the Viewer Log File, as at function block 502.

Next, the network controller CPU 224 calls a subroutine that correlates the updated Viewer Log File with the Advertisement Categories File in the Advertisement Library database 322, block 504. By correlating these two files with one another, the subroutine assigns or correlates various categories of television commercials to each ranking of programs and program categories in the Viewer Log File. The categories of television commercials and advertisements that may be so assigned are found in the Advertisement Categories File indicated generally at 354 as part of the library 322 and may include: (1) Household Goods/Products, (2) Home Improvement and Maintenance, (3) Personal Hygiene, (4) Entertainment Items and Events, (5) Sporting Goods and Events, (6) Motor Vehicles and Related Products, (7) Foodstuffs and Beverages, and (8) Miscellaneous. Where, for example, the viewer has watched a sporting event, the Sporting Goods and Events, Home Improvement and Maintenance, and Foodstuffs and Beverages categories may be assigned to that particular sporting event/program and Sports program category.

Once the programs and program categories ranked in the Viewer Log File are correlated with the advertisement categories in the Advertisement Categories File, the routine calls a sorting subroutine that ranks the groups of advertising categories correlated based on other information in the database files. In the preferred system, this ranking is primarily based on data in the updated Access History File and the updated Viewer Log File, as shown at function block 506. By using data on the viewer's past program selections and demographic information, the subroutine ranks the correlated categories of advertisements according to those likely to be of most interest to that viewer.

After the advertisement categories have been sorted and ranked, the routine selects the top three advertisement categories as the targeted categories for a given time slot and viewer, block 508. Individual advertisements are then chosen from the Advertisements File, with all selections made from the targeted categories, 510. The advertisements that are selected are written to the Advertisement Targeting File from where advertising packages can be generated, function 512, for transmission to the set top terminal 220. Such packages are generated by the network controller CPU 224, which accesses the Advertisement Targeting File and includes the targeted advertisements in the PCI signal. The entire routine is repeated for each set top terminal 220 and, alternatively, each viewer. The terms and descriptions used herein are set forth by way of illustration only and are not meant as limitations. Those skilled in the art will recognize that numerous variations are possible within the spirit and scope of the invention as defined in the following claims.

What is claimed is:

1. A method for targeting advertisements to a plurality of television terminals, comprising:

assigning at least one primary advertisement to each of a program channel;

assigning at least one alternate advertisement to at least one feeder channel; and generating a switching plan, wherein the switching plan instructs each of the television terminals to select one of the program channel and the at least one feeder channel during a program break occurring in a broadcast of a program on the program channel, wherein generating the switching plan comprises:

assigning each of the television terminals to at least one group, designating a unique group mask for each of the groups, and assigning each of the groups to one of the program channel and the at least one feeder channel, wherein the group mask indicates which of the television terminals tune to the program channel and the at least one feeder channel during the program break.

2. The method of claim 1, wherein the group assignments and corresponding group masks are stored in a memory of a television terminal.

3. The method of claim 1, wherein the group assignments are determined based on at least one of Area of Dominant Influence (ADI), zip code+4, demographic data and programs watched data, the group assignments being updated to reflect changes in the ADI, zip code+4, demographic data and programs watched data.

4. The method of claim 1, wherein the program breaks include one or more pods, the program channel and the at least one feeder channel are assigned to each of the one or more pods, and wherein the switching plan directs each of the plurality of television terminals to tune to one of the program channel and the at least one feeder channel between pods.

5. The method of claim 4, wherein the television terminal stores information indicating which of the program channel and the at least one feeder channel was selected during each pod and each program break, the television terminal providing the information to a remote location.

6. The method of claim 5, wherein the remote location polls the television terminal to send the information.

7. The method of claim 5, wherein the television terminal sends the information to the remote location using a collision detection/collision avoidance protocol.

8. The method of claim 1, wherein the program includes the switching plan.

9. The method of claim 1, wherein the switching plan is sent periodically to the plurality of television terminals, the switching plan being stored in a memory of each of the plurality of television terminals.

10. A method of targeting advertisements to television terminals using multiple channels, comprising:

broadcasting a program containing program breaks, each of the program breaks including at least one default advertisement;

broadcasting at least one alternate advertisement;

broadcasting a switching plan, wherein the switching plan designates which of the television terminals receive the default advertisement and the at least one alternate advertisement during the program breaks;

creating categories of advertisements;

defining group categories;

for each group category, defining at least one group;

assigning each television terminal, for each group category, to the at least one group;

creating a group assignment matrix based on the categories of advertisements, the group categories and the group assignments;

storing the group assignment matrix in each television terminal; and comparing the switching plan to the group assignment matrix to determine a channel to tune for receiving one of the default advertisement and the at least one alternate advertisement.

11. The method of claim 10, further comprising generating the switching plan, comprising:

assigning the default advertisement to a program channel;

assigning alternate advertisements to at least one feeder channel;

assigning a group to each of the program channel and the at least one feeder channel; and creating a group mask assignment, wherein the group mask assignment is used by the television terminal to compare the switching plan to the group assignment matrix.

12. The method of claim 11, wherein assigning the program channel and the at least one feeder channel comprises:

ranking each of a plurality of programs based on categories of targeted advertisements and a first percentage of total viewers who view each of the plurality of programs;

ranking a plurality of targeted advertisements based on a second percentage of total viewers;

determining, for each of the plurality of programs and each of the targeting categories, targeted advertisements with overall highest rankings, based on the first and the second percentages;

assigning targeted advertisements with the overall highest rankings to be displayed on first program channels;

assigning targeted advertisements with lower overall rankings to be displayed on second program channels; and assigning alternate targeted advertisements to be displayed on one or more feeder channels, each of the one or more feeder channels associated with a corresponding one of the second program channels.

13. The method of claim 10, wherein the television terminal is a set top terminal.

14. The method of claim 10, wherein the television terminal is incorporated into the television.

15. The method of claim 10, wherein the television terminal is coupled to a satellite television receiver.

16. The method of claim 10, further comprising:

at each television terminal, recording in a memory an identification of a channel selected during the program break;

providing the identification to a remote site; and deleting the identification from the memory.

17. The method of claim 10, wherein the switching plan is provided with the transmission of the program and periodically to the television terminals, the television terminals storing the switching plan in a memory.

18. A method of targeting advertisements to a plurality of television terminals, comprising:

creating a package of targeted advertisements;

providing the package to each of the plurality of television terminals, the television terminals storing the package in a memory;

generating a group assignment matrix;

providing the group assignment matrix to each of the television terminals, the television terminals storing the group assignment matrix in the memory;

generating a switching plan;

providing the switching plan to each of the plurality of television terminals, the television terminals storing the switching plan in the memory;

broadcasting a program to the plurality of television terminals, the program including at least one program break; and switching a television terminal receiving the program to one of a plurality channels during the at least one program break, each of the plurality of channels carrying a different advertisement selected from the package of targeted advertisements.

19. The method of claim 18, wherein switching the television terminal comprises:

comparing the group assignment matrix to the switching plan; and selecting a channel based on the comparison.

20. The method of claim 18, further comprising:

storing in the memory an identification of a channel switched to during the program break;

providing the identification to a remote site; and deleting the identification from the memory.

21. The method of claim 18, wherein the program break contains a plurality of pods; the switching plan instructing a television terminal to tune to a separate channel for each of the plurality of pods.

22. A method for assigning targeted advertisements to multiple broadcast channels, wherein the multiple broadcast channels include a program channel for each of a plurality of programs to be broadcast and at least one feeder channel, comprising:

identifying the plurality of programs to carry the targeted advertisements;

assigning the targeted advertisements to target categories;

dividing each target category into groups of viewers;

ranking each of the plurality of programs based on the target categories and a first percentage of total viewers in each group of viewers;

ranking the targeted advertisements based on a second percentage of total viewers in each group of viewers;

determining, for each of the plurality of programs and each of the targeting categories, targeted advertisements with overall highest rankings, based on the first and the second percentages;

assigning targeted advertisements with the overall highest rankings to be displayed on first program channels;

assigning targeted advertisements with lower overall rankings to be displayed on second program channels; and assigning alternate targeted advertisements to be displayed on one or more feeder channels, each of the one or more feeder channels associated with a corresponding one of the second program channels.

23. The method of claim 22, wherein the first percentage of total viewers is based on programs watched data collected from television terminals capable of receiving the broadcast plurality of programs.

24. The method of claim 18, wherein the switching plan and the group assignment matrix are provided to a television terminal over an Internet.

25. The method of claim 18, wherein the package of targeted advertisements are provided to a television terminal over an Internet.

26. A method for targeting advertisements to a plurality of television terminals, comprising:

generating a package of targeted advertisements;

from the package of targeted advertisements, assigning at least one primary advertisement to a program;

from the package of targeted advertisements, assigning at least one alternate advertisement the program;

providing the package of targeted advertisements to the plurality of television terminals, each of the plurality of television terminals storing the package in a memory;

assigning each of the plurality of television terminals to at least one group;

generating a switching plan, wherein the switching plan instructs each of the plurality of television terminals to select one of the primary advertisement and the at least one alternate advertisement from the memory during a program break occurring in a broadcast of a program on a program channel, based on the group assignment.

* * * * *